(12) United States Patent
 Markram

(10) Patent No.: US 8,159,373 B2
(45) Date of Patent: Apr. 17, 2012

(54) ENCODING AND DECODING INFORMATION

(75) Inventor: Henry Markram, Lausanne (CH)

(73) Assignee: Ecole Polytechnique Federale De Lausanne (EPFL), Lausanne (CH)

( * ) Notice: Subject to any disclaimer, the term of this patent is extended or adjusted under 35 U.S.C. 154(b) by 67 days.

(21) Appl. No.: 12/844,112

(22) Filed: Jul. 27, 2010

(65) Prior Publication Data

US 2011/0025532 A1 Feb. 3, 2011

Related U.S. Application Data

(60) Provisional application No. 61/229,151, filed on Jul. 28, 2009.

(30) Foreign Application Priority Data

Jul. 28, 2009 (WO) ................. PCT/EP2009/059757

(51) Int. Cl.
 *H03M 7/00* (2006.01)
(52) U.S. Cl. ................ 341/50; 341/51; 341/87
(58) Field of Classification Search ............ 341/50, 341/51, 87
 See application file for complete search history.

(56) References Cited

U.S. PATENT DOCUMENTS

| | | | |
|---|---|---|---|
| 4,893,255 A | 1/1990 | Tomlinson, Jr. | |
| 5,625,751 A | 4/1997 | Brandwajn et al. | |
| 5,640,160 A * | 6/1997 | Miwa ............................ | 341/53 |
| 5,677,927 A * | 10/1997 | Fullerton et al. ............. | 375/130 |
| 5,933,355 A | 8/1999 | Deb | |
| 6,167,373 A | 12/2000 | Morii | |
| 6,212,230 B1 | 4/2001 | Rybicki et al. | |
| 6,382,029 B1 | 5/2002 | Shoureshi et al. | |
| 6,560,583 B1 | 5/2003 | Markram | |
| 6,606,040 B2 * | 8/2003 | Abdat ............................ | 341/87 |
| 7,221,711 B2 * | 5/2007 | Woodworth ................. | 375/246 |

(Continued)

FOREIGN PATENT DOCUMENTS

EP 0268972 6/1998

OTHER PUBLICATIONS

Fuster et al. "Neuron Activity Related to Short-Term Memory" Science, New Series vol. 173 (3997), p. 652-654 (1971).

(Continued)

*Primary Examiner* — Khai M Nguyen
(74) *Attorney, Agent, or Firm* — Fish & Richardson P.C.

(57) ABSTRACT

Methods, systems, and apparatus, including computer programs encoded on a computer storage medium, for encoding and decoding information. In one aspect, methods of encoding information in an encoder include the actions of receiving a signal representing information using a collection of discrete digits, converting, by an encoder, the received signal into a time-based code, and outputting the time-based code. The time-based code is divided into time intervals. Each of the time intervals of the time-based code corresponds to a digit in the received signal. Each digit of a first state of the received signal is expressed as a event occurring at a first time within the corresponding time interval of the time-based code. Each digit of a second state of the received signal is expressed as a event occurring at a second time within the corresponding time intervals of the time-based code, the first time is distinguishable from the second time. All of the states of the digits in the received signal are represented by events in the time-based code.

29 Claims, 38 Drawing Sheets

U.S. PATENT DOCUMENTS

2002/0181799 A1    12/2002    Matsugu et al.
2002/0190881 A1    12/2002    Low
2003/0072050 A1    4/2003    Vrazel et al.

OTHER PUBLICATIONS

Stent et al. "A Physiological Mechanism for Hebb's Postulate of Learning" Proc. Nat. Acad. Sci. USA vol. 70(4), pp. 997-1001 (1973).

Sejnowski "Statistical Constraints on Synaptic Plasticity" Letters to the Editor, J. Theor. Biol. vol. 69, p. 385-389 (1977).

Sejnowski "Storing Covariance With Nonlinearly Interacting Neurons" J. Math. Biology vol. 4, p. 303-321 (1977).

Hopfield "Neural networks and physical systems with emergent collective computational abilities" Proc. Natl. Acad. Sci. USA vol. 79, pp. 2554-2558 (1982).

Bienenstock et al. "Theory For The Development of Neuron Selectivity: Orientation Specificity and Binocular Interaction in Visual Cortex" The Journal of Neuroscience vol. 2 (1), p. 32-48 (1982).

Amit et al. "Information storage in neural networks with low levels of activity" Phy. Rev. A vol. 35 (5), (1987).

McNaughton et al. "Hippocampal synaptic enhancement and information storage within a distributed memory system" TINS vol. 10 (10), p. 408- 415 (1987).

Thomson et al. "Large, Deep Layer Pyramid-Pyramid Single Axon EPSPs in Slices of Rat Motor Cortex Display Paired Pulse and Frequency-Dependent Depression, Mediated Presynaptically and Self-Facilitation, Mediated Postsynaptically" J. Neurophysiology vol. 70 (6) p. 2354-2369 (1993).

Edelman "Neural Darwinism: Selection and Reentrant Signaling in Higher Brain Function" Neuron vol. 10, p. 115-125 (1993).

Callaway et al. "Photostimulation using caged glutamate reveals functional circuitry in living brain slices" Proc. Natl. Acad. Sci. USA vol. 90, pp. 7661-7665 (1993).

Greg J. Stuart et al. "Active propagation of somatic action potentials into neocortical pyramidal cell dendrites" Nature vol. 367, p. 69-72 (1994).

R. R. Zakrzewski et al. "Application of Hierarchical Neural-Network-Based Control to Transient Stabilization of Interconnected Power Systems" Proc. 33$^{rd}$ Conf. Decision and Control, Lake Buena Vista, FL p. 1883-1884 (1994).

C. A. Barnes et al. "LTP Saturation and Spatial Learning Disruption: Effects of Task Variables and Saturation Levels" J. Neuroscience vol. 14(10) p. 5793-5806 (1994).

Jim Deuchars et al. "Relationships between morphology and physiology of pyramid-pyramid single axon connections in rat neocortex in vitro" J. Physiology 478(3) pp. 423-435 (1994).

Kenneth D. Miller et al. "The Role of Constraints in Hebbian Learning" Neural Computation vol. 6, p. 100-126 (1994).

Kenneth I. Blum et al. "A Model of Spatial Map Formation in the Hippocampus of the Rat" Neural Comp. vol. 8, p. 85-93 (1996).

Wulfram Gerstner et al. "A neuronal learning rule for sub-millisecond temporal coding" Nature vol. 383 p. 76-78 (1996).

Markram et al. "Redistribution of synaptic efficacy between neocortical pyramidal neurons" Nat. vol. 382 (29) p. 807-810 (1996).

Markram "A Network of Tufted Layer 5 Pyramidal Neurons" Cerebral Cortex vol. 7, p. 523-533; 1047-3211 (1997).

Markram et al. "Physiology and anatomy of synaptic connections between thick tufted pyramidal neurones in the developing rat neocortex" J. Physiology vol. 500 (2), p. 409-440 (1997).

Markram et al. "Regulation of Synaptic Efficacy by Coincidence of Postsynaptic Aps and EPSPs" Science vol. 275, p. 213-215 (1997).

Watts et al. "Collective dynamics of 'small-world' networks" Nature vol. 393(4), p. 440-442 (1998).

Sun et al. "Fault synthetic recognition for an EHV transmission line using a group of neural networks with a timespace property" IEE Proc.-Gener. Transm. Distrib. vol. 145 (3), p. 265-270 (1998).

Markram et al. "Potential for multiple mechanisms, phenomena and algorithms for synaptic plasticity at single synapses" Neuropharmacology 37, p. 489-500 (1998).

Barabasi et al. "Emergence of Scaling in Random Networks" Science vol. 286, p. 509-512 (1999).

Sejnowski "The Book of Hebb" Neuron vol. 24, p. 773-776 (1999).

Song et al. "Competitive Hebbian Learning Through Spike-Timing-Dependent Synaptic Plasticity" Nature Neuroscience vol. 3, p. 919-926 (2000).

Abbott et al. "Synaptic plasticity : taming the beast" Nature Neuroscience Supp. vol. 3, p. 1178-1183 (2000).

Saha et al. "Application of ANN Methods for Instrument Transformer Correction in Transmission Line Protection" Dev. Power System Protection, Conf. Pub. No. 479 0 IEE, p. 303-306 (2001).

Rao et al. "Spike-Timing-Dependent Hebbian Plasticity as Temporal Difference Learning" Neural Computation vol. 13, p. 2221-2237 (2001).

Jin et al. "The structure of growing social networks" Phys. Rev. E vol. 64(4), p. 1-8 (2001).

Thomson et al. "Selectivity in the inter-laminar connections made by neocortical neurons" J. Neurocytology vol. 31, p. 239-246 (2002).

Thomson et al. "Synaptic connections and small circuits involving excitatory and inhibitory neurons in layers 2-5 of adult rat and cat neocortex: triple intracellular recordings and biocytin labelling in vitro" Cereb Cortex. vol. 2(9), p. 936-53 (2002).

Thomson et al. "Target and Temporal Pattern Selection at Neocortical Synapses" Philosophical Transactions: Biological Sciences, vol. 357 (1428) The Essential Role of the Thalamus in Cortical Functioning, pp. 1781-1791 (2002).

McNaughton et al. "Hebb, Pandemonium and Catastrophic Hypermnesia: The Hippocampus as a Suppressor of Inappropriate Associations" Cortex vol. 39, p. 1139-1163 (2003).

Stepanyants et al. "Class-Specific Features of Neuronal Wiring" Neuron vol. 43, p. 251-259 (2004).

Chklovskii et al. "Cortical rewiring and information storage" Nature vol. 431, p. 782-788 (2004).

Chklovskii "Synaptic Connectivity and Neuronal Morphology: Two Sides of the Same Coin" Neuron vol. 43, p. 609-617 (2004).

Watts et al. "Excitatory and inhibitory connections snow selectivity in the neocortex" J Physiol 562(1), p. 89-97 (2005).

Yoshimura et al. "Excitatory cortical neurons form fine-scale functional networks" Nature vol. 433, p. 868-873 (2005).

Song et al. "Highly Nonrandom Features of Synaptic Connectivity in Local Cortical Circuits" PLoS Biology vol. 3(3), p. 0507-0519 (2005).

West et al. "Layer 6 Cortico-thalamic Pyramidal Cells Preferentially Innervate Interneurons and Generate Facilitating EPSPs" Cerebral Cortex vol. 16, p. 200-211 (2006).

Kalisman et al. "The neocortical microcircuit as a *tabula rasa*" PNAS vol. 102 (3), p. 880-885 (2005).

Armen Stepanyant et al. "Neurogeometry and potential synaptic connectivity" Trends in Neurosciences vol. 28(7), p. 387-394 (2005).

Kampa et al. "Cortical feed-forward networks for binding different streams of sensory information" Nature Neuroscience vol. 9, p. 1472-1473 (2006).

Le Be' et al. "Spontaneous and evoked synaptic rewiring in the neonatal neocortex" PNAS vol. 103(35), p. 13214-13219 (2006).

Frey et al. "Clustering by Passing Messages Between Data Points" Science vol. 315, p. 972-976 (2007).

Frey et al. "Supporting Online Material for Clustering by Passing Messages Between Data Points" Science Express, p. 1-15 (2007).

Mézard "Where Are the Exemplars?" Science vol. 315, p. 949-951 (2007).

Rinaldi et al. "Elevated NMDA receptor levels and enhanced postsynaptic long-term potentiation induced by prenatal exposure to valproic acid" PNAS vol. 104(33), p. 13501-13506 (2007).

Le Be' et al. "Morphological, Electrophysiological, and Synaptic Properties of Corticocallosal Pyramidal Cells in the Neonatal Rat Neocortex" Cerebral Cortex vol. 17, p. 2204-2213 (2007).

Frick et al. "Postnatal development of synaptic transmission in local networks of L5A pyramidal neurons in rat somatosensory cortex" J. Physiol vol. 585(1) p. 103-116 (2007).

Krieger "Synaptic Connections between Layer 5B Pyramidal Neurons in Mouse Somatosensory Cortex Are Independent of Apical Dendrite Bundling" J. Neuroscience vol. 27(43), p. 11473-11482 (2007).

Luo et al. "Genetic Dissection of Neural Circuits" Neuron vol. 57, p. 634-660 (Mar. 13, 2008).

Caporale et al. "Spike Timing—Dependent Plasticity: A Hebbian Learning Rule" Annu. Rev. Neurosci. vol. 31, p. 25-46 (2008).

Bullmore et al. "Complex brain networks: graph theoretical analysis of structural and functional systems" Nature vol. 10, p. 186-198 (Mar. 2009).

Brown et al. "Intracortical circuits of pyramidal neurons reflect their long-range axonal targets" Nature vol. 457, p. 1133-1137 (Feb. 26, 2009).

Barabási et al. "Scale-Free Networks: A Decade and Beyond" Science 325, p. 412-413 (2009).

Chédotal et al. "Wiring the Brain: The Biology of Neuronal Guidance" Cold Spring Harbor Perspect. Biol 2010 vol. 2, p. 1-17 (May 12, 2010).

International Search Report issued in PCT/EP2010/060875 dated Jun. 20, 2011.

Anonymous, "Pulse-position modulation," Wikipedia, the free encyclopedia [Retrieved from URL:http://en.wikipedia.org/w/index.php?title=Pulse-position_modulation&oldid=300172418] [Retrieved on Mar. 26, 2010], 3 pages.

Ghassemlooy et al., "Performance of diffused indoor optical wireless links employing neural and adaptive linear equalizers," Information, Communications & Signal Processing, 2007 6th International Conference on IEEE, pp. 1-6 (2007).

International Search Report as issued in PCT/EP2009/059757 on Mar. 30, 2010.

Invitation to Pay Additional Fees, and, Where Applicable, Protest Fee as issued in PCT/EP2010/060875 on Mar. 22, 2011.

Shariat et al., "Comparison between several methods of PPM demodulation based on iterative techniques," Telecommunications and Networking—ICT 2004, 11th International Conference on Telecommunications, Proceedings (Lecture Notes in Comput. Sci. vol. 3124) Springer-Verlag Berlin, Germany, pp. 554-559 (2004).

Wang et al., "A novel cyclic D/A converter," Proceedings of the International Symposium on Circuits and Systems, 3:1224-1227 (1993).

* cited by examiner

ENCODING AND DECODING INFORMATION

CROSS-REFERENCE TO RELATED APPLICATIONS

This application: claims priority to PCT Application Ser. No. PCT/EP2009/059757, filed on Jul. 28, 2009 under 35 U.S.C. §119(b); and claims the benefit of U.S. Provisional Application No. 61/229,151, filed Jul. 28, 2009, the contents of both of which are incorporated herein by reference.

BACKGROUND

This specification relates to encoding and decoding information.

An encoder is a device that converts information from a first representation into a second representation. Encoders can be included in many different systems and devices, including data communication devices, data storage devices, data compression devices, data encryption devices, and combinations of these and other devices. An encoder can be paired with a decoder that can reconstruct the information. The encoded and decoded information can be communicated in signals and/or stored on a data storage device.

Biological neurons, and other biological neural systems, can encode information and communicate using electrochemical signaling. For example, biological neural systems can encode information in action potentials of approximately equal amplitude. Biological neural systems include synapses that act as electrochemical transducers that convert electrochemical signals into electrical conductance changes. Even a single neuron may receive several thousand electrochemical signals as inputs on its branches (called "dendrites"). These inputs cause voltage changes across a cell membrane which are merged in a time-dependent manner. This merging of inputs follows passive (linear), active (non-linear), cable (decaying over time), and electro-chemical (diffusion) laws. Under certain circumstances, such inputs can be merged into a train of successive action potentials.

SUMMARY

This specification describes technologies relating to encoding and decoding information.

In general, one innovative aspect of the subject matter described in this specification can be embodied in methods of encoding information in an encoder that include the actions of receiving a signal representing information using a collection of discrete digits, converting, by an encoder, the received signal into a time-based code, and outputting the time-based code. The time-based code is divided into time intervals. Each of the time intervals of the time-based code corresponds to a digit in the received signal. Each digit of a first state of the received signal is expressed as a event occurring at a first time within the corresponding time interval of the time-based code. Each digit of a second state of the received signal is expressed as a event occurring at a second time within the corresponding time intervals of the time-based code, the first time is distinguishable from the second time. All of the states of the digits in the received signal are represented by events in the time-based code.

Other embodiments of this aspect include corresponding systems, apparatus, and computer programs, configured to perform the actions of the methods, encoded on computer storage devices.

Another innovative aspect of the subject matter described in this specification can be embodied in systems that include an input for receiving a signal representing information using a collection of discrete digits, an encoder that encodes the received signal, and an output for providing the time-based code to another system or device. The encoder includes a state detector configured to detect the states of the digits in the received signal and a translator configured to translate the states of the digits in the received signal into a time-based code, the time-based code comprising a collection of time intervals each assigned a respective digit in the received signal, each of the time intervals comprising an event, the timing of the event within each of the time intervals characterizing the state of a respective assigned digit.

Other embodiments of this aspect include corresponding methods and computer programs, configured to perform the actions of the methods, encoded on computer storage devices.

Another innovative aspect of the subject matter described in this specification can be embodied in a methods for decoding a time-based code signal that include the actions of receiving a time-based code signal at a decoder, detecting the timing of the events within the time intervals, and outputting a signal that represents the information expressed in the time-based code signal using a collection of discrete digits. The time-based code signal is divided into time intervals, each of the time intervals of the time-based code signal comprises an event, and the timing of the events within the time intervals express the information content of the time-based code signal.

Other embodiments of this aspect include corresponding systems, apparatus, and computer programs, configured to perform the actions of the methods, encoded on computer storage devices.

Another innovative aspect of the subject matter described in this specification can be embodied in systems for decoding a time-based code signal that include an input that receives a time-based code signal, a event detector configured to detect timing of the events within the time intervals of the time-based code signal, a translator configured to translate the timing of the events within the time intervals of the time-based code into states of a collection of digits, and an output configured to provide a signal comprising the digits. The time-based code signal is divided into time intervals, each of the time intervals of the time-based code signal comprises an event, and the timing of the events within the time intervals express the information content of the time-based code signal.

Other embodiments of this aspect include corresponding methods and computer programs, configured to perform the actions of the methods, encoded on computer storage devices.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
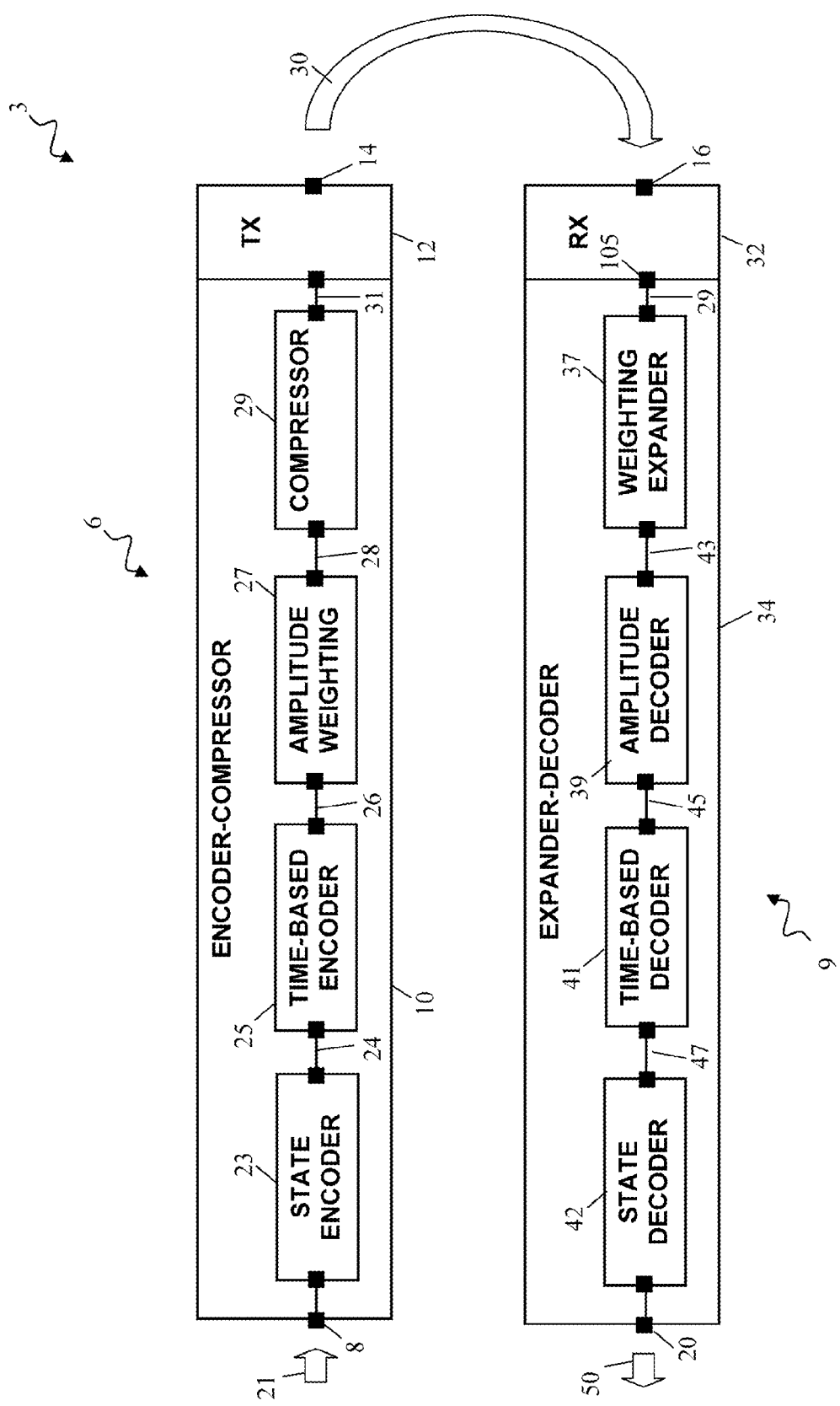
FIG. 1A is a schematic representation of an encoder/decoder system.

FIG. 1A is a schematic representation of an encoder/decoder system 3. Encoder/decoder system 3 is a collection of components for encoding and decoding information. Encoder/decoder system 3 can be, e.g., a data communication system, a data storage system, a data compression system, a data encryption system, or a combination of these or other systems. An encoder can be paired with a decoder that can reconstruct the information. The encoded and decoded information can be communicated in signals and/or stored on a data storage device.

Encoder/decoder system 3 includes an encoding transmitter system 6 and a decoding receiver system 9. Encoding transmitter system 6 includes an input 8, an encoder-compressor 10, a transmitter 12, and an output 14. Input 8 of encoding transmitter system 6 can be connected to receive information in a signal 21. Input 8 and output 14 are physical structures through which signals are respectively received into and transferred out of encoding transmitter system 6. Signal 21 includes information. Encoder-compressor 10 is a component that encodes and compresses at least some of the information in signal 21.

Encoder-compressor 10 includes a state encoder 23, a time based encoder 25, an amplitude weighting component 27, and a compressor 29. State encoder 23 is a component that encodes at least some of the information in signal 21 into a signal 24 which represents information in a collection of discrete digits. The digits can represent information using different states. For example, signal 24 can represent information in binary digits or bits (i.e., using a pair of states) or in decimal digits (i.e., using ten states). State encoder 23 is connected to provide signal 24 to time-based encoder 25.

Time-based encoder 25 is a component that encodes signal 24 into time-based code 26 in which the timing of events within intervals represents information. One or both of state encoder 23 and time-based encoder 25 can include a segmenter that divides a single signal into a collection of smaller units. As a consequence of this division, amplitude weighting component 27 receives a collection of time-based codes 26. Time-based encoder 25 is connected to provide the collection of time-based codes 26 to amplitude weighting component 27.

Amplitude weighting component 27 is a component which is configured to weight the amplitudes of events within each time-based code 26 according to the timing of at least some of the other events in that time based code 26. In some implementations, amplitude weighting component 27 can weight the amplitudes of events according to the timing of predecessor events. Amplitude weighting component 27 need not add new information to time-based codes 26 but rather can represent at least some of the existing information in each time-based code in another dimension, namely, the amplitudes of the events. Amplitude weighting component 27 is connected to provide a collection of amplitude-weighted time based codes 28 to compressor 29.

Compressor 29 is a component that is configured to compress a collection of amplitude-weighted time based codes 28. Compressor 29 can compress the amplitude-weighted time based codes 28 by integrating them to generate a one-dimensional code 31. One-dimensional code 31 can represent at least some of the information in amplitude-weighted time based codes 28 in one dimension. For example, one-dimensional code 31 can represent the information using the timing of events. In some implementations, the integration can be a non-linear integration. Compressor 29 is connected to provide one-dimensional code 31 to transmitter 12.

Transmitter 12 is configured to transmit one-dimensional code 31 in a signal 30 that can be stored or otherwise processed. For example, the signal 30 can be stored in a memory structure (not shown). Alternatively, the signal 30 can be transmitted to a receiving device that decodes the signal. In the example shown, the signal 30 is conveyed from output 14 of encoding transmitter system 6 to input 16 of decoding receiver system 9.

Decoding receiver system 9 includes an input 16, a receiver 32, an expander-decoder 34, and an output 20. Input 16 of decoding receiver system 9 can be connected to receive signal 30. Signal 30 includes one-dimensional code 31. Input 16 and output 20 are physical structures through which signals are respectively received into and transferred out of decoding receiver system 9. Receiver 32 is configured to receive signal 30 and convey one-dimensional code 31 to expander-decoder 34.

Expander-decoder 34 is a component that expands and decodes at least some of the information in signal 29. Expander-decoder 34 includes a weighting expander 37, an amplitude decoder 39, a time-based code decoder 41, and a state decoder 42. Weighting expander 37 is a component that is configured to expand one-dimensional code 31 into one or more collections of weights 43. Collections of weights can be generated according to the dimension used to represent information in signal 29 (e.g., the timing of events in signal 29). For example, weights can be generated for each event in signal 29 according to the timing of predecessor events within signal 29. Each event in the one-dimensional code can be associated with a single weight in each collection of weights. In some implementations, weighting expander 37 weights the amplitudes of each event using the weights and outputs amplitude-weighted versions of one-dimensional code 31 as weight collections 43. In other implementations, weighting expander 37 outputs an ordered lists of weights that discards the dimension used to represent information in signal 29 (e.g., discards the timing of events in signal 29) as weight collections 43. Weighting expander 37 is connected to convey collections of weights 43 to amplitude decoder 39.

Amplitude decoder 39 is a component that is configured to decode weight collections 43 into a collection of one or more time-based codes 45 in which the timing of events within intervals represents information. Amplitude decoder 39 is connected to convey one or more time-based codes 45 to time-based code decoder 41. Time-based code decoder 41 is a component that decodes at least some of the information in the one or more time-based codes 45 into one or more signals 47 which represents information in a collection of states. For example, signals 47 can represent information in binary (i.e., using a pair of discrete states) or in decimal (i.e., using ten discrete states). Time-based code decoder 41 is connected to convey signals 47 to state decoder 42. State decoder 42 is a component that is configured to decode signals 47 that represent information in a collection of digits into a signal 50. Signal 50 can include at least some of the information included in signal 21.

One or more of amplitude decoder 39, time-based code decoder 41, and state decoder 42 can include an aggregator that assembles a collection of smaller digits into a larger collection of digits. For example, in some implementations, amplitude decoder 39 can include a time-based code aggregator that assembles multiple time-based codes into a single time-based code 45. As another example, in some implementations, time-based code decoder 41 can include an aggregator that assembles multiple signals which represents information in a collection of discrete digits into a single signal 47 that represents information in a collection of discrete digits. As yet another example, in some implementations, state decoder 42 can include an aggregator that assembles signals into a single signal 50.

Figure 1B:
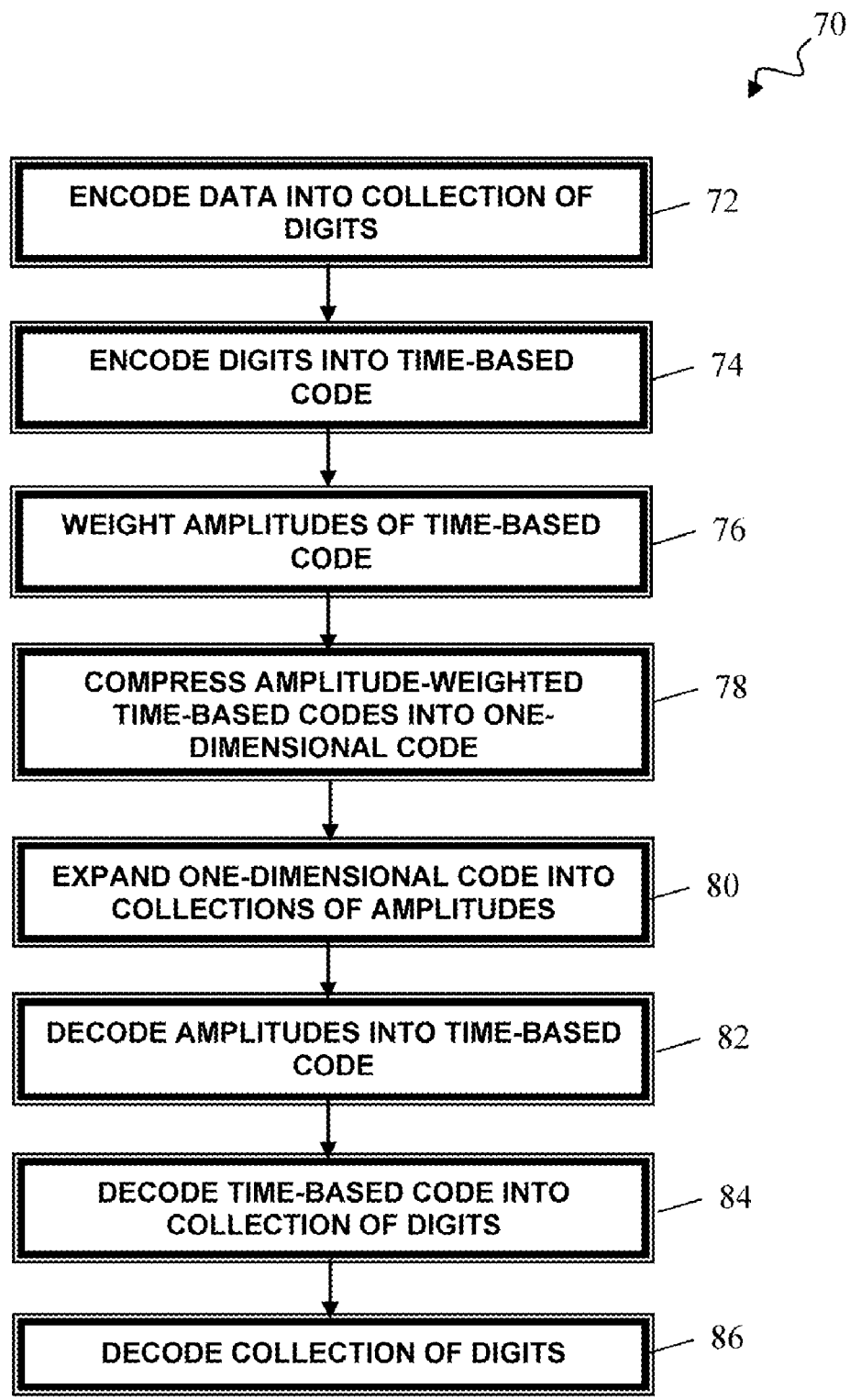
FIG. 1B is a flow chart of a process for encoding and decoding information.
Figure 41:
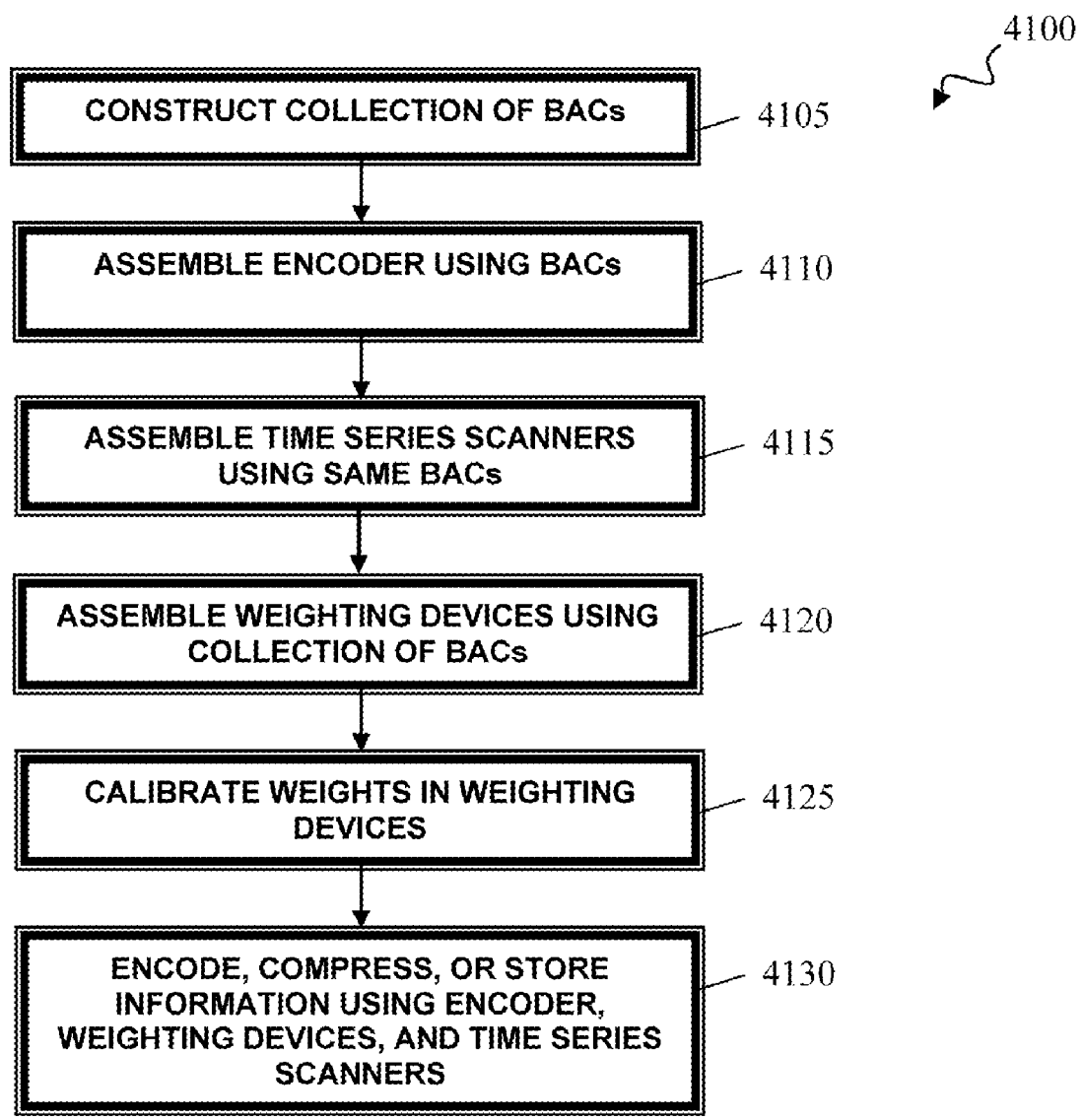
FIG. 41 is a flow chart of a process for creating an encoder/decoder pair.

FIG. 1B is a flow chart of a process 70 for encoding and decoding information. Process 70 can be performed in isolation or in conjunction with other activities. For example, process 70 can be performed at stage 4130 in process 4100 (FIG. 41). Process 3900 can be performed by an encoder/decoder system, such as encoder/decoder system 3 (FIG. 1A).

In process 70, data is encoded into a collection of digits (stage 72) and the digits are encoded into a time-based code (stage 74). The time-based code represents information using the timing of events within intervals. The amplitudes of the events within the time-based code are weighted according to the timing of other events in the time based code (stage 76). For example, the events can be weighted according to the timing of predecessor events in that time based code. Amplitude weighting need not add new information to the time-based code but rather can represent at least some of the existing information in the time-based code in another dimension, namely, the amplitudes of events.

The amplitude-weighted time-based codes can be compressed into a one-dimensional code (stage 78). The one-dimensional code can represent at least some of the information in amplitude-weighted time based codes in one dimension, e.g., using the timing of events.

In a receiving device, the one-dimensional code can be expanded into collections of amplitudes (stage 80). Each event in the one-dimensional code can be associated with a single weight in each collection of weights. In some implementations, the collections of amplitudes can be a list of amplitudes without any timing information. In other implementations, the one-dimensional code itself can be weighted by multiple collections of amplitudes to yield multiple amplitude-weighted versions of the (formerly) one-dimensional code.

The amplitudes can be decoded into a time-based code (stage 82) which in turn can be decoded into one or more signals that represent information in a collection of digits (stage 84). The one or more signals that represent information in a collection of digits can themselves be decoded into another representation (stage 86).

Time Encoder

Figure 2A:
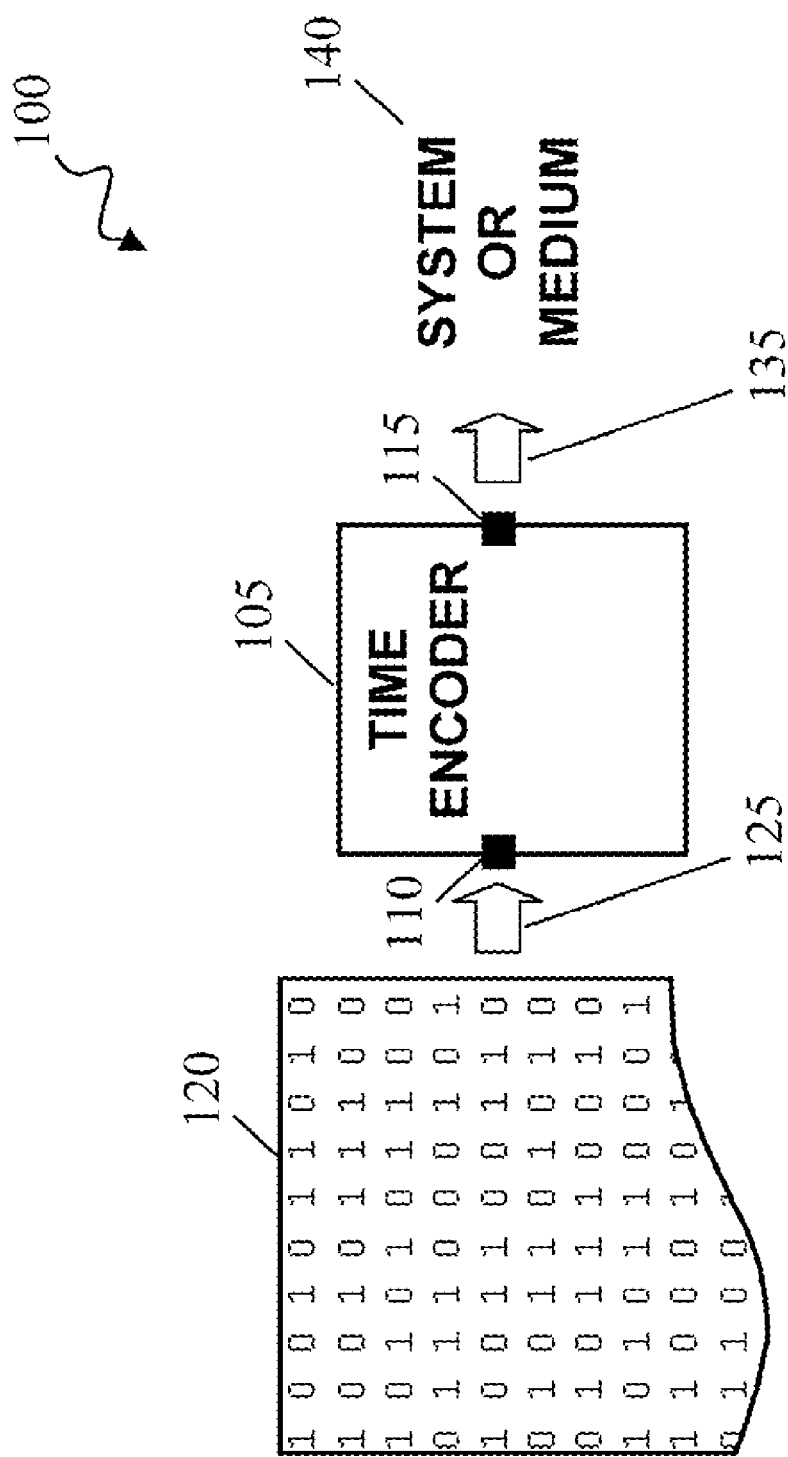
FIG. 2A is a schematic representation of a system in which information can be encoded.

FIG. 2A is a schematic representation of a system 100 in which information can be encoded. System 100 includes a time encoder 105 that includes an input 110 and an output 115. Input 110 and output 115 are physical structures through which signals are respectively received into and transferred out of time encoder 105. Time encoder 105 is a component that encodes information by causing events to occur at particular times within time intervals of an output signal. Time encoder 105 can, in effect, express the information content of an input signal in an output format in which the timing of events within intervals represents the information content of the input signal. Time encoder 105 can be used in conjunction with other devices. For example, time encoder 105 can be used as time-based encoder 25 (FIG. 1A).

Input 110 of time encoder 105 can be connected to receive information 120 in a signal 125 received from a data communication path. Signal 125 represents information 120 in an ordered, finite set of discrete digits. For example, in some implementations, input information 120 can be expressed in binary digits as a series of high (i.e., "1") and low (i.e., "0") states, as shown. Input 110 can be a serial or parallel binary data port. Signal 125 can be conveyed on a wired or wireless data communication path.

Output 115 of time encoder 105 can be connected so as to transfer information encoded in a signal 135 conveyed to a system or a medium 140. The information in signal 135 is expressed by the times at which events occur within intervals of signal 135. The timing of events within these intervals represents all of the information within signal 125. For example, as described further below, events occurring at first times within time intervals can express digits having high states within signal 125, whereas events occurring at second times within time intervals can express digits having low states within signal 125. The first times are distinguishable from the second times.

The system or medium 140 to which signal 135 is conveyed varies according to the operational context of system 100. For example, if system 100 is part of a data transmission system, system or medium 140 can include a data transmitter. As another example, if system 100 is part of a data storage system, system or medium 140 can include a write head that can write information into a data storage device.

In operation, time encoder 105 receives signal 125 onto input 110. Time encoder 105 encodes information 120 in signal 125 by expressing input information 120 in signal 135 with events timed to occur at distinguishable times within different intervals. Time encoder 105 outputs signal 135, which includes the timed events, to system or medium 140.

Figure 2B:
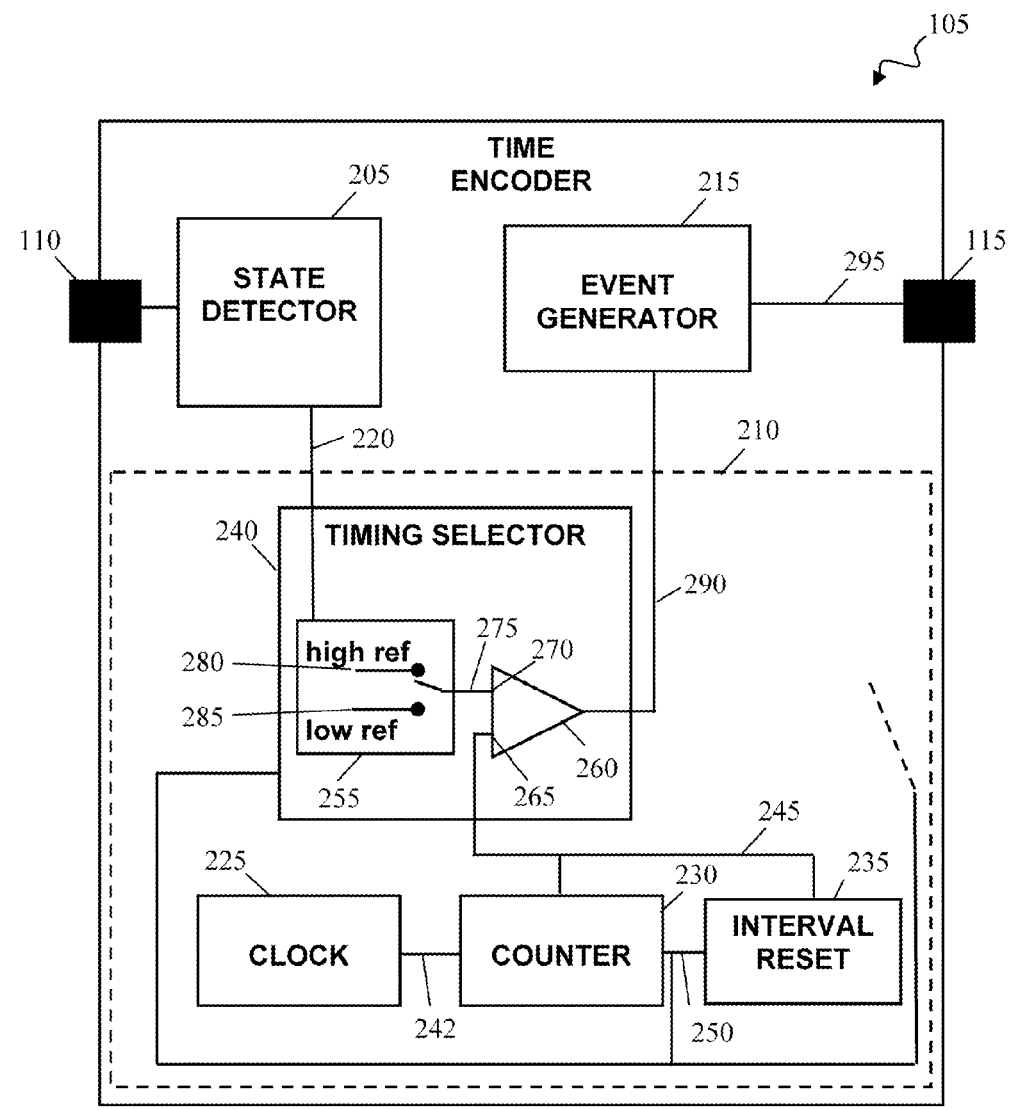
FIG. 2B is a schematic representation of an implementation of a time encoder.

FIG. 2B is a schematic representation of an implementation of time encoder 105. The illustrated implementation of time encoder 105 includes a state detector 205, an event timing circuit 210, and an event generator 215. State detector 205 is a component that detects states of digits in signal 125 which represent input information 120. For example, in implementations where input information 120 is expressed in a series of binary digits, state detector 205 can be a bit detector that distinguishes between the binary "1" and "0" states. State detector 205 is connected between input 110 and event timing circuit 210. Indications of the detected states 220 are conveyed to event timing circuit 210.

Event timing circuit 210 is a component that is configured to specify the timing of events within intervals of an output signal 135. Event timing circuit 210 includes a clock 225, a counter 230, an interval reset 235, and a timing selector 240. Clock 225 provides a clock output signal 242 to counter 230. Counter 230 is connected to receive the clock output signal 242 and to output a dynamic count of the clock signal 245. The dynamic count 245 is coupled to interval reset 235 and timing selector 240. Interval reset 235 can include a comparator (not shown) that compares the dynamic count of the clock signal with a threshold count representative of an interval duration. Such a comparison can determine when an interval has passed. Interval reset 235 provides a reset signal 250 in response to the passing of an interval. Counter 230 receives the reset signal 250 and can reset the count of the clock signal in response to the reset signal. The resetting of counter 230 can thus demarcate intervals of a duration of the threshold count.

Timing selector 240 receives both the dynamic count of the clock signal 245 and the indications of the states 220 detected by state detector 205. Timing selector 240 can include a switch 255 and a comparator 260. Comparator 260 includes a pair of inputs 265, 270. Input 265 receives the dynamic count of the clock signal 245 output by counter 230. Input 270 receives a switch output signal 275 from switch 255. Switch 255, and the other switches described herein, can be implemented as, e.g., an electro-mechanical switch, one or more transistors, or machine-readable instructions.

Switch 255 includes a high reference 280 and a low reference 285. High reference 280 embodies the times within an interval at which events representing digits having high states in signal 125 are to occur. Low reference 285 embodies the times within an interval at which events representing digits having low states in signal 125 are to occur. Switch 255 receives the indications of the states 220 detected by state detector 205. Switch 255 switches between applying high reference 280 and low reference 285 to input 270 of comparator 260 in response to the indications of the states detected by state detector 205. In particular, in response to an indication that state detector 205 has detected a low state, switch 255 switches to connect low reference 285 to input 270. In response to an indication that state detector 205 has detected a high state, switch 255 switches to connect high reference 280 to input 270.

Comparator 260 compares the count of the clock signal output by counter 230 to the provided low reference 285 or high reference 280 and outputs comparison results 290.

Event generator 215 is a component that is configured to generate events in output signal 135. Event generator 215 is connected to receive the results 290 of the comparisons from comparator 260 and time the generation of events based on the results of the comparisons. For example, event generator 215 can be a pulse generator that generates pulses in response to transitions in the results 290 that arise from the clock signal output by counter 230 transitioning past the given low reference 285 or high reference 280. The occurrence of such events within the intervals demarcated by interval reset 235 is thus timed to encode the states of the digits within signal 125 and thus can be referred to as "data events." Event generator 215 provides the generated events 295 to output 115.

Timing selector 240 is also connected to receive the interval reset signal 250. Timing selector 240 can advance to the next digit and reset the comparison by comparator 260 in response to the reset signal 250. In some implementations, state detector 205 is also connected to receive the interval reset signal 250 (see dashed line input to state detector 205). State detector 205 can, e.g., time the provision of indications of the detected states to timing selector 240 in response to the reset signal 250 and thereby advance to the next digit.

In operation, time encoder 105 receives signal 125 on input 110. State detector 205 detects states in the digits of signal 125 that represent input information 120 and outputs a signal characterizing those digits (i.e., the indications of the states 220). Timing selector 240 receives the signal describing those digits and generates outputs (i.e., results output 290) that are timed to occur within intervals in correspondence with the states. In particular, first states in signal 125 produce transitions in the results 290 occurring at a first time within corresponding time intervals and second states in signal 125 produce transitions in the results 290 occurring at a second time within corresponding time intervals. The timing of these transitions is set by low reference 285 and high reference 280.

In response to transitions in the results 290, event generator 215 generates events 295 which are provided to output 115. The timing of the events follows the timing of the transitions in the results 290. Interval reset 235 demarcates the intervals to advance timing selector 240 from the state of one digit in signal 125 to the next and to reset the comparisons that generate transitions in the results 290. Every digit in signal 125 (including low "0" states) is thus represented by a correspondingly timed event in an interval.

Figure 3:
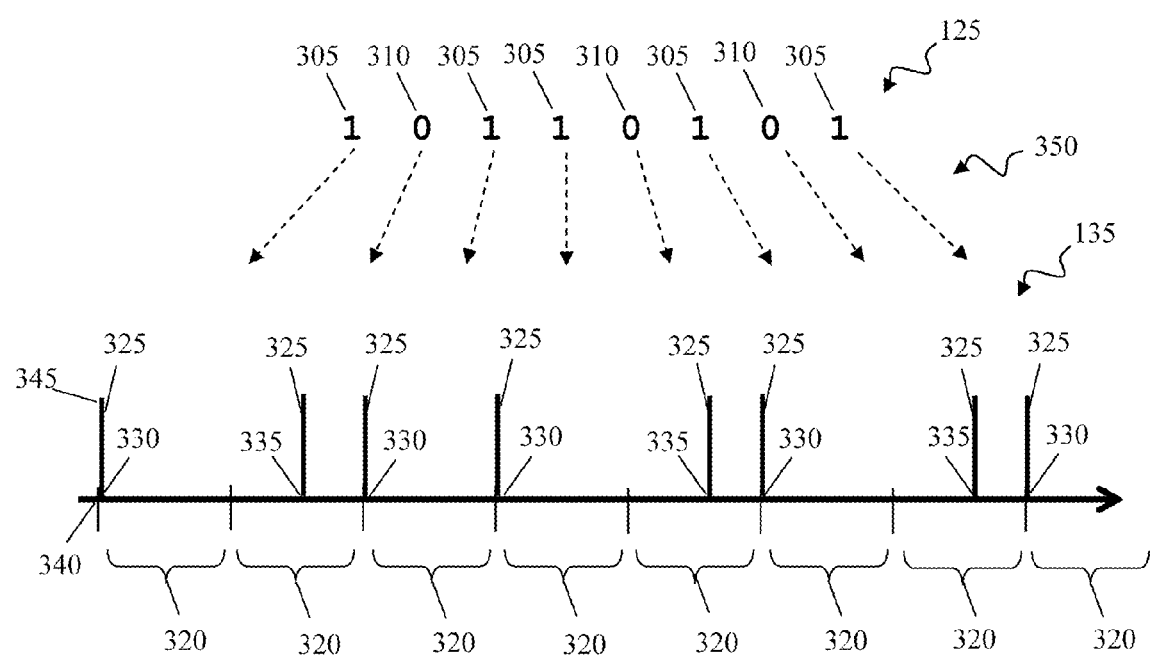
FIG. 3 is a schematic representation of a process of time encoding.

FIG. 3 is a schematic representation of a process of time encoding. The illustrated time encoding can be performed by a time encoder such as time encoder 105 (FIGS. 1 and 2). In the illustrated implementation, information 120 is expressed in binary digits as a series of high digits 305 and low digits 310.

Time encoding encodes information 120 into a time-based code signal 135. Time-based code signal 135 includes a collection of time intervals 320, each of which corresponds to a digit 305, 310 within signal 125. Each time interval 320 includes a respective data event 325. The timing of data events 325 within individual time intervals 320 indicates the state of a digit 305, 310 corresponding to that time interval 320. For example, in the illustrated implementation, data events 325 in intervals 320 corresponding to high state digits 305 occur at times 330 near the beginning of those intervals 320. Data events 325 in intervals 320 corresponding to low state digits 305 occur at times 335 near the middle of those intervals 320. Times 330 are distinguishable from times 335.

In different implementations, different features of events, including data events 325, can be identified and treated as the time at which the events occur. For example, in the illustrated implementation, data events 325 are pulses that transition from a baseline (i.e., a "resting") state 340 to a high (i.e., an "excited") state 345 and then return to the baseline resting state 340. In some implementations, the initial transitions from baseline state 340 to high state 345 can be identified and treated as the times at which data events 325 occur. In other implementations, the return transitions from high state 345 to baseline state 340 can be identified and treated as the times at which data events 325 occur. In some implementations, data event 325 are transient pulses in that the initial and return transitions are so close in time that they are indistinguishable to, e.g., time encoder 105. The time at which a transient data event 325 occurs is identified based on the apparent coincident occurrence of the initial and return transition.

In the illustrated implementation, the shapes of different data events 325 are indistinguishable from one another and different data events 325 can be distinguished only by virtue of their timing. Further, in some implementations, data events 325 can be "binary events" in that they occur at one of only two possible times in the interval. When occurring at those times, they are at the same signal level (e.g., high) but their timing within the interval is attributable to the states of the digits they represent.

In the illustrated implementation, time intervals 320 all have the same duration and occur sequentially. The sequence of time intervals 320 corresponds to the sequence of the corresponding digits 305, 310 in signal 125. In other words, the first time interval 320 (and its event 325) of time-based code signal 135 corresponds to the first digit 305 in signal 125, the second time interval 320 (and its data event 325) of time-based code signal 135 corresponds to the second digit 310 in signal 125, and so on. This correspondence is represented by dashed arrows 350.

Figure 4:
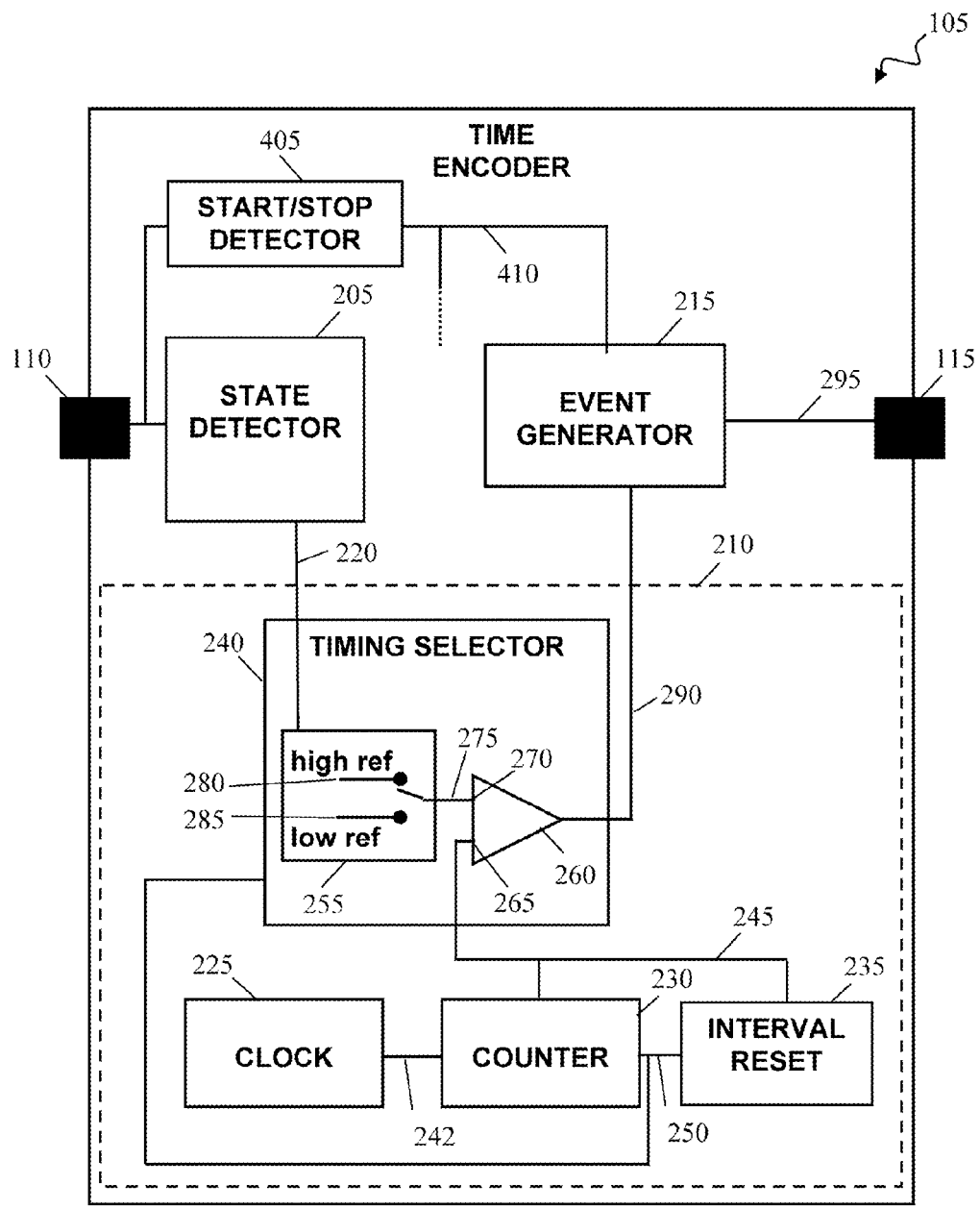
FIG. 4 is a schematic representation of another implementation of a time encoder.

FIG. 4 is a schematic representation of another implementation of time encoder 105. In addition to state detector 205, event timing circuit 210, and event generator 215, the illustrated implementation of time encoder 105 also includes a start/stop detector 405. Start/stop detector 405 is a component that is configured to detect the beginning and end of data transmission in signal 125. For example, start/stop detector 405 can recognize one or more headers or footers in signal 125.

Start/stop detector 405 can be connected to input 110. Start/stop detector 405 outputs indications 410 of the beginning and end of data transmission in signal 125 to event generator 215 and to other portions of time encoder 105 (e.g., to event generator 215). Event generator 215 can generate beginning and end events (e.g. as part of events 295) in response to the indications output by start/stop detector 405. A beginning event is an event that occurs at a time that demarcates the beginning of data output in results 290 and allows the timing of a first interval and a first data event to be determined. An end event is an event that occurs at a time that demarcates the end of data output in results 290. In some implementations, one or both of beginning events and end events can be used to reset time-dependent processes, as described further below. The beginning and end events generated by event generator 215 are output as events 295 and provided to output 115.

The indications of the beginning and end of data transmission in signal 125 output by start/stop detector 405 can be conveyed to and used by other portions of time encoder 105 to time the output of beginning events, end events, and data events by event generator 215. For example, one or more of clock 225, counter 230, and interval reset 235 can be disabled for an interval that is associated with a beginning event (e.g., to allow for the processing/disregarding of a header in the information 120). As another example, the progression of timing selector 240 from digit to digit or the detection of states by state detector 205 can be disabled for an interval that is associated with a beginning event.

Figure 5:
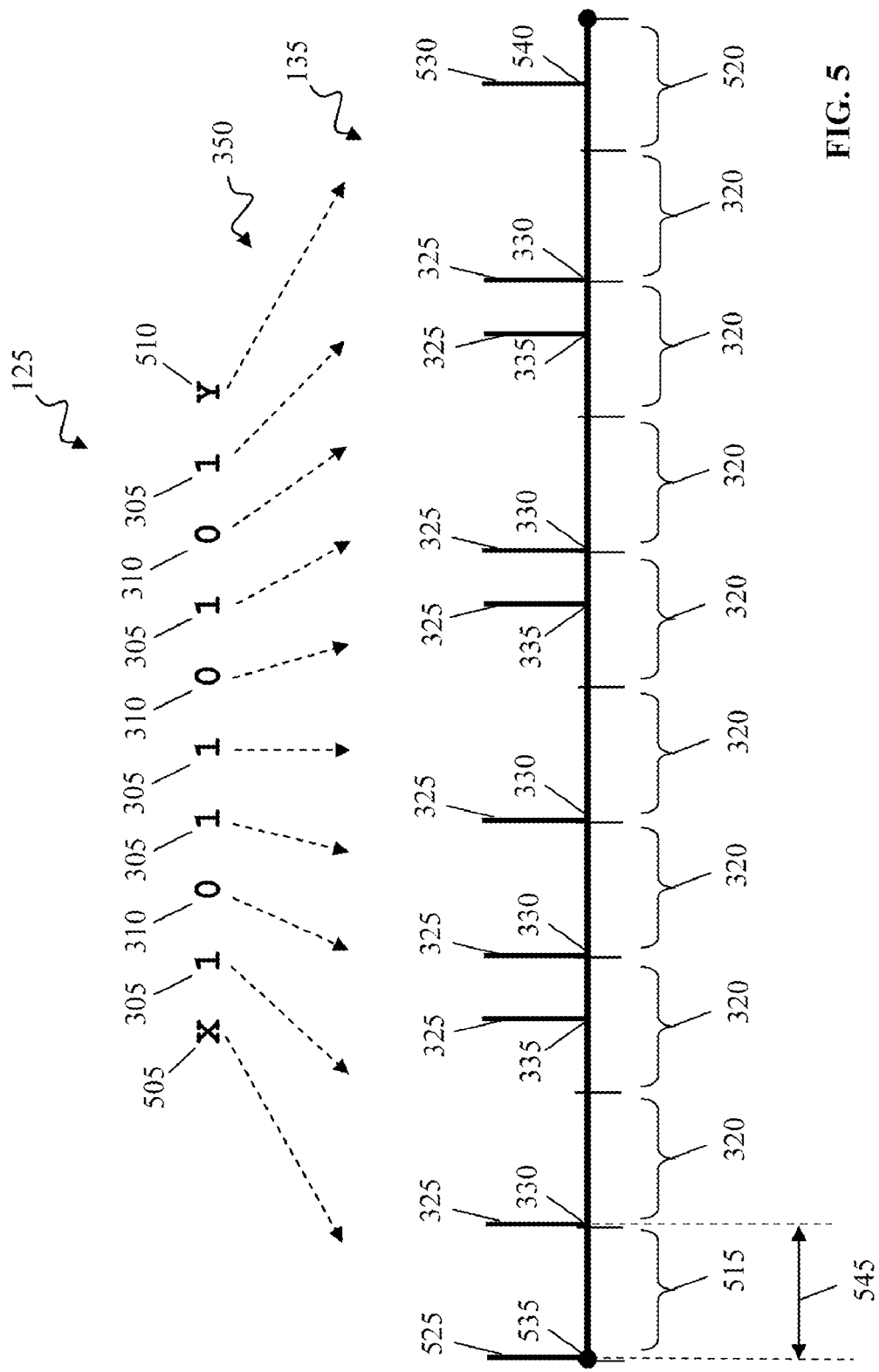
FIG. 5 is a schematic representation of time encoding with a time encoder that detects the beginning and end of data transmission in a signal.

FIG. 5 is a schematic representation of time encoding with a time encoder that detects the beginning and end of data transmission in a signal. For example, the illustrated time encoding can be performed by a time encoder such as time encoder 105 that includes a start/stop detector 405 (FIG. 4). In the illustrated implementation, signal 125 includes a header 505 (illustrated as an "X") and a footer 510 (illustrated as a "Y"). Header 505 and footer 510 thus frame information 120 within signal 125.

Time encoding encodes information 120 into time-based code signal 135, as described above referring to FIG. 3. Time-based code signal 135 includes header interval 515 and a footer interval 520. Header interval 515 includes a header event 525 that occurs at a time 535 within header interval 515. Footer interval 520 includes a footer event 530 that occurs at a time 540 within footer interval 520. Header interval 515 and header event 525 demarcate the start of time-based code signal 135. Footer interval 520 and footer event 530 demarcate the end of time-based code signal 135. The demarcation of the start of time-based code signal 135 can be used to determine the timing of the first event 325 within the first interval 320. For example, the first event 325 occurs a time 545 after the header event 525. The timing of the first event 325 within the first interval 320 can be determined using the duration of interval 515 and time 545. For example, in implementations where the duration of interval 515 is the same at intervals 320, the detection of event 525 can be used as a reset signal to reset an interval.

In the illustrated implementation, events 525, 530 are pulses that transition from baseline state 340 to high state 345 and then return to the baseline state 340. In some implementations, the shapes of events 525, 530 can be indistinguishable from one another and from the shapes of data events 325. In these implementations, events 325, 525, 530 can be distinguished only by virtue of their timing and position. For example, event 525 can be recognized as the first event. In some implementations, intervals 515, 520 both have the same duration as each other and as time intervals 320.

Figure 6:
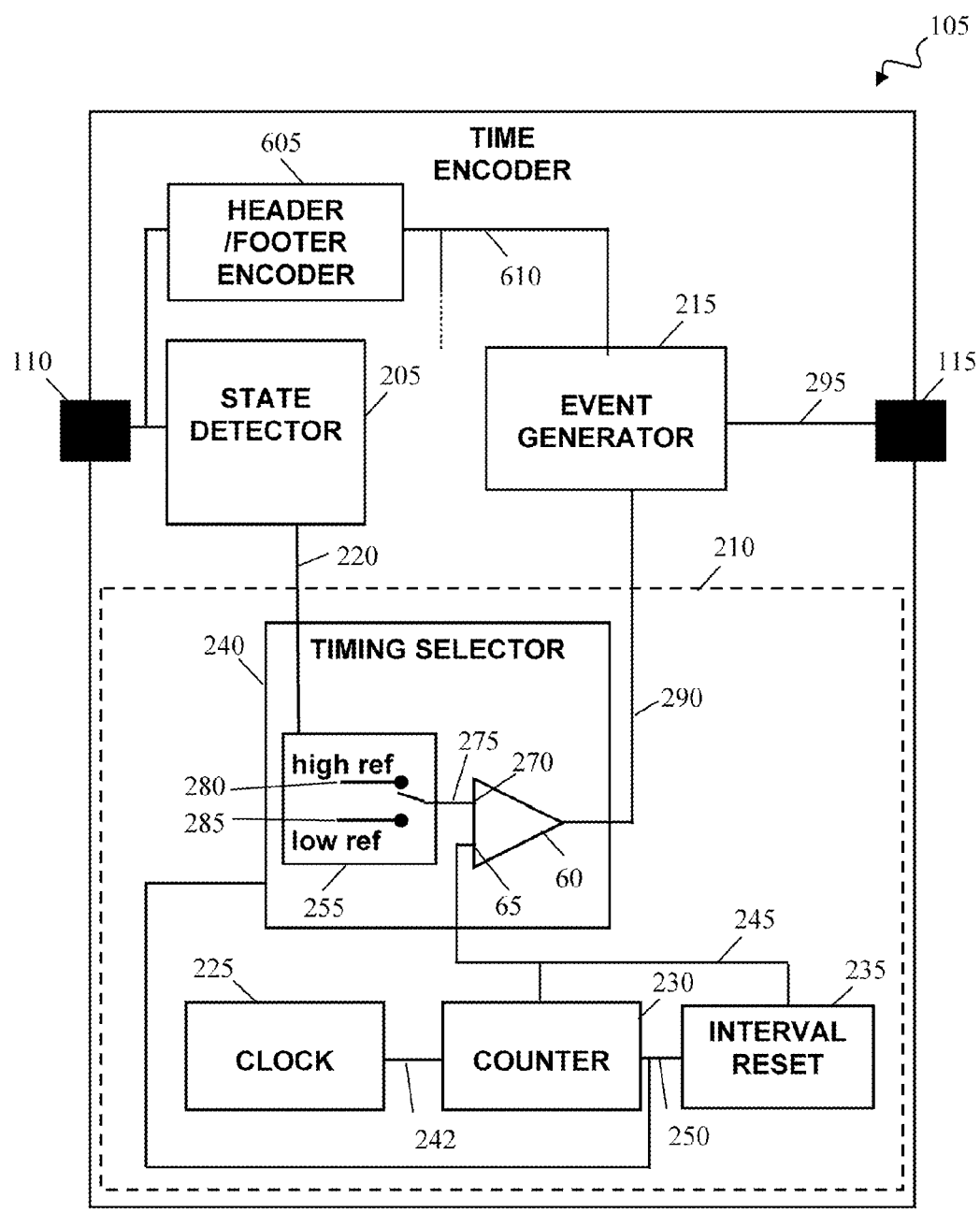
FIG. 6 is a schematic representation of another implementation of a time encoder.

FIG. 6 is a schematic representation of another implementation of time encoder 105. In addition to state detector 205, event timing circuit 210, and event generator 215, the illustrated implementation of time encoder 105 also includes a header/footer encoder 605. Header/footer encoder 605 is a component that is configured to encode a header located at the beginning of data transmission in signal 125, and a footer located at the end of data transmission in signal 125, or both with information. In some implementations, the information with which a header or a footer is encoded can be received, e.g., in the header or footer of signal 125. For example, header/footer encoder 605 can encode a header or footer with information that identifies the signal received at input 110 or with information that characterizes aspects of the signal received at input 110. For example, the signal received at input 110 can be identified according to, e.g., the source and destination of the received signal, the type of information in the received signal, and the relationship between the received signal and other signals. Aspects of the received signal that can be characterized include the location of a floating point within the received signal, the sign of a number within the received signal, and error-checking information. Header/footer encoder 605 can encode a header or a footer with such information by triggering the introduction of one or more events into a header or a footer region associated with the input signal 125.

Header/footer encoder 605 can be connected to input 110. Header/footer encoder 605 outputs one or more signals 610 that identify or characterize information in the header or footer and provides the signals 610 to event generator 215. Event generator 215 can generate events that are timed to occur within the header or footer of signal 125 in response to the indications output by header/footer encoder 605. The events 295 generated by event generator 215 are provided to output 115.

In some implementations, the identifying or characterizing information in signals 610 can also be output to other portions of time encoder 105. This information can be used in a variety of ways including, e.g., error checking and triggering and/or resetting the demarcation of intervals and the generation of data events.

Figure 7:
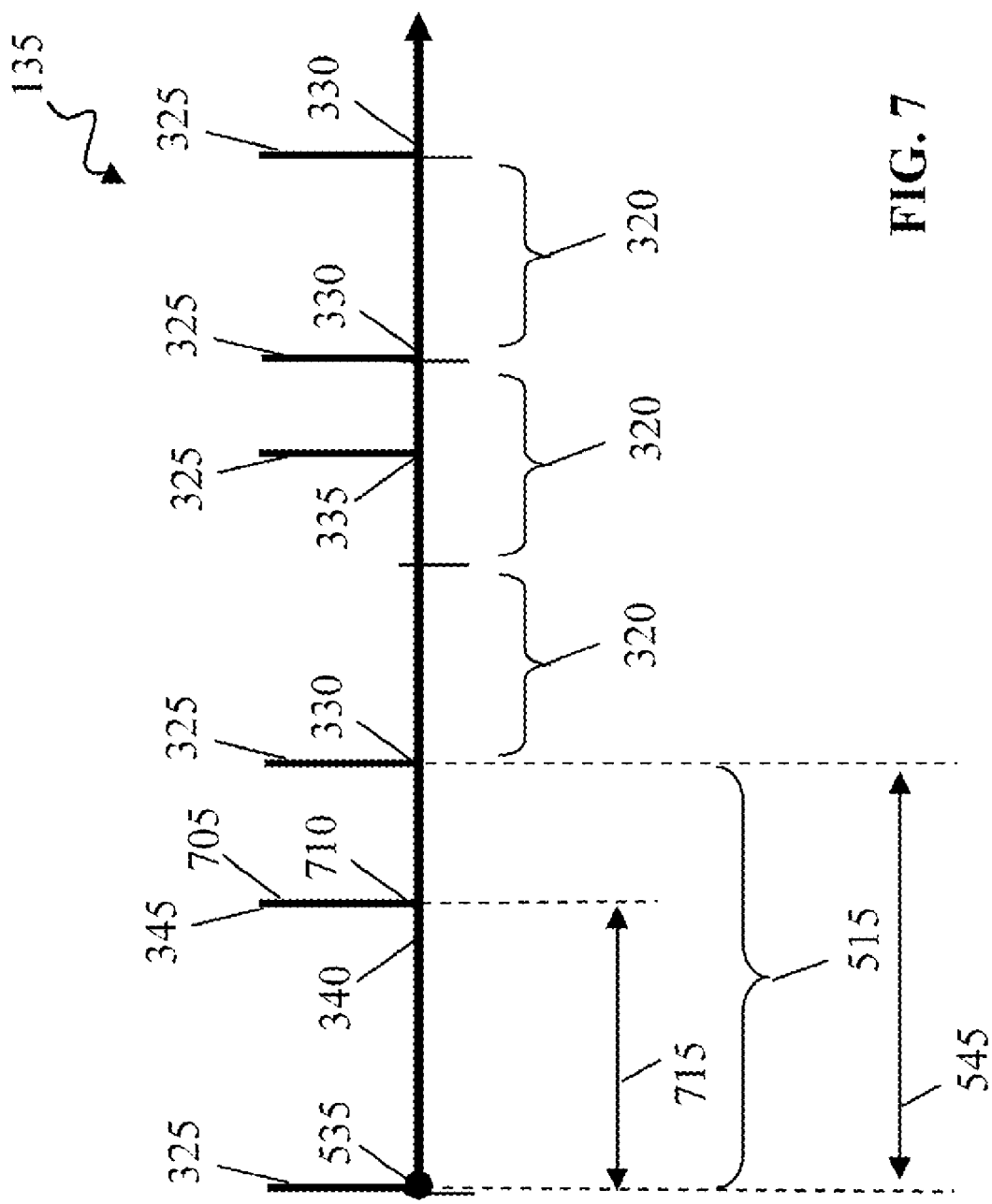
FIG. 7 is a schematic representation of encoding a header at the beginning of data transmission in a signal.

FIG. 7 is a schematic representation of encoding a header at the beginning of data transmission in a signal. For example, the illustrated encoding can be performed by a time encoder such as time encoder 105 that includes a header/footer encoder 605 (FIG. 6). The information can be encoded by one or more events that occur within header interval 515 or footer interval 520 in signal 135.

In the illustrated implementation, header interval 515 includes a header event 705. Header event 705 occurs at a time 710 within header interval 515. The timing of header event 705 within header interval 515 can be determined, for example, by measuring time span 710 between time 535 and time 710.

In some implementations, header interval 515 can itself be divided into multiple subintervals, each of which can include one or more informational events. Different subintervals can be assigned to encode different identifying and characterizing information. For example, a first subinterval can include an event, the timing of which indicates whether a number encoded in signal 135 is positively or negatively signed. As another example, a collection of subintervals can include informational events, the timing of which indicate the position of the information encoded in signal 135 within a larger collection of information (e.g., after segmentation, as described further below).

In the illustrated implementation, header event 705 is a pulse that transitions from baseline state 340 to high state 345 and then returns to the baseline state 340. In some implementations, the shapes of header events 705 can be indistinguishable from one another, from the shapes of events 525, 530, and from the shapes of data events 325. In these implementations, events 705, 325, 525, 530 can be distinguished only by virtue of their timing and position.

In some implementations, a footer at the end of data transmission in a signal can be encoded with one or more informational events. In some implementations, both a header and a footer can be encoded with one or more informational events.

Figure 8:
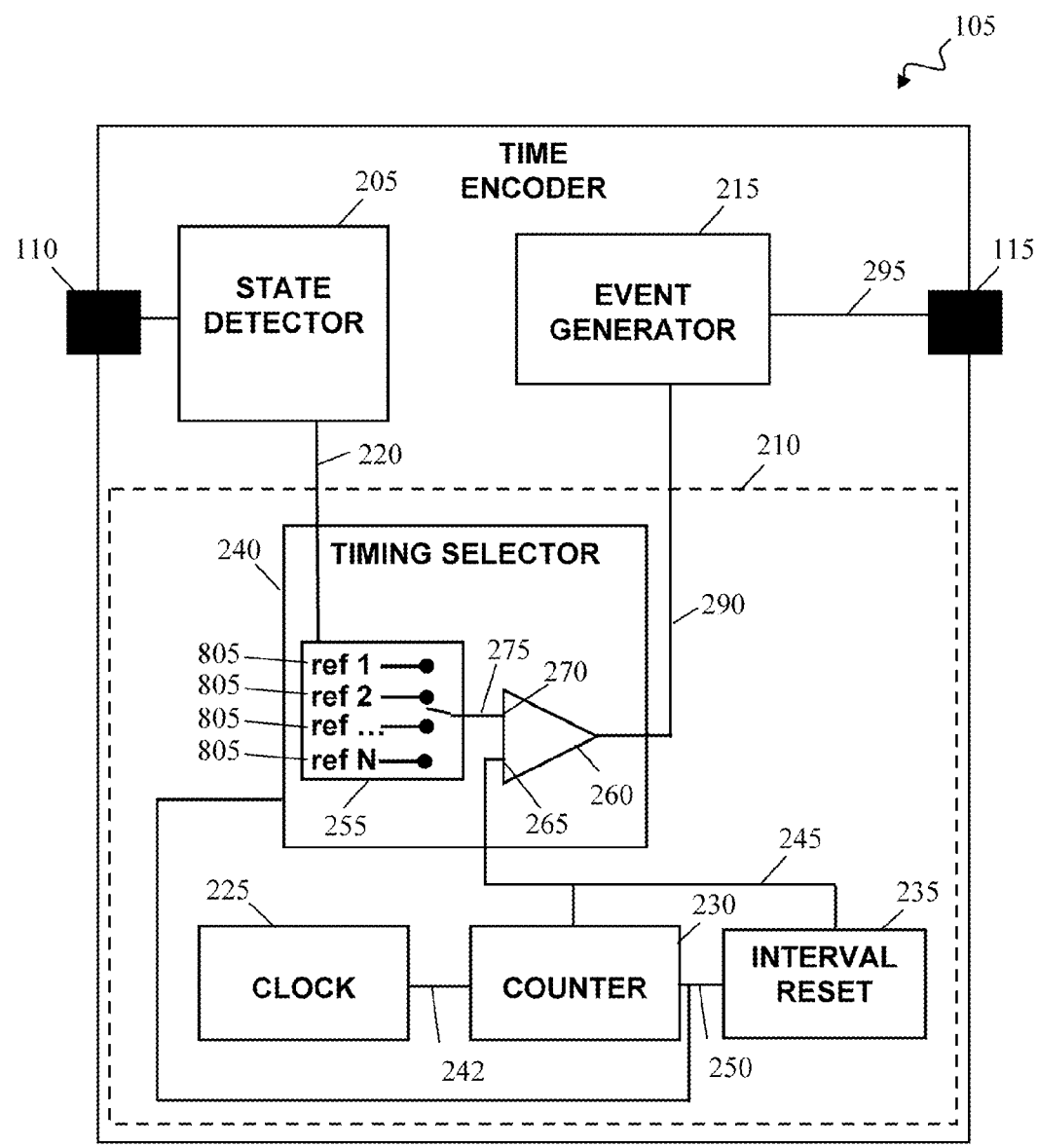
FIG. 8 is a schematic representation of another implementation of a time encoder.

FIG. 8 is a schematic representation of another implementation of time encoder 105. The illustrated implementation of time encoder 105 includes a state detector 205 and an event timing circuit 210 that are adapted for operation with signals 125 that encode information with digits having more than two possible states. For example, signal 125 can encode information in quaternary or decimal digits.

State detector 205 is configured to detect the states of digits in signal 125 and convey indications of the detected states to event timing circuit 210. Event timing circuit 210 includes a timing selector 240 that is connected to receive these indications and configure switch 255 in response. In particular, switch 255 includes a collection of more than two references 805 that each are associated with respective states (i.e., times within an interval at which events representing a corresponding state of the digits in signal 125 is to occur). For example, the first reference 805 can be associated with a first time within an interval, the second reference 805 can be associated with a second time within an interval, and the N'th reference 805 can be associated with the N'th time within an interval.

Switch 255 is configured to apply the appropriate reference 805 to input 270 of comparator 260 in response to the indications of the states detected by state detector 205. Comparator 260 compares the count of the clock signal output by counter 230 to the appropriate reference 805 and outputs results 290 of the comparisons. The various states of the digits in signal 125 thus result in transitions occurring at distinguishable times within corresponding time intervals, with the timing of these transitions set by references 805.

Figure 9:
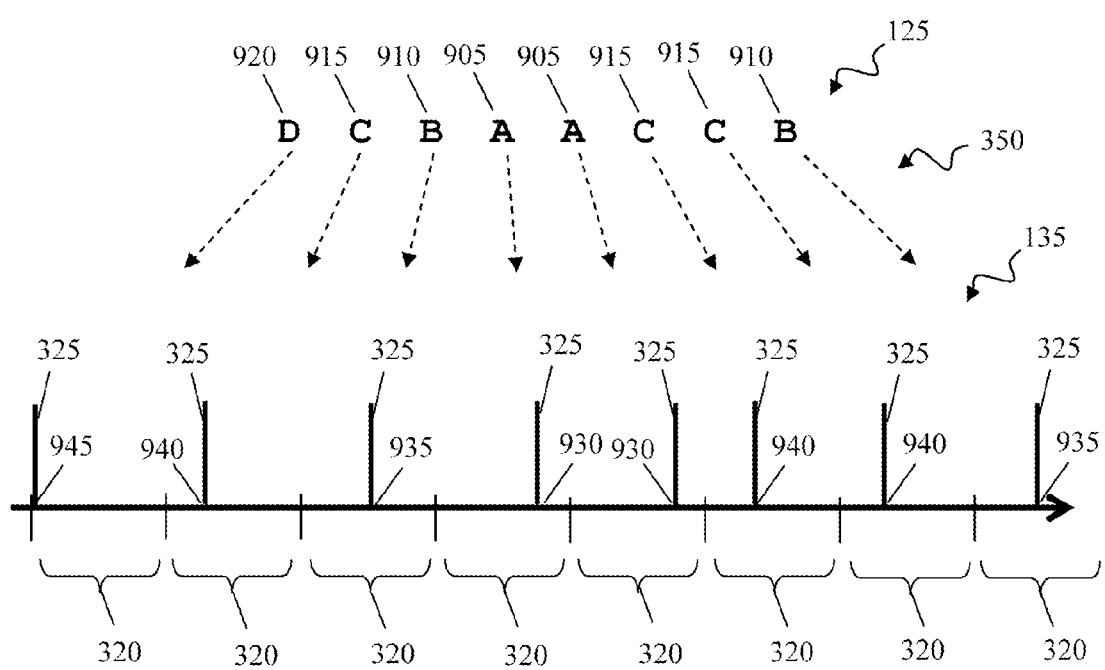
FIG. 9 is a schematic representation of time encoding of a signal that includes more that two states.

FIG. 9 is a schematic representation of time encoding of a signal that includes digits having more that two possible states. The illustrated time encoding can be performed by a time encoder such as time encoder 105 (FIG. 8). In the illustrated implementation, information 120 is expressed in signal 125 using digits having four different possible states, namely a digits 905 having a first state (i.e., "A's"), digits 910 having a second state (i.e., "B's"), digits 915 having a third state (i.e., "C's"), and digits 920 having a fourth state (i.e., "D's"). In other implementations, information 120 can be expressed in digits having a different number of possible states (e.g., digits having 10 different possible states that express information 120 in decimal) or in digits having a very large number of possible states or a continuous continuum of possible (e.g., a nearly analog or analog continuum of possible states). In some implementations, digits having four possible states can be used to express genetic information and represent four nucleic acids.

Time encoding encodes information 120 into a time-based code signal 135. Time-based code signal 135 includes a collection of time intervals 320, each of which corresponds to a digit 905, 910, 915, 920 within signal 125. Each time interval 320 includes a respective data event 325. The timing of data events 325 within individual time intervals 320 indicates the state of digits 905, 910, 915, 920 corresponding to that time interval 320. For example, in the illustrated implementation, data events 325 in intervals 320 corresponding to digits 905 of the first state occur at times 930 near the end of intervals 320. Data events 325 in intervals 320 corresponding to digits 910 of the second state occur at times 935 near the middle of intervals 320. Data events 325 in intervals 320 corresponding to digits 915 of the third state occur at times 940 before the middle of intervals 320. Data events 325 in intervals 320 corresponding to digits 920 of the fourth state occur at times 945 near the beginning of intervals 320. Times 930, 935, 940, 945 are distinguishable from one another.

In other implementations, a time encoder can be implemented as digital circuitry that receives as an input a sequence of symbols from a predetermined set of symbols and produces as output a time encoded output signal, in which each time interval in the time encoded output signal includes a single pulse at a time within the interval determined by the corresponding input symbol. The digital circuitry can be controlled by a programmed computer, or include an embedded computer. In some implementations, each input symbol is mapped to a unique character having a length in binary digits (i.e., bits) N that is the same as the number of different possible input symbols, and where all the bits are the same except one, so that the position of the distinct bit in the character identifies the symbol to which the character corresponds. The input sequence of symbols is thus mapped to an input sequence of characters, which can be input into a shift register. The output of the shift register is clocked so that N bits appear in every time interval 320. This output is coupled to a pulse generator so that the appearance of the distinct bit causes an output pulse to be generated at the output of the time encoder. In some such implementations, the time encoder includes circuitry that transforms an analog input signal into a sequence of symbols. If headers, footers, and synching is desired in the output signal, the corresponding input symbols can be added as a prefix or postfix, as the case may be, to the actual signal to be transmitted, in accordance with a convention or protocol adopted by the encoder and the downstream decoders.

Figure 10:
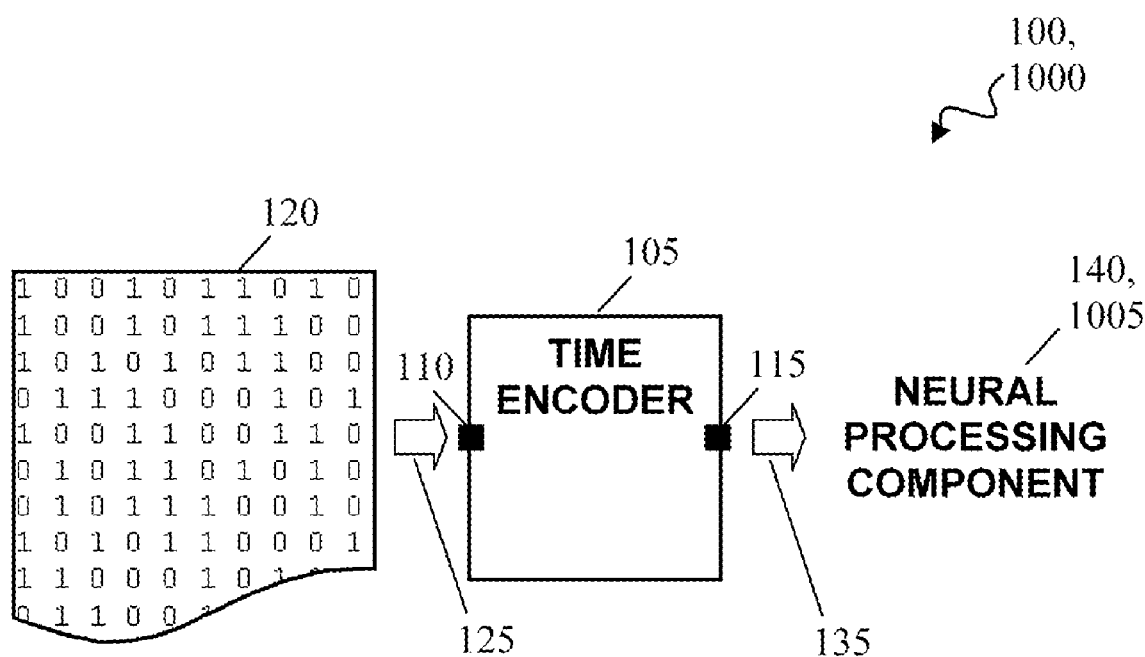
FIG. 10 is a schematic representation of an implementation of a system in which information can be encoded.

FIG. 10 is a schematic representation of an implementation of system 100, namely, a system 1000 in which information can be encoded. System 1000 includes a neural processing component 1005 to which signal 135 is transmitted from time encoder 105. Neural processing component 1005 is a component constructed of neural tissue or having a design inspired by the design and function of neural tissue. Thus, neural processing component 1005 can be implemented using "wet" nerves and other neural components (e.g., as a biological neural network or the brain or other neural tissue of a living organism) or neural processing component 1005 can be implemented using semiconductor devices (e.g., as an artificial neural network implemented using hardware or software). In some implementations, combinations of semiconductor devices and wet neural components can implement neural processing component 1005.

As shown, time encoder 105 outputs signal 135, which includes timed events, to neural processing component 1005. In implementations where neural processing components 1005 are implemented using "wet" neural components, the properties of signal 135 can be tailored for compatibility with wet neural components. For example, events within signal 135 can be tailored to mimic the amplitude and time characteristics of action potentials.

In some implementations, neural processing component 1005 can include multiple elements that receive signal 135. For example, in neural processing components 1005 implemented using "wet" neural components, multiple nerves can receive signal 135. As another example, in neural processing components 1005 implemented using semiconductor components, multiple neural network inputs can receive signal 135.

In operation, time encoder 105 can encode the information 120 in signal 125 into a form that is understood by neural processing component 1005, namely, signal 135 with events timed to occur at distinguishable times within intervals in a sequence of intervals. Time encoder 105 can thus act as an interface between binary (and other) digital data processing and the statistical processing and pattern recognition provided in neural processing component 1005. For example, time encoder 105 can be included in a neural prosthesis that stimulates nerves with, e.g., auditory, visual, or other sensory information encoded in signal 135.

Figure 11:
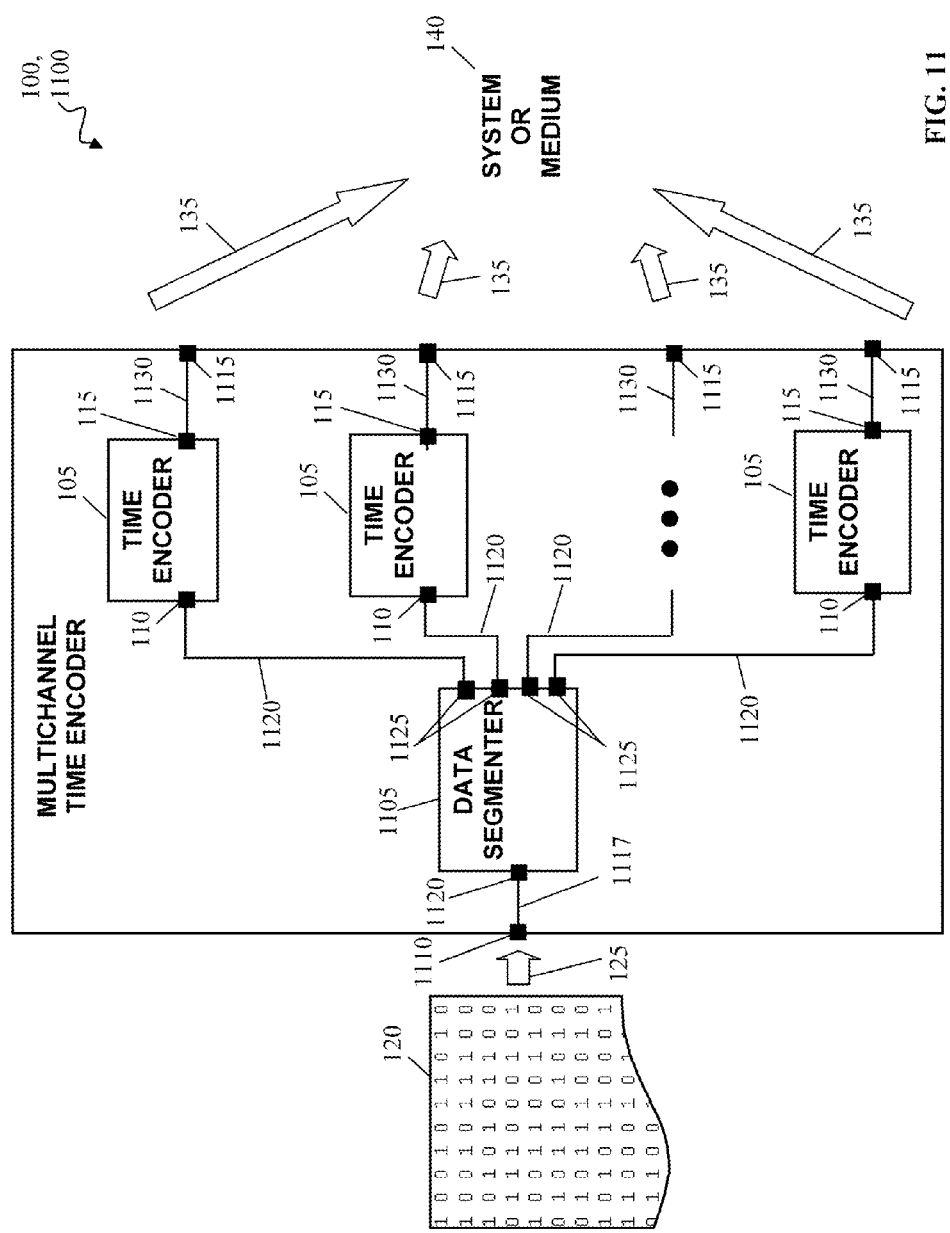
FIG. 11 is a schematic representation of an implementation of a multichannel encoder.

FIG. 11 is a schematic representation of an implementation of system 100, namely, one including a multichannel encoder 1100 in which information can be encoded. System 1100 includes a collection of time encoders 105, a data segmenter 1105, an input 1110, and a collection of one or more outputs 1115.

Input 1110 receives information 120 in a signal 125 on a data communication path. Input 1110 provides a signal 1117 that conveys information in signal 125 to an input 1120 of data segmenter 1105. Data segmenter 1105 is a component that divides (or "fragments") a signal into smaller units. Data segmenter 1105 includes an input 1120 and one or more outputs 1125.

Data segmenter 1105 divides the relatively large collection digits in signal 125 into a collection of smaller collection of digits that each represent a proper subset of information 120. In some implementations, the segments can be a contiguous portion of the digits in signal 125. In other implementations, the segments can include non-contiguous digits. In the illustrated example, the signal 125 received by data segmenter 1105 represents information 120 in an ordered, finite set of discrete digits, e.g., a collection of bits. Data segmenter 1105 divides signal 125 into a collection of smaller segments that each represents a proper subset of information 120 in an ordered, finite set of discrete digits. Data segmenter 1105 provides the segments 1120 from one or more outputs 1125 to inputs 110 of corresponding time encoders 105. Each time encoder 105 encodes the information in a received segment by timing the occurrence of events within time intervals of a respective output signal 135. The timing of events within the intervals in each output signal 135 represents all of the discrete digits within each segment.

Time encoder 105 outputs respective output signals 135 from outputs 1115 of multichannel encoder 1100. In some implementations, output signals 135 are provided to the a single system or medium 140 at a same time. For example, in implementations where the time-based code of output signals 135 each include a header interval 515 and header event 525, header events 525 in the respective output signals occur at the same moment in time. System or medium 140 can include a collection of inputs, each of which is connected to a corresponding output 1115 to receive a corresponding output signal 135, as described further below.

In operation, data segmenter 1105 receives signal 125 on input 1120. Data segmenter 1105 performs a data segmentation process on signal 125 and generates a collection of segments. The segments are each input into a respective input 110 of a time encoder 105. Each time encoder 105 encodes the information in the respective segment by expressing the information with events timed to occur at distinguishable times within different intervals. Each time encoder 105 outputs a respective signal 135 which conveys signal 135 to outputs 1115 of the multichannel encoder 1100 and to system or medium 140.

Figure 12:
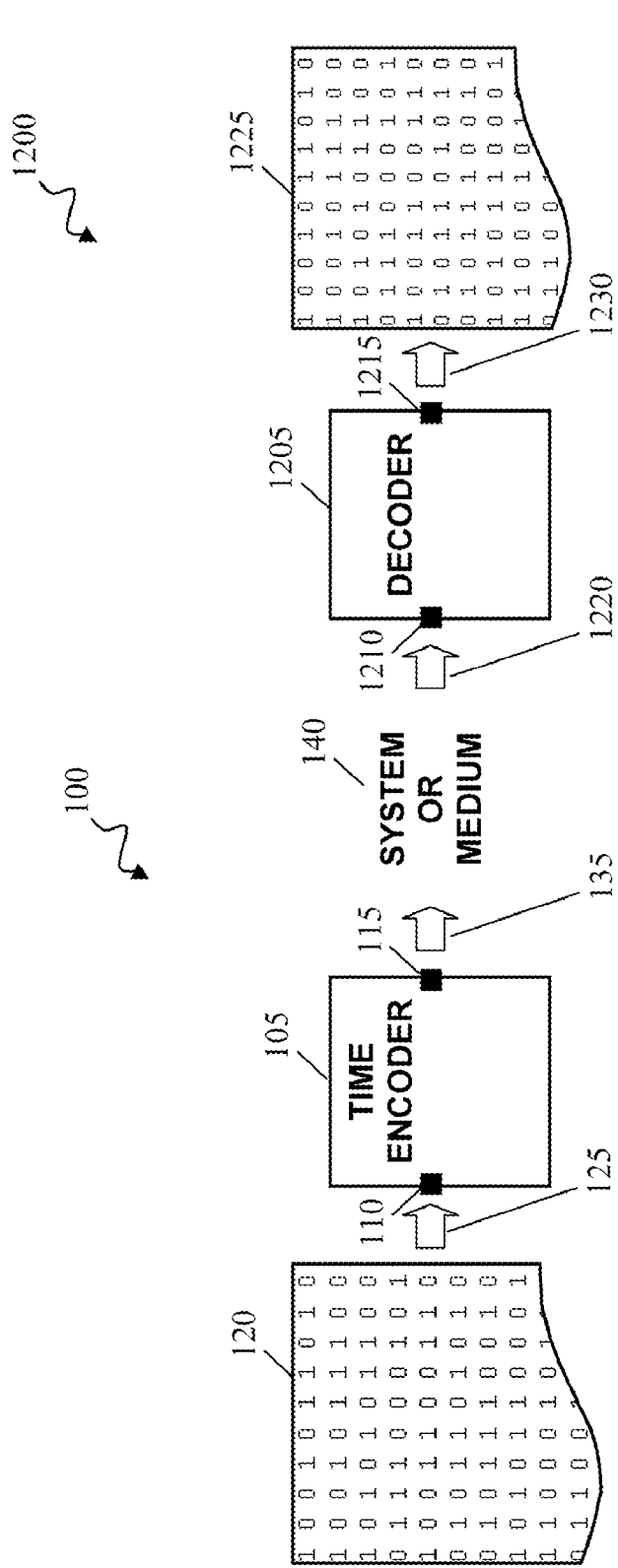
FIG. 12 is a schematic representation of a system in which information can be encoded, compressed, and stored/transmitted and then accessed/received, decoded and uncompressed.

FIG. 12 is a schematic representation of a system 1200 in which information can be encoded, compressed, and stored/transmitted and then accessed/received, decoded and uncompressed. System 1200 can include one or more of the implementations of system 100 described above, as well as a decoder 1205 that includes an input 1210 and an output 1215. Input 1210 and output 1215 are physical structures through which signals are respectively received into and transferred out of decoder 1205. Decoder 1205 is a component that decodes a signal in which information is encoded by the timing of the occurrence of events within time intervals. Decoder 1205, in effect, translate, a time-based signal in which the timing of events within intervals represents the information content into an output format that represents that information in an ordered, finite set of discrete digits.

Input 1210 of decoder 1205 can be connected to receive a signal 1220 in which information is encoded by the timing of the occurrence of events within time intervals. Signal 1220 can be output from system or medium 140 onto a data communication path. The exact nature of information transfer from system or medium 140 to decoder 1205 via signal 1220 depends on the operational context of system 1200. For example, if system 1200 is part of a data transmission system, system or medium 140 can include a data transmitter that outputs signal 1220 to a data receiver in decoder 1205. As another example, if system 1200 is part of a data storage system, decoder 1205 can include, e.g., a read head that can read information from a data storage medium 140. Signal 1220 can be conveyed, e.g., on a wired or wireless data communication path.

After translation into an output format, decoder 1205 outputs a signal 1230 that includes the decoded information 1225. The decoded information 1225 can be expressed in an ordered, finite set of discrete digits, e.g., in binary digits as a series of high and low states, as shown. Output 1215 can be of the form of one or more serial or parallel binary data ports.

In operation, decoder 1205 receives signal 1220 from system or medium 140 on input 1210. Signal 1220 expresses information with events timed to occur at distinguishable times within different intervals. Decoder 1205 decodes information 1225 and outputs signal 1230 that includes the decoded information 1225.

Decoder 1205 can be used in conjunction with other devices, outside of system 1200. For example, decoder 1205 can be used as time-based decoder 41 (FIG. 1A).

Figure 13:
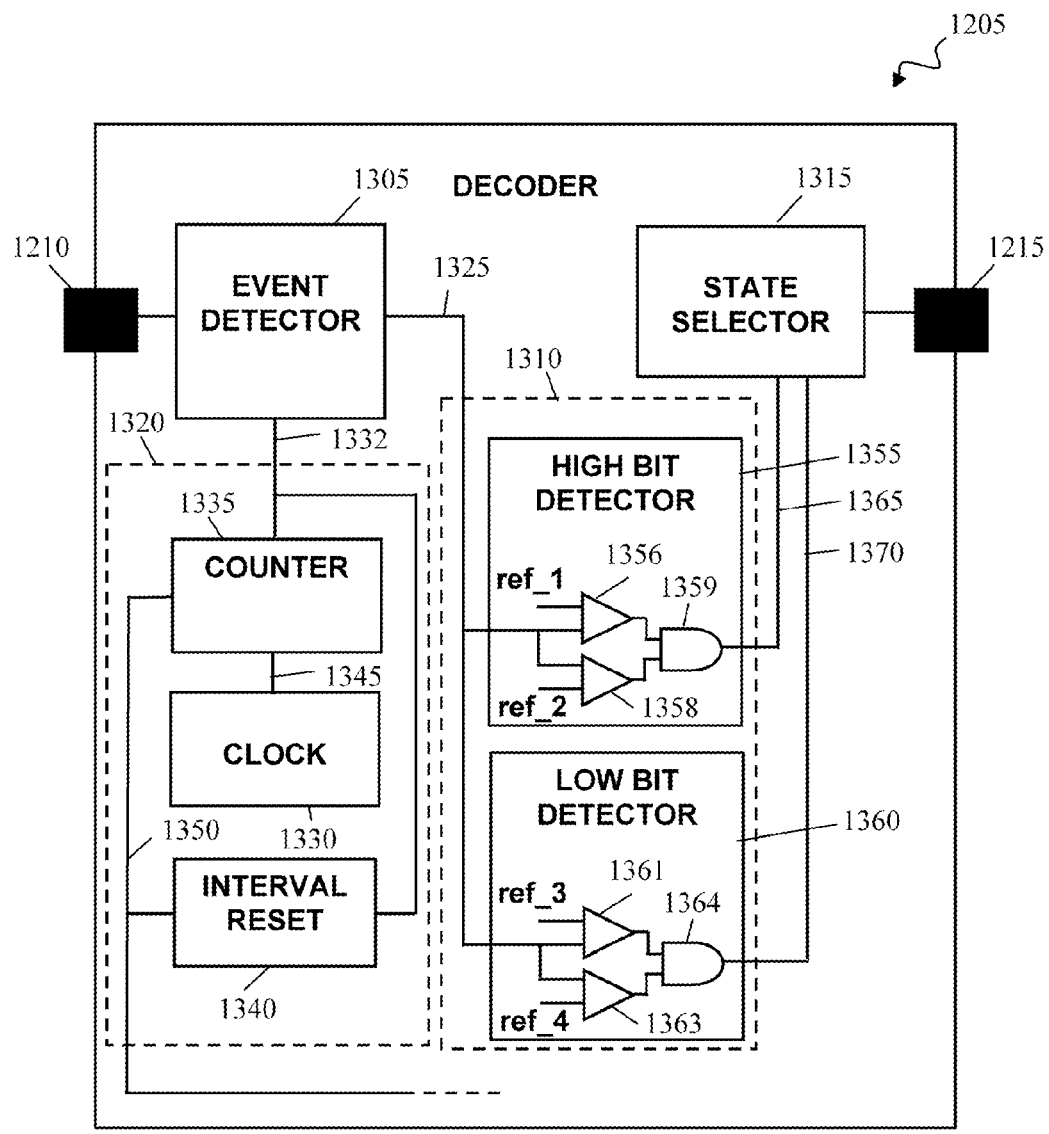
FIG. 13 is a schematic representation of an implementation of decoder.

FIG. 13 is a schematic representation of an implementation of decoder 1205. The illustrated implementation of decoder 1205 includes an event detector 1305, a time-to-state translator circuit 1310, and a state selector circuit 1315. While reference is made to circuits, one or more of the components of the decoder can be implemented in firmware or software. Event detector 1305 is a component that can detect events—and their timing—in signal 1220. The structure of event detector 1305 can reflect the nature of events in signal 1220.

For example, when the events in signal 1220 are pulses, event detector 1305 can be a pulse detector. Event detector 1305 is connected to receive signal 1220 from input 1210 and a signal indicative of the time within an interval 1325 from an interval timing circuit 1320. Event detector 1305 is connected to output the times 1325 within intervals at which events are detected.

Interval timing circuit 1320 includes a clock 1330, a counter 1335, and an interval reset 1340. Clock 1330 provides an output clock signal 1345 to counter 1335 which in turn produces a dynamic count 1332 of the clock signal. The dynamic count 1332 is provided to both event detector 1305 and to interval reset 1340. Interval reset 1340 can include a comparator (not shown) that compares the dynamic count of the clock signal with a threshold count representative of an interval duration. Such a comparison can determine when an interval has passed. Interval reset 1340 provides as an output a reset signal 1350 to counter 1335. Counter 1335 is reset in response to the reset signal 1350. The resetting of counter 1335 demarcates intervals of a duration of the threshold count.

The reset signal 1350 output by interval reset 235 can be conveyed to and used by other portions of decoder 1205 to time, e.g., the translation of events by time-to-state translator 1310 and selection and output of digits by state selector 1315. For example, time-to-state translator 1310 can include one or more switches that reset translations and the output of the results of translations in response to the reset signal 1350. As another example, state selector 1315 can trigger off of the reset signal 1350 to ensure that a single digit is selected and output for each interval.

In response to detection of an event, event detector 1305 outputs an indication of the time within an interval 1325 at which an event is detected. These indications are received by time-to-state translator 1310. In the implementation shown, time-to-state translator 1310 includes a high bit detector 1355 and a low bit detector 1360 that are both connected to receive the indications of the times within intervals at which events are detected.

In some implementations, high bit detector 1355 includes a pair of comparators 1356, 1358 and an AND gate 1359. Comparator 1356 is connected to compare the times within intervals at which events are detected to a first reference ref_1. Comparator 1358 is connected to compare the times within intervals at which events are detected to a second reference ref_2. References ref_1, ref_2 are thresholds that indicate the earliest and latest times within an interval at which a detected event is considered to be in a first state (e.g., a high bit). If a bit is detected at a time that is after the time indicated by ref_1 and before the time indicated by ref_2, the outputs of both comparators 1356, 1358 are set. AND gate 1359 also produces an output 1365 (e.g., a high signal) indicating that the timing of the event detected by event detector 1305 is within an interval.

In the implementation shown, low bit detector 1360 includes a pair of comparators 1361, 1363 and an AND gate 1364. Comparator 1361 is connected to compare the times within intervals at which events are detected to a first reference ref_3. Comparator 1363 is connected to compare the times within intervals at which events are detected to a second reference ref_4. References ref_3, ref_4 are thresholds that indicate the earliest and latest times within an interval at which a detected event is considered to be in a second state (e.g., a low bit). If an event is detected at a time that is after the time indicated by ref_3 and before the time indicated by ref_4, the outputs of both comparators 1361, 1363 are set.

AND gate 1364 also provides an output 1370 indicating that the timing of the event detected by event detector 1305 is within an interval.

State selector 1315 is a component that is configured to select the states of digits for output in signal 1230 on output 1215. In some implementations, the digits can be binary bits. State selector 1315 is connected to receive the translations (i.e., outputs 1365, 1370). Based on the received translations, state selector 1315 outputs state information 1215. The digits can be output in parallel or in series.

In operation, event detector 1305 receives signal 1220 in which information 1225 is encoded by the timing of the occurrence of events within time intervals. Event detector 1305 detects the timing of the events within their respective intervals and outputs a description of that timing 1325. Time-to-state translator circuit 1310 translates times within an interval to the discrete digits to be output from decoder 1205 in signal 1230 by comparing the times at which events were detected by event detector 1305 to the times allocated to the states. In particular, events detected within a first range of times defined by references ref_1, ref_2 result in set signals on output 1365. Events detected within a second range of times defined by references ref_3, ref_4 result in set signals on output 1370. State selector circuit 1315 receives the results of those comparisons and selects states of digits for output onto output 1215 in accordance with those results.

Figure 14:
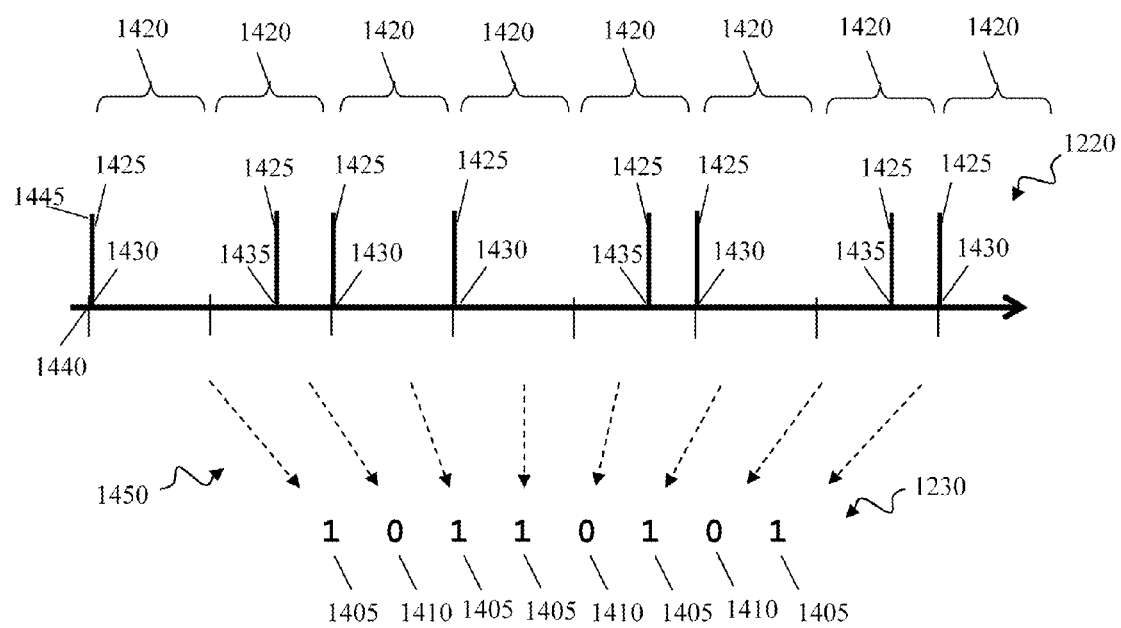
FIG. 14 is a schematic representation of a process of decoding a signal in which information is encoded by the timing of the occurrence of events within time intervals.

FIG. 14 is a schematic representation of decoding a signal in which information is encoded by the timing of the occurrence of events within time intervals. The decoding can be performed, e.g., by a decoder such as decoder 1205 (FIG. 12).

Decoding translates information encoded in time-based code signal 1220 into a signal 1230 that represents information 1225 in an ordered, finite set of discrete digits. In the illustrated implementation, information 1225 is expressed in signal 1230 in binary as a series of high binary digits 1405 (i.e., "1's") and low binary digits 1410 (i.e., "0's").

Time-based code signal 1220 includes a collection of time intervals 1420, each of which corresponds to a digit 1405, 1410 within signal 1230. Each time interval 1420 includes a respective data event 1425. The timing of data events 1425 within individual time intervals 1420 indicates the state of the digit 1405, 1410 corresponding to that time interval 1420. For example, in the illustrated implementation, data events 1425 in intervals 1420 corresponding to high state digits 1405 occur at times 1430 near the beginning of those intervals 1420. Data events 1425 in intervals 1420 corresponding to low state digits 1405 occur at times 1435 near the middle of those intervals 1420. Times 1430 are distinguishable from times 1435.

In the illustrated implementation, data events 1425 are pulses that transition from a baseline (i.e., a "resting") state 2140 to a high (i.e., an "excited") state 1445 and then return to the baseline resting state 1440. In some implementations, the initial transitions from baseline state 2140 to high state 1445 can be identified and treated as the times at which data events 1425 occur. In other implementations, the return transitions from high state 1445 to baseline state 2140 can be identified and treated as the times at which data events 325 occur. In some implementations, data event 1425 are transient pulses in that the initial and return transitions are so close in time that they are indistinguishable to, e.g., time encoder 1205. The time at which a transient data event 1425 occurs is identified based on the apparent coincident occurrence of the initial and return transition.

In some implementations, the shapes of different data events 1425 can be indistinguishable from one another and different data events 1425 can be distinguished only by virtue of their timing. Further, in some implementations, data events 1425 can be binary events in that they occur in only two possible times, namely, at a first time or at a second time within an interval.

In the illustrated implementation, time intervals 1420 all have the same duration and occur sequentially. The sequence of time intervals 1420 corresponds to the sequence of the corresponding digits 1405, 1410 in signal 1430. In other words, the first time interval 1420 (and its event 1425) of time-based code signal 1220 corresponds to the first digit 1405 in signal 1230, the second time interval 1420 (and its data event 1425) of time-based code signal 1220 corresponds to the second digit 1410 in signal 1230, and so on. This correspondence is represent by dashed arrows 1450.

Figure 15:
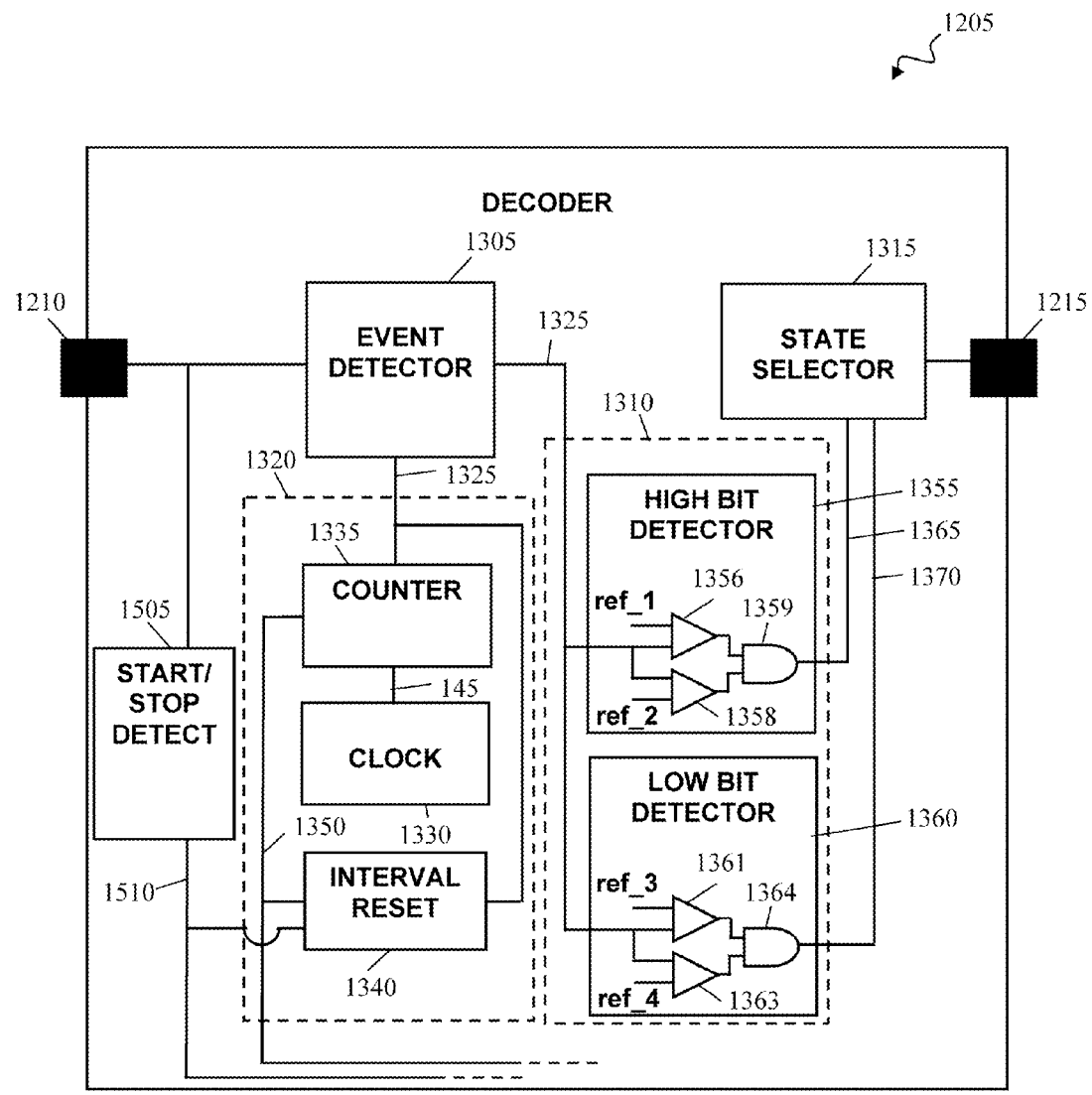
FIG. 15 is a schematic representation of another implementation of a decoder.

FIG. 15 is a schematic representation of another implementation of decoder 1005. In addition to event detector 1305, time-to-state translator circuit 1310, state selector circuit 1315, and interval timing circuit 1320, the illustrated implementation of decoder 1005 also includes a start/stop detector 1505. Start/stop detector 1505 is a component that is configured to detect one or both of the beginning and the end of data transmission in signal 1220. For example, start/stop detector 1505 can recognize one or more of a header event, a header interval, a footer event, and a footer interval in signal 1220.

Start/stop detector 1505 can be connected to input 1210 to receive signal 1220 (as shown). In some implementations, start/stop detector 1505 can detect one or both of the beginning and end of data transmission in signal 1220 by detecting beginning and end events in signal 1220. Start/stop detector 1505 outputs indications 1510 of one or both of the beginning and end of data transmission in signal 1220 to interval reset 1340 and to other portions of decoder 1205. Interval reset 1340 can reset itself—and the demarcation of intervals—in response to the indications output by start/stop detector 1505. Start/stop detector 1505 can thereby synchronize interval reset 1340 to the timing of intervals and events within signal 1220.

In some implementations, the indications of the beginning and end of data transmission in signal 1220 output by start/stop detector 1505 can be conveyed to and used by other portions of decoder 1205. For example, in some implementations, state selector 1315 can demarcate one or both of the beginning and end of signal 1220 using a header event and a footer event in response to the indications output by start/stop detector 1505.

Figure 16:
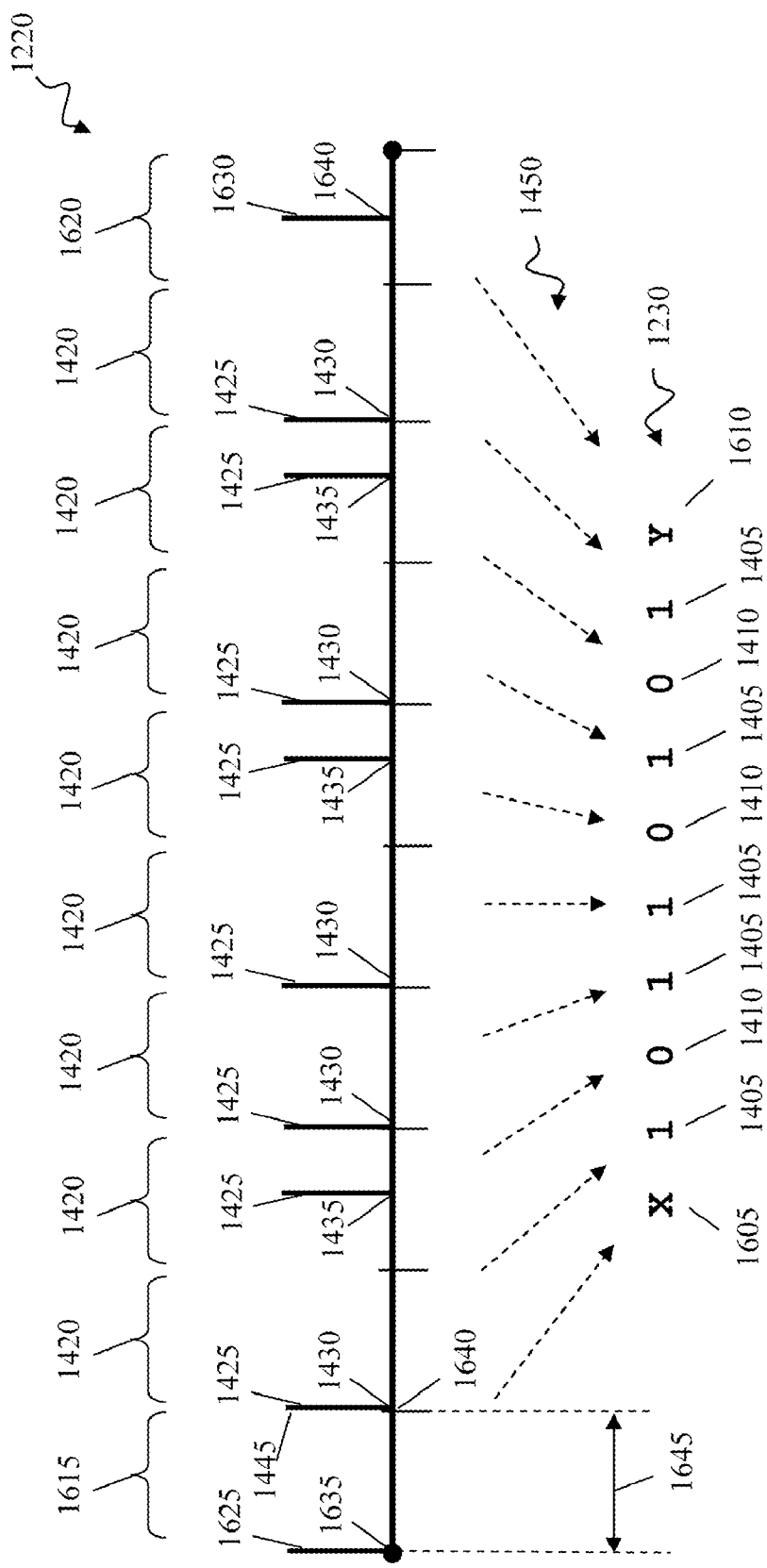
FIG. 16 is a schematic representation of decoding a signal in which information is encoded by the timing of the occurrence of events within time intervals with a decoder that detects the beginning and end of data transmission in a signal.

FIG. 16 is a schematic representation of decoding a signal in which information is encoded by the timing of the occurrence of events within time intervals with a decoder that detects the beginning and end of data transmission in a signal. For example, the illustrated decoding can be performed by a decoder such as decoder 1205 that includes a start/stop detector 1505 (FIG. 15). In the illustrated implementation, signal 1230 includes a header 1605 (illustrated as an "X") and a footer 1610 (illustrated as a "Y"). Header 1605 and footer 1610 thus frame signal 1230.

Decoding decodes time-based code signal 1220 into signal 1230, as described above referring to FIG. 14. Time-based code signal 1220 includes header interval 1615 and a footer interval 1620. Header interval 1615 includes a header event 1625 that occurs at a time 1635 within header interval 1615. Footer interval 1620 includes a footer event 1630 that occurs at a time 1640 within footer interval 1620. Header interval 1615 and header event 1625 demarcate the start of time-based code signal 1220. Footer interval 1620 and footer event 1630 demarcate the end of time-based code signal 1220. The demarcation of the start of time-based code signal 1220 can be used to determine the timing of the first event 1625 within the first interval 1620. For example, the first event 1625 occurs a time period 1645 after the header event 1625. The timing of the first event 1625 within the first interval 1620 can be determined using the duration of interval 1615 and time 1645.

In the illustrated implementation, events 1625, 1630 and 1425 are pulses that transition from baseline state 1640 to high state 1445 and then return to the baseline state 1640. In some implementations, the shapes of events 1625, 1630 can be indistinguishable from one another and from the shapes of data events 1425 and events 1425, 1625, 1630 can only be distinguished by virtue of their timing. Further, in some implementations, intervals 1615, 1620 both have the same duration as each other and as time intervals 1420.

Figure 17:
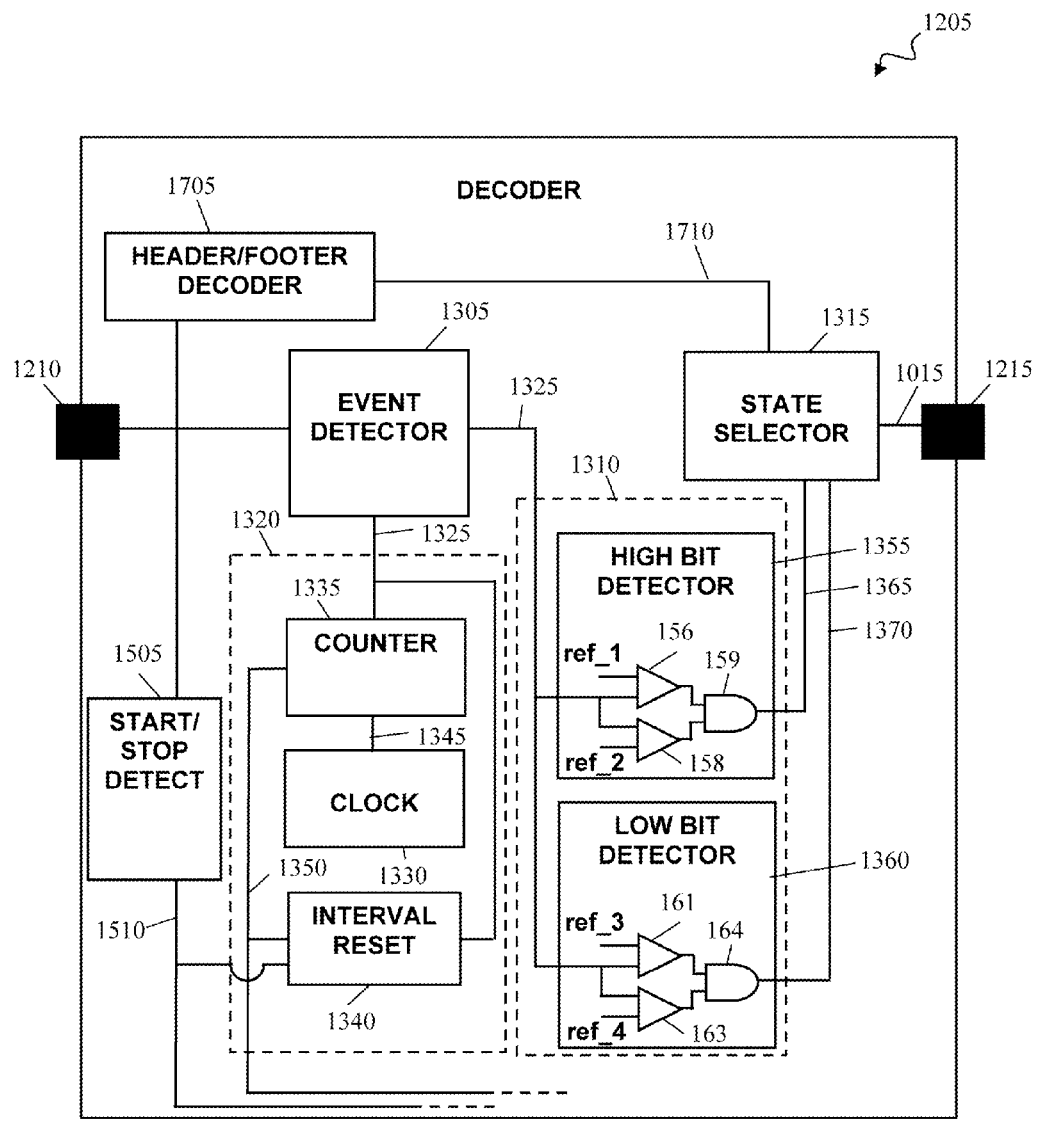
FIGS. 17 and 18 are schematic representations of other implementations of decoders.

FIG. 17 is a schematic representation of another implementation of decoder 1205. In addition to event detector 1305, time-to-state translator circuit 1310, state selector circuit 1315, interval timing circuit 1320, and start/stop detector 1305, the illustrated implementation of decoder 1005 also includes a header/footer decoder 1705. Header/footer decoder 1705 is a component that is configured to decode information encoded in the header of a signal 1220, information encoded in the footer of a signal 1220, or information encoded in both.

Header/footer decoder 1705 is connected to input 1210 to receive signal 1220 and any header events or footer events included in signal 1220. In some implementations, e.g., where the duration of header interval and footer intervals is the same as the duration of intervals 1420, header/footer decoder 1705 can be connected to receive indications 1510 of one or both of the beginning and end of data transmission in signal 1220 and to event detector 1305 to receive a dynamic count 1325 of the time within an interval of a size specified by interval reset. In implementations, e.g., where the duration of header interval and footer intervals differs from the duration of intervals 1420, header/footer decoder 1705 can be connected to the output of another interval timing circuit, include internal start/stop detection components, or otherwise determine the time at which informational events occur within a header, a footer, or both.

Header/footer decoder 1705 outputs indications of the informational content of informational events that occur within a header or a footer as an output 1710. State selector 1315 can receive the indications and output discrete digits 1015 according to the indications. For example, in some implementations, state selector 1315 can select a sequence of digits that identifies the source and destination of signal 1230, the type of information in signal 1230, and the relationship between signal 1230 and other signals.

In some implementations, the indications output by header/footer decoder 1705 can be conveyed to and used by other portions of decoder 1205. For example, error checking information can be conveyed to and used by an error checking component within decoder 1005. As another example, the indications output by header/footer decoder 1705 can be conveyed to translator circuit 1310 and used, e.g., to set the number of digits that are to be detected or to change the times within an interval at which a detected event is considered to correspond with a certain state.

Figure 18:
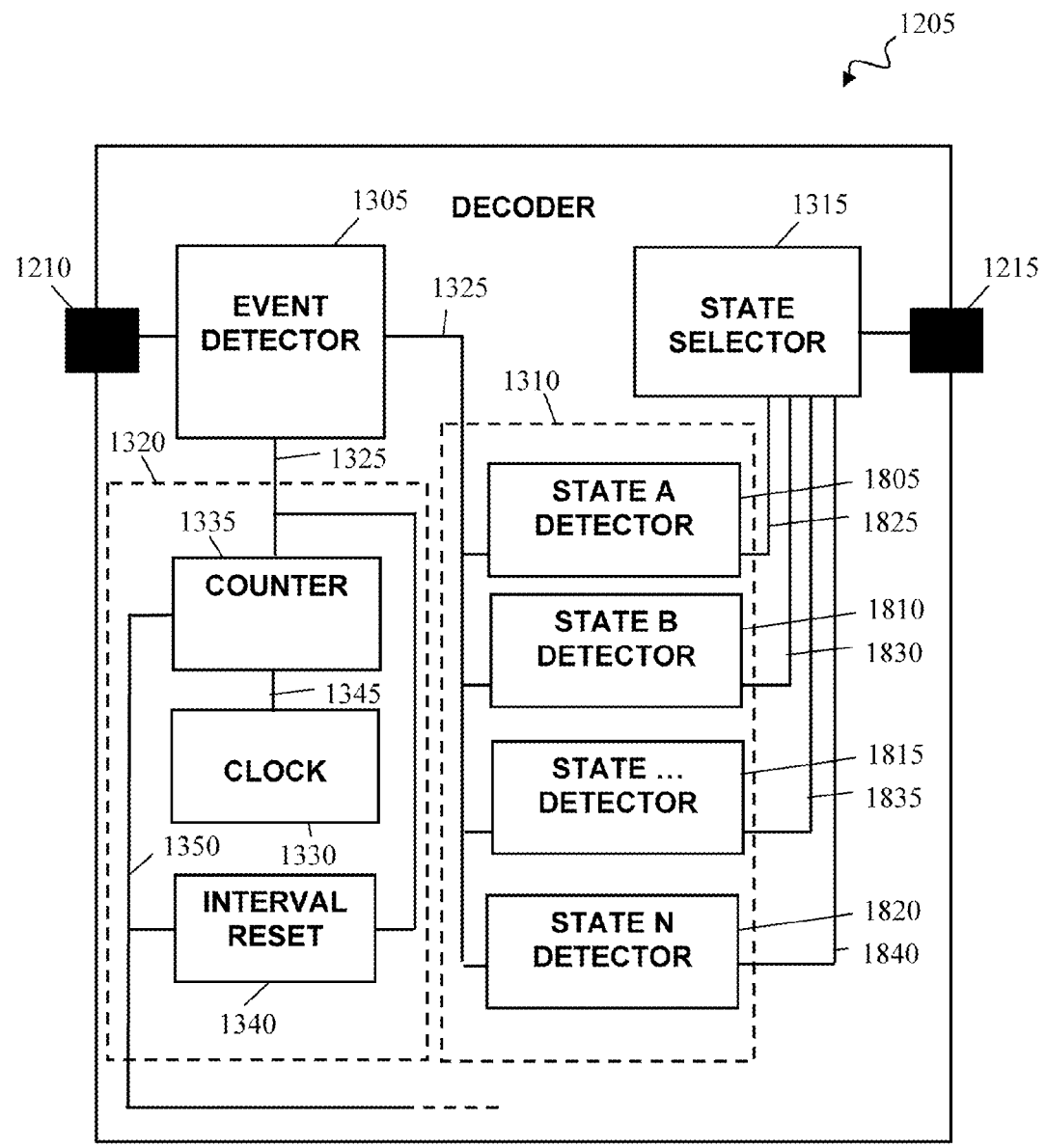

FIG. 18 is a schematic representation of another implementation of decoder 1205. The illustrated implementation of decoder 1205 includes a translator circuit 1310 and a state selector circuit 1315 that are suited for decoding signals in which information is encoded by the timing of the occurrence of events within time intervals into signals that encode information with digits having more than two possible states. For example, decoder 1205 can decode a time based code signal 1220 into a signal 1230.

In response to detection of an event, event detector 1305 outputs an indication of the time within an interval at which an event is detected. These indications 1325 are received by time-to-state translator 1310. Time-to-state translator 1310 includes a collection of state detectors 1805, 1810, 1815, 1820 that are all connected to receive the indications of the times within intervals at which events are detected.

Each state detector 1805, 1810, 1815, 1820 is connected to compare the times within intervals at which events are detected to references that that embody the earliest and latest times within an interval at which a detected event is considered to be of the corresponding state. In response to detecting that the timing of an event within an interval is within a corresponding range, each state detector 1805, 1810, 1815, 1820 outputs an indication 1825, 1830, 1835, 1840. State detectors 1805, 1810, 1815, 1820 thus translate times within an interval to one of the states of the digits in signal 1230 that is to be output from decoder 1005.

State selector 1315 is connected to receive the translations (e.g., indications 1825, 1830, 1835, 1840), and based on the received translations, state selector 1315 outputs digits having the states to output 1215.

In operation, event detector 1305 receives signal 1220 in which information 120 is encoded by the timing of the occurrence of events within time intervals. Event detector 1305 detects the timing of the events within their respective intervals and outputs a description of that timing (e.g., indications 1325). Time-to-state translator circuit 1310 translates times within an interval to the states to be output from decoder 1305 in signal 1330 by comparing the times at which events were detected by event detector 1305 to the times allocated to the states. State selector circuit 1315 receives the results of those comparisons (e.g., indications 1825, 1830, 1835, 1840) and selects states of digits for output to be provided to output 1215 in accordance with those results.

Figure 19:
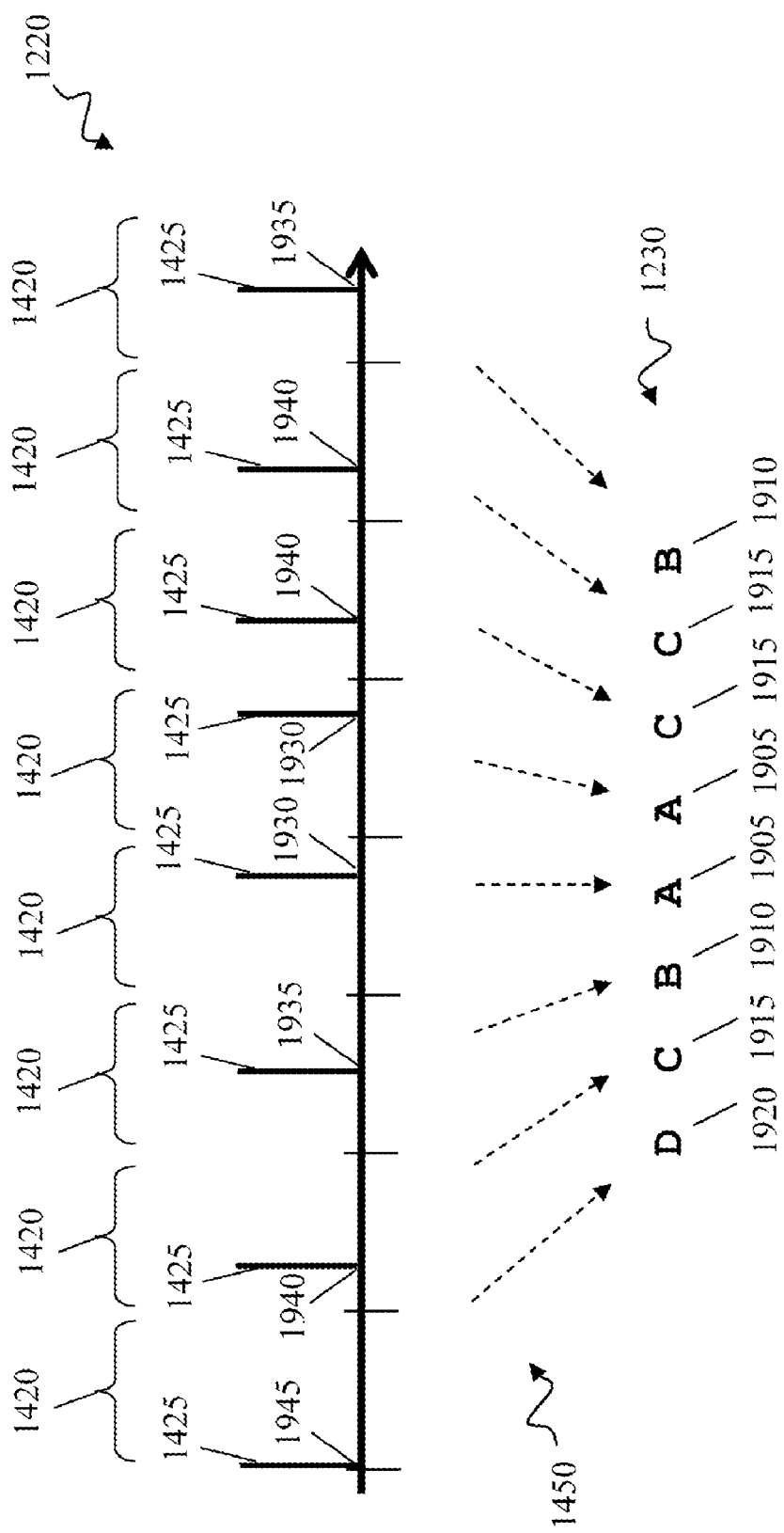
FIG. 19 is a schematic representation of decoding a signal in which information is encoded by the timing of the occurrence of events within time intervals into a signal that includes more that two states.

FIG. 19 is a schematic representation of decoding a signal in which information is encoded by the timing of the occurrence of events within time intervals into a signal that includes digits having more that two possible states. For example, the illustrated decoding can be performed by a decoder such as decoder 1205 shown in FIG. 18. In the illustrated implementation, time-based code signal 1220 includes a collection of time intervals 1420, each of which corresponds to a digit 1905, 1910, 1915, 1920 within signal 1230. Each time interval 1420 includes a respective data event 1425. The timing of data events 1425 within individual time intervals 1420 indicates the state of the digit 1905, 1910, 1915, 1920 corresponding to that time interval 1420. For example, in the illustrated implementation, data events 1425 in intervals 1420 corresponding to digits 1905 of the first state occur at times 1930 near the end of intervals 1420. Data events 1425 in intervals 1420 corresponding to digits 1910 of the second state occur at times 1935 near the middle of intervals 1420. Data events 1425 in intervals 1420 corresponding to digits 1925 of the third state occur at times 1940 before the middle of intervals 1420. Data events 1425 in intervals 1420 corresponding to digits 1905 of the fourth state occur at times 1945 near the beginning of intervals 1420. Times 1930, 1935, 1940, 1945 are distinguishable from one another.

Decoding decodes time-based code signal 1220 into signal 1230. Information is expressed in signal 1230 using digits having four different discrete potential states, namely digits 1905 having the first state (i.e., "A's"), digits 1910 having the second state (i.e., "B's"), digits 1915 having the third state (i.e., "C's"), and digits 1920 having the fourth state (i.e., "D's"). In other implementations, signal 1230 can express information in digits having a different number of possible states (e.g., digits having 10 different possible states that express information in decimal) or in digits having the a very large number or continuous continuum of possible states (e.g., a nearly analog or analog continuum of states). In some implementations, signal 1230 can express genetic information, namely, four nucleic acids, using four different possible states.

In other implementations, a decoder can be implemented as digital circuitry that receives as an input an ordered collection of bits that are grouped into binary characters of a predetermined length of N binary digits (i.e., bits), in which only one bit is distinct from the others, and produces as output a sequence of output symbols. The digital circuitry can be controlled by a programmed computer, or include an embedded computer. In some such implementations, the decoder includes circuitry that transforms the sequence of symbols into an analog output signal.

Figure 20:
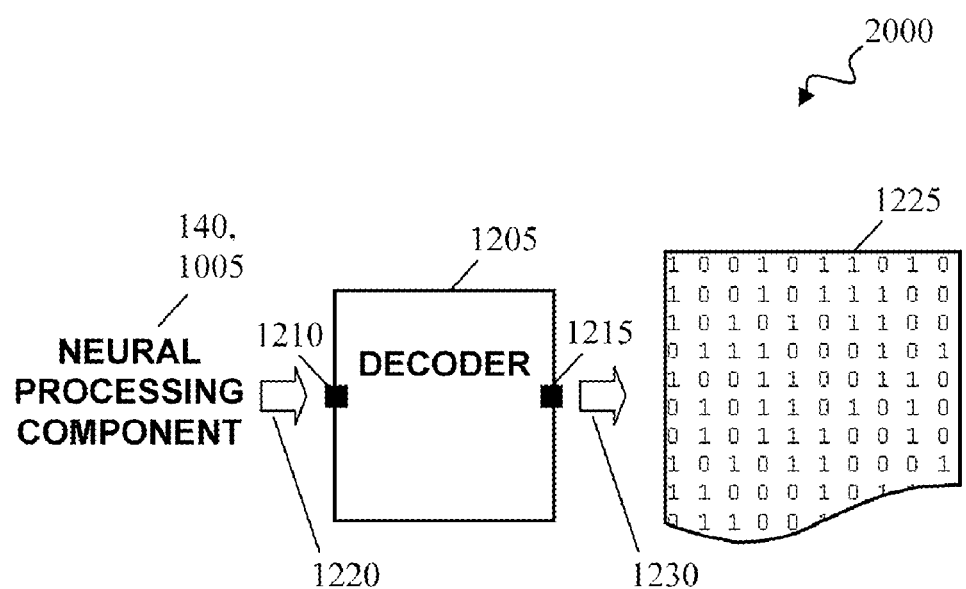
FIG. 20 is a schematic representation of an implementation of a decoding system.

FIG. 20 is a schematic representation of an implementation of decoding system 2000. System 2000 can be a stand alone system or part of a larger system, such as system 1200 (FIG. 12). System 2000 includes a neural processing component 140, 1005 from which signal 1220 is received by decoder 1205. Signal 1220 encodes information by the timing of the occurrence of events within time intervals. In some implementations, neural processing component 140, 1005 can include multiple elements that contribute to the events in signal 1220. For example, in neural processing components 140, 1005 implemented using "wet" neural components, multiple nerves can contribute to the events in signal 1220. As another example, in neural processing components 140,1005 implemented using semiconductor devices, multiple neural network outputs can contribute to the events in signal 1220.

In operation, decoder 1205 can decode the signal 1220 into a signal 1230 which expresses information 1225 in an ordered, finite set of discrete digits. Decoder 1205 can thus act as an interface between the statistical processing and pattern recognition functions provided by neural processing component 1205 and binary (and other) digital data processing devices. For example, decoder 1205 can be included in a motor or other prosthesis that receives nerves' spike trains with, e.g., control or other information, encoded in signal 1220.

Figure 21:
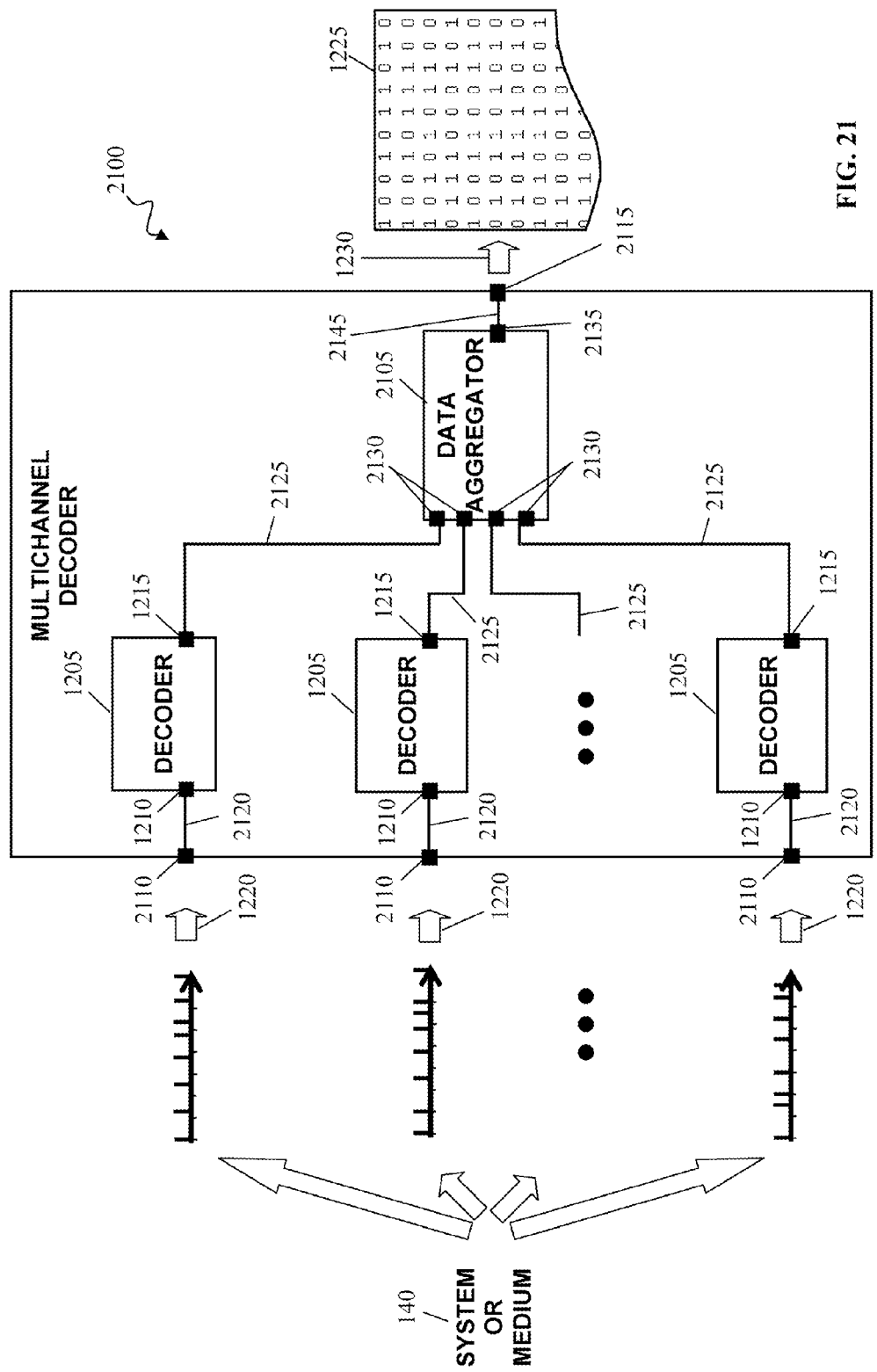
FIG. 21 is a schematic representation of a multichannel decoder system.

FIG. 21 is a schematic representation of an implementation of system for decoding signals in which information is encoded by the timing of the occurrence of events within time intervals, namely, a multichannel decoder system 2100. Multichannel decoder system 2100 can be used in isolation or in conjunction with other devices. For example, multichannel decoder system 2100 can be used as time-based decoder 41 (FIG. 1A).

System 2100 includes a collection of decoders 1205, a data aggregator 2105, a collection of inputs 2110, and an output 2115. Inputs 2110 receive a respective time based code signal 1220. Time based code signals 1220 each include a collection of intervals that themselves include events. The timing of events within these intervals encodes information. In some implementations, different time based code signals 1220 can all be received from the same single system or medium 140, as shown.

The time based code signals 1220 are provided from inputs 2110 to corresponding inputs 1210 of decoders 1205. Decoders 1205 are thus each connected to receive a respective time based code signal 1220. Decoders 1205 decode the information in signals 1220 and output decoded signals 2125. In the decoded signals, at least some of the information content of signals 1220 is expressed in an ordered, finite set of discrete digits, e.g., in a collection of high and low bits.

Decoded signals 2125 are provided to one or more inputs 2130 of data aggregator 2105. Data aggregator 2105 also includes an output 2135. Data aggregator 2105 is a component that aggregates a relatively small collection of digits into a larger collection of digits. In the illustrated implementation, data aggregator 2105 is connected to aggregate the received decoded signals into an output signal 1230 that expresses information 1225 in an ordered, finite set of discrete digits. Output signal 1230 is provided from output 2135 of data aggregator 2105 to output 2115 of system 2100.

In operation, each decoder 1205 receives a respective time based code signal 1220 from system or medium 140. Decoders 1205 decode their respective time based code signals 1220 into signals that express the information content in an ordered, finite set of discrete digits. Data aggregator 2105 is connected to receive signals 1220, aggregates them, and outputs them in an output signal 2145.

Figure 22:
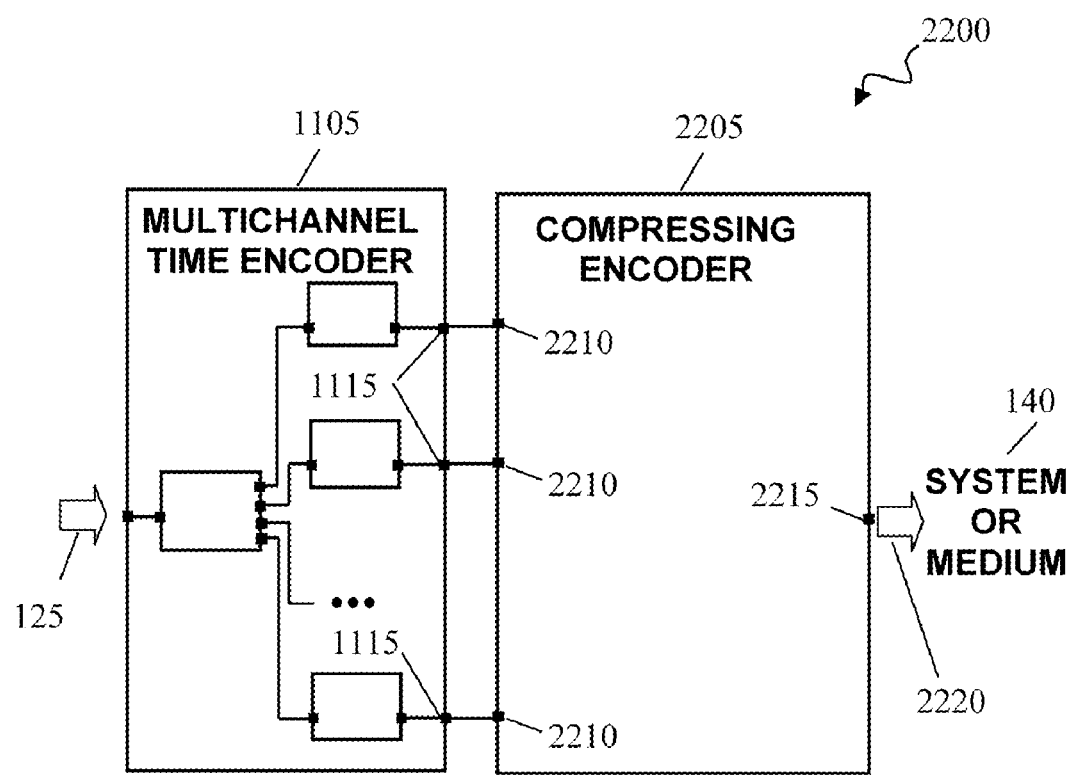
FIG. 22 is a schematic representation of an implementation of system in which information can be encoded.

FIG. 22 is a schematic representation of an implementation of a system 2200 in which information can be encoded. System 2200 includes a multichannel encoder 1105 and a compressing encoder 2205.

Compressing encoder 2205 is a component that compresses multiple input signals into a single output signal 2220. Compressing encoder 2205 includes a collection of one or more inputs 2210 and an output 2215. One or more inputs 2210 are connectable to receive time based code signals from output 1115 of a multichannel time encoder 1105.

Compressing encoder 2205 compresses the received time based code signals and outputs a compressed signal 2220 on output 2215 to a system or medium 140.

System 2200 can be used in isolation or in conjunction with other devices. For example, system 2200 can be used as time-based encoder 25, amplitude weighting component 27, and compressor 29 (FIG. 1A).

Figure 23:
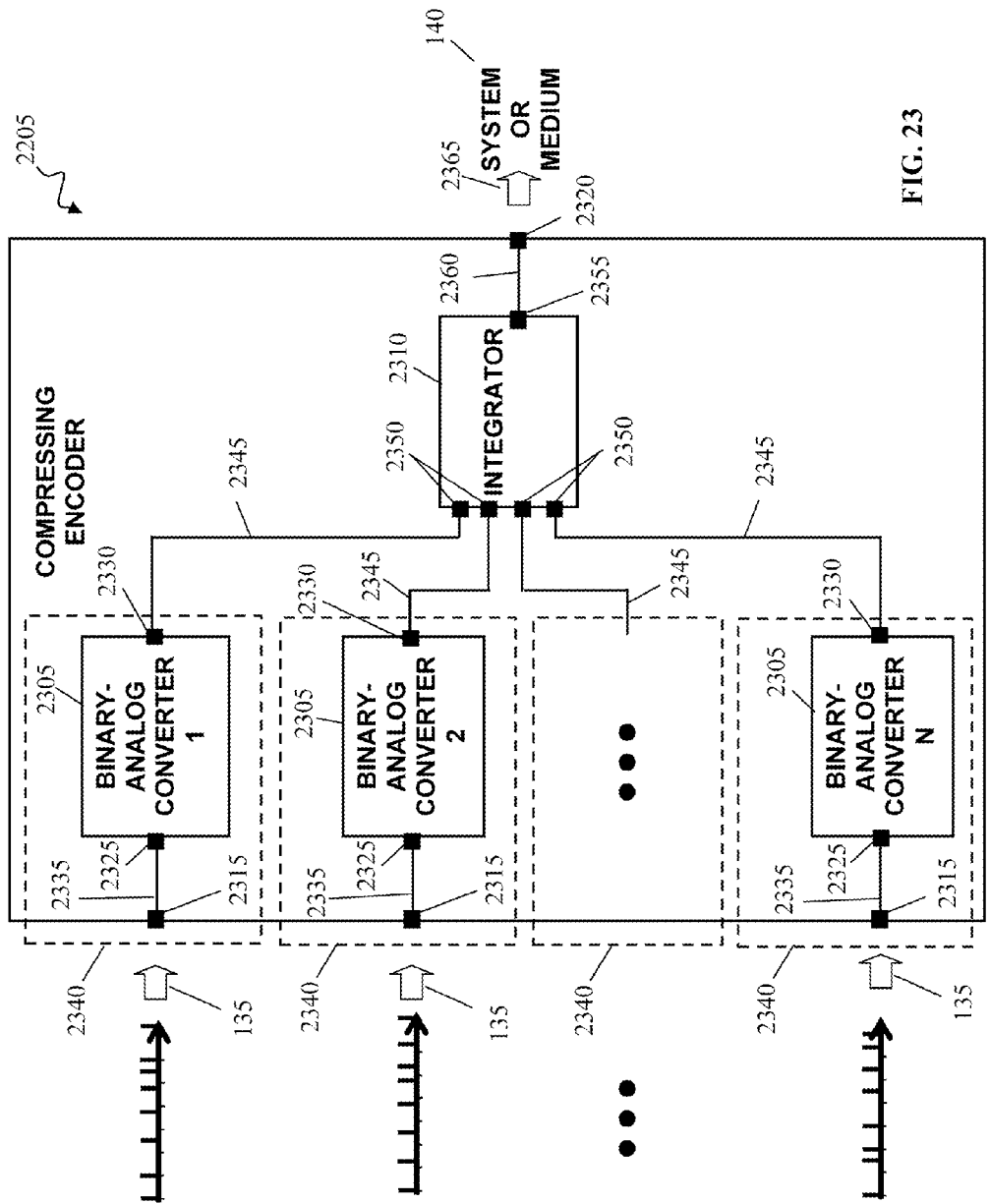
FIG. 23 is a schematic representation of one implementation of a compressing encoder.
Figure 24:
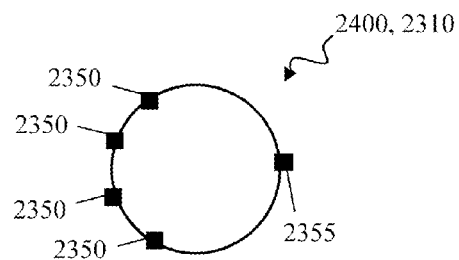
FIGS. 24, 25, 26, 27 are schematic representations related to different implementations of integrators.
Figure 25:
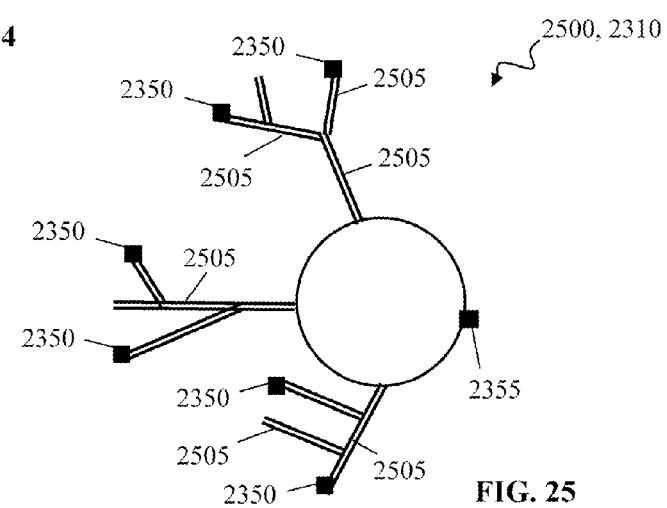

FIG. 23 is a schematic representation of one implementation of a compressing encoder 2205. Compressing encoder 2205 is a component that encodes information from a collection of signals in which information is encoded by the timing of the occurrence of events within time intervals into a signal that includes a timed series of events such as signal 2220 (FIG. 22).

In the implementation shown, encoder 2205 includes a collection of different binary-to-analog converters 2305, an integrator 2310, a collection of inputs 2315, and an output 2320. Binary-to-analog converters 2305 each include a respective input 2325 and an output 2330. Input 2325 of each binary-to-analog converter 2305 is connected to receive a respective signal 135 in which information is encoded by the timing of the occurrence of events within time intervals from corresponding input 2315.

Each input 2315 and corresponding binary-to-analog converter 2305 pair forms an encoding channel 2340. Compressing encoder 2205 is thus a parallel combination of multiple encoding channels 2340. Signals 135 can have the same information, can have different information content, or can have combinations of the same and different information content.

Figure 39:
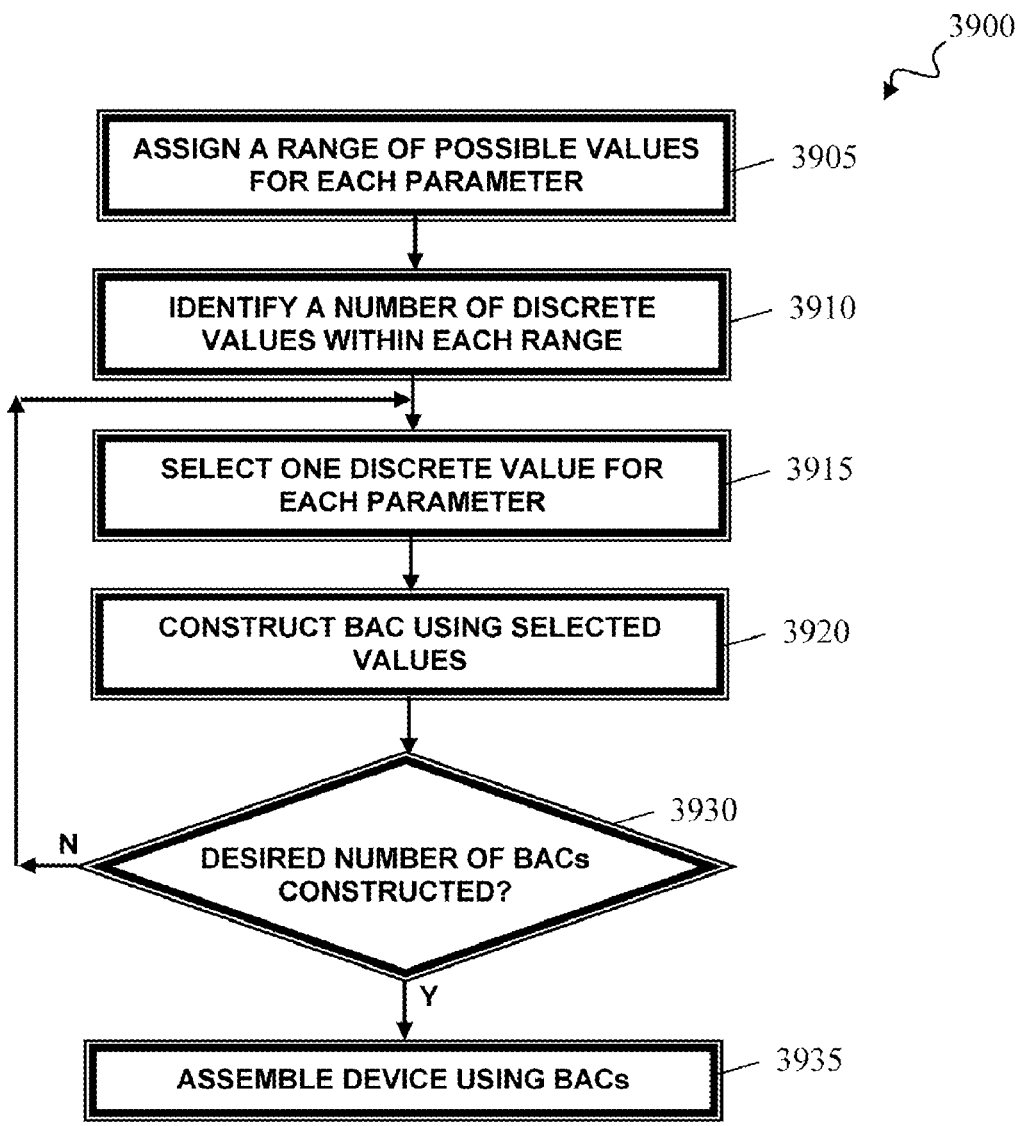
FIG. 39 is a flow chart of a process for constructing a collection of binary-to-analog converters.

Each binary-to-analog converter 2305 is a component that is configured to weight the amplitude of individual events in an input time series of events as a function of the timing of other events in the input time series. In some implementations, the events can be weighted using a non-linear function. In some implementations, the compressing encoder 2205 includes at least two different binary-to-analog converters 2305. Differing binary-to-analog converter 2305 can weight events using different time-sensitive parameters, different time sensitivities, or combinations of these or other factors. In some implementations, every binary-to-analog converter 2305 in encoder 2205 will differ from every other binary-to-analog converter 2305 in encoder 2205. In some implementations, the collection of binary-to-analog converters 2305 in encoder 2205 is the complete set of binary-to-analog converters constructed using a process such as process 3900 (FIG. 39). As a consequence of such differences, when the same signal in which information is encoded by the timing of the occurrence of events within time intervals is input into different binary-to-analog converters 2305, different signals that include the weighted events at relative times that correspond to the timing of the unweighted events within the input signal will be output by the different binary-to-analog converters 2305.

Each binary-to-analog converter 2305 outputs a signal 2345 that can include the weighted events at relative times that correspond to the timing of the unweighted events within the input signal over output 2330. Signals 2345 are provided to a respective input 2350 of integrator 2310. In implementations where integrator 2310 is implemented using "wet" neural components, the properties of signals 2345 can be tailored for compatibility with wet neural components. For example, events within signals 2345 can be tailored to mimic the amplitude and time characteristics of action potentials.

Integrator 2310 includes a collection of inputs 2350 and an output 2355. Integrator 2310 is a component that integrates the signals received at inputs 2350 to generate a signal that is provided to output 2355. Integrating these signals combines and compresses them into a single signal. In some implementations, integrator 2310 can be a non-linear integrator in that different signals received at different inputs 2350 contribute to different extents to the signal provided to output 2355. In some implementations, integrator 2310 can be a linear integrator in that different signals received at different inputs 2350 contribute to the same extent to the signal provided to output 2355. In some implementations, as described further below, integrator 2310 is modeled after one or more neurons or nodes in the brain or other neural processing device. For example, the single signal output 2360 provided on output 2355 of integrator 2310 can represent the all-to-all interactions of the different signals received at inputs 2350.

Output 2355 couples signal 2360 to output 2320 of compressing encoder 2205. Output 2320 provides signal 2365 to a system or medium 140.

FIGS. 24, 25, 26, 27 are schematic representations related to different implementations of an integrator 2310, namely an integrator 2400, an integrator 2500, an integrator 2600, and an integrator 2700. Integrator 2400 is a non-branched node of a neural processing system. Integrator 2500 is a node of a neural processing system that has multiple branches. Integrators 2600, 2700 are a network of nodes of a neural processing system. Integrators 2400, 2500, 2600, 2700 can be constructed in hardware, in software, in wet neural components, or in combinations of these components.

As shown, integrator 2500 includes a collection of branches 2505. In some implementations, branches 2505 have identical properties. In other implementations, different branches 2505 have different properties. For example, different branches 2505 can have different cable properties.

As shown, integrators 2600, 2700 each include a collection of nodes 2605 joined by a collection of links 2610. Links 2610 can include, e.g., feedforward links, feedback links, recurrent links, or combinations thereof. Integrator 2700 includes a pair of outputs 2355. Both outputs 2355 provide results of combining and compressing the signals received at inputs 2350. However, in general, outputs 2355 will output different signals that result from different combinations and compressions of the signals received at inputs 2350. As a result, two different signals can be output from a compressing encoder and conveyed to a system or medium 140. These two different signals can also be stored or decoded in parallel using the described systems and techniques. Although such parallel storage and decoding might decrease data storage density or require additional processing, the fidelity of storage and decoding can be checked and, if necessary, improved by comparing the results of parallel decoding.

In operation, integrators 2400, 2500, 2600, 2700 can integrate input signals according to one or more models. For example, in some implementations, integrator 2400 can integrate according to an integrate-and-fire model. Such a model includes a capacitor C in parallel with a resistor R driven by a current I(t) and provides that:

$$\tau_m \frac{dV}{dt} = V(t) + R \cdot I(t) \qquad \text{Equation 1}$$

In this model, the signals on inputs 2350 are integrated by a linear summation of amplitudes of each signal at any moment in time (i.e. the voltages of each input signal (RxI(t)) are summed). The voltage signals decay exponentially with a time constant $\tau_m$. A threshold voltage can be selected, above which a binary state can be signaled in output 2355.

In other implementations, integrators 2400-2700 can integrate according to a conductance based integrate-and-fire neuron model provided by:

$$C_m \frac{dV}{dt} = \sum g_j(V - V_j) + I_{ext} \qquad \text{Equation 2}$$

where $g_j$ is the conductance for a particular ionic species, $V-V_j$ is the Nernst Potential of the conductance, and $I_{ext}$ is an external applied current.

In this model, the signals on inputs 2350 are integrated by a non-linear summation of amplitudes of each signal at any moment in time, achieved by one or more conductances g that scale the amplitude of the signals ($I_{ext}$) depending on the total voltage reached at any moment in time. Amplitudes of each signal also decay exponentially with a time constant $\tau_m$ which may vary if conductance is made to vary. A threshold voltage can be selected, above which a binary state can be signaled in output 2355.

In some implementations, integrator 2500 can operate according to a model in which a conductance-based evolution of voltages is extended to include decaying of voltages within cables, which is described by the Telegraphers Equation which is given by:

$$\tau \frac{\partial V}{\partial t} - \lambda^2 \frac{\partial^2 V(x)}{\partial x^2} = V_L - V \qquad \text{Equation 3}$$

where $\lambda$ is a length constant determined by properties of the branches, x is a digitized unit of length along the branches, and $V_L$ is the voltage at equilibrium.

In this model, the signals on inputs 2350 are integrated using either Equation 1 or Equation 2 above and by a further linear summation where each signal on inputs 2350 can propagate along the physical branches of the system to all other inputs 2350. While decaying in amplitude according to the length constant λ as the signal propagates, each signal on inputs 2350 contributes to some extent to the amplitude at each inputs 2350. The amplitude of any one signal at input 2350 is therefore the amplitude of that signal plus the sum of all amplitudes of other signals on inputs 2350 after each has uniquely decayed while propagating to the location of the example input 2350. A threshold voltage can be selected, above which a binary state can be signaled in output 2355.

In some implementations, integrators 2600, 2700 can operate according to a neural network model in which all nodes are interconnected either directly or indirectly through other nodes. In such integrators, any node can serve as output. In some implementations, integrators 2600, 2700 can operate according to a model given by:

$$C_m \frac{dV}{dt} = \sum g_j(V - V_j) + \sum_{i=1}^{n} I_i(t) \qquad \text{Equation 4}$$

where $I_i(t)$ is the current injected by input i at time t and where there are n inputs to a neuron.

In this model, the signals on inputs 2350 are integrated by networking processing elements 2605 that are each modeled by either Equations 1, 2, or 3 above, which creates additional internal inputs 2610 to each element 2605, thus allowing an arbitrary non-linear and parallel summation of all inputs 2350 to produce output 2355. Any one of the processing elements 2605 can be selected to signal binary states of the network as output 2355.

Integrators 2400, 2500, 2600, 2700 can be used as compressor 29 (FIG. 1A).

Figure 28:
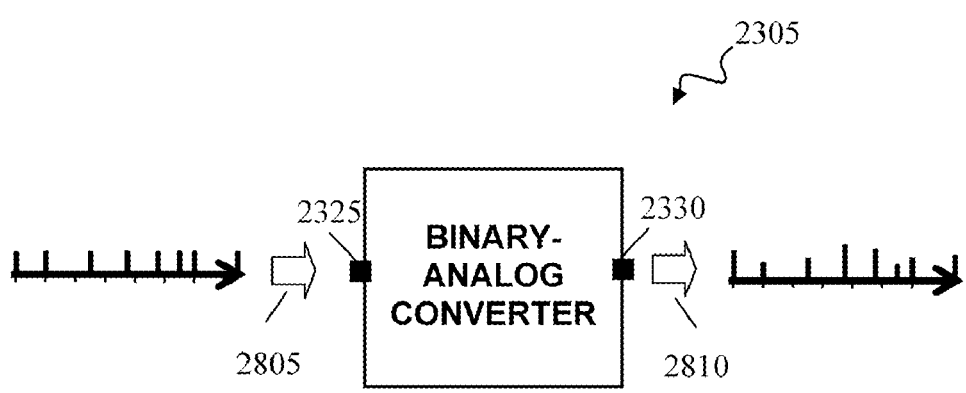
FIG. 28 is a schematic representation of a binary-to-analog converter.

FIG. 28 is a schematic representation of a binary-to-analog converter 2305. Binary-to-analog converter 2305 can be used, e.g., in an encoder, in a time series scanner, or in a weighting device. Binary-to-analog converter 2305 can thus, in some implementations, be a reference binary-to-analog converter as described further below.

Binary-to-analog converter 2305 is a component that is configured to weight the amplitude of individual events in an input time series of events as a function of the timing of other events in the input time series. In some implementations, the events can be weighted using a non-linear function. For example, binary-to-analog converter 2305 can use multiple time-sensitive parameters to generate individual weights for each individual event based on the timing of predecessor events within an input signal. Binary-to-analog converter 2305 can apply the generated weights to individual events, e.g., by multiplying the events by the weights and outputting the weighted events at relative times that correspond to the timing of the unweighted events within the input signal.

Binary-to-analog converter 2305 includes an input 2325 and an output 2330. Input 2325 receives a signal 2805 that includes a times series of events. For example, input 2325 can receive a time based code signal 135 or a signal output from a compressing encoder 2205. Output 2330 provides a signal 2810 that includes the weighted events at relative times that correspond to the timing of the unweighted events within the input signal.

In some implementations, binary-to-analog converter 2305 can include a reset mechanism that resets the weighting of the amplitude of individual events to a known state. The reset mechanism can be triggered, e.g., by the presence of a footer event 530 within a footer interval 520 of a signal 135 (FIG. 5). Resetting the weighting of can halt the evolution of time-sensitive parameters and return these parameters to known values. In other implementations, binary-to-analog converter 2305 can quiesce without a trigger, e.g., over time.

In some implementations, the parameters used by binary-to-analog converter 2305 can appear in time-dependent differential equations. For example, binary-to-analog converter 2305 can use three time-sensitive parameters (U, $\tau_d$, $\tau_f$ in the equations below) and one time-insensitive parameter (A in the equations below) to generate individual weights. In some implementations, the amplitude $A_k$ of the $k^{th}$ event in the signal in which events (1, ..., k) are separated by times ($\Delta_k$, ..., $\Delta_{k-1}$) can be given by:

$$A_k = A \cdot u_k \cdot \psi_k \qquad \text{Equation 5}$$

$$u_k = U + u_{k-1}(1 - U)\exp\left(\frac{-\Delta_{k-1}}{\tau_f}\right) \qquad \text{Equation 6}$$

$$\psi_k = 1 + (\psi_{k-1} - u_{k-1}\psi_k - 1)\exp\left(\frac{-\Delta_{k-1}}{\tau_d}\right) \qquad \text{Equation 7}$$

where $\psi$ and $\mu_k$ are hidden dynamic variables ($\mu \in [0,1]$; ($\psi \in [0,1]$) with initial values of $\psi_1 = 1$ and $\mu_1 = U$ for the first event. The variable $\psi$ can represent, e.g., the fraction of resources available at the time of each event. The variable $\mu$ can represent, e.g., the fraction of resources used by each event. In some implementations, both variables can evolve with each event and provide that the amplitude of the response to each event in a signal is different and reflects the temporal history of events in that signal.

The manner in which these dynamic variables evolve and the time period over which each response accumulates information about the temporal history of the signal depends on the values of the time-sensitive parameters (U, $\tau_d$, $\tau_f$). The parameter U can set the maximal resources available for the first event, which fractionates the maximal response possible (given by A). Thus $A_1 = AU$. The parameter $\tau_d$ is a time constant for recovery of the resources after use. The parameter $\tau_f$ is a time constant for recovery from a facilitation of $\mu_\kappa$ by some amount (typically $\mu$).

By assigning different values to parameters U, $\tau_d$, $\tau_f$ different binary-to-analog converters 2305 will generate different sequences of amplitudes in response to an identical input sequence of events. In some implementations, more complex time-sensitivities can be achieved using double or higher order exponentials for one or both of parameters $\tau_d$, $\tau_f$. In some implementations, more complex time-sensitivities can be achieved using a time-sensitive function to render one or both of $\tau_d$, $\tau_f$ and by making U a stochastic variable or function linked to the parameters themselves.

In some implementations, binary-to-analog converters 2305 can be implemented as described in one or more of the following: United States Patent Publication 2003/0208451; U.S. Pat. Nos. 5,155,802; 5,537,512; 6,363,369; and 4,962,342, the contents of all of which are incorporated herein by reference. For example, binary-to-analog converters 2305 can be implemented as a device that includes a network of signal processors interconnected by one or more processing junctions that dynamically adjust response strength according to the temporal pattern of events in signal 2805 and hence simulates a "dynamic synapse" as described in U.S. Pat. No. 6,363,369. The processing junctions can receive and process a prejunction signal from one signal processor in the network to produce a junction signal which causes a postjunction signal to a second signal processor in the network. Each processing junction can be configured so that the junction signal has a dynamic dependence on the prejunction signal.

Figure 29:
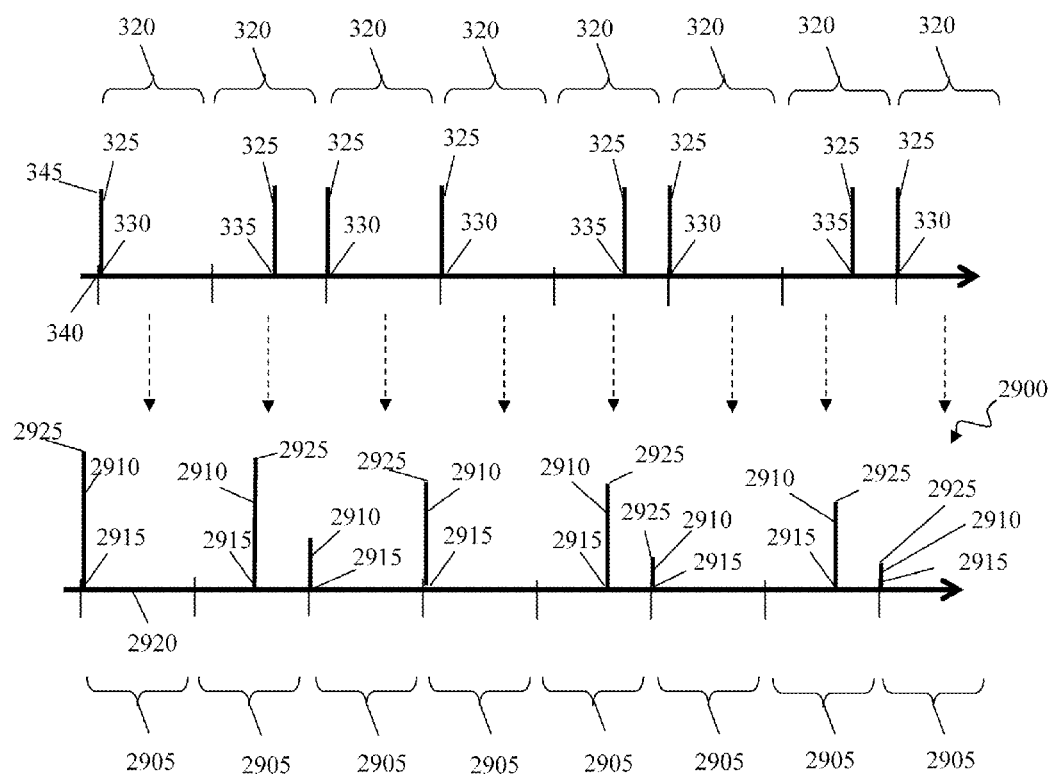
FIG. 29 is a schematic representation of weighting the amplitude of individual events in a time series of events as a function of the timing of other events in the time series.

FIG. 29 is a schematic representation of weighting the amplitude of individual events in a time series of events as a function of the timing of other events in the time series. The illustrated weighting can be performed by a binary-to-analog converters such as binary-to-analog converter 2305 (FIG. 28). In the illustrated implementation, signal 135 is a time-based code signal that encodes information by the timing of the occurrence of events within time intervals. For example, signal 135 can be a time-based code signal output from a decoder 105 (FIGS. 1, 2, 4, 6, 8). Signal 135 is weighted to form a weighted time signal 2900.

Weighted time signal 2900 includes a sequence of time intervals 2905 each of which includes a respective event 2910. Events 2910 occur at times 2915 within respective intervals 2905.

In the illustrated implementation, events 2910 are pulses that transition from a baseline (i.e., a "resting") state 2920 to a high (i.e., an "excited") state 2925 and then return to the baseline resting state 2920. The level of high state 2925 differs for different events 2910. The level of high state 2925 is the amplitude of event 2910 and a result of the weighting. The level of high state 2925 (i.e., the amplitude of each event 2910) embodies the timing of that event 2910 within signal 135 and the timing of other events 2910 within signal 135. In other words, information encoded by the timing of two or more events 2910 within signal 135 is embodied within the amplitudes of each event 2910. As described above, in some implementations, the amplitudes of each event 2910 can embody the timing only of predecessor events 2910.

In the illustrated implementation, the weighting of the events in time-based code signal 135 changes the amplitude of those events while retaining within-interval and within-signal timing information. In particular, the illustrated weighted time signal 2900 includes a collection of time intervals 2905, each of which corresponds to a respective interval 320 in signal 135. This correspondence is represented by arrows 2930. In the illustrated implementation, some events 2910 are increased in amplitude relative to respective corresponding events 205 and some events 2910 are decreased in amplitude relative to respective corresponding events 205.

Corresponding time intervals 2905, 320 each include a respective event 2910, 325 that encodes information. The position of events 2910, 320 within the respective of corresponding time intervals 2905, 325 is the same. For example, when an event 320 occurs at the beginning of a time interval 325, event 2910 in the corresponding time interval 2905 also occurs at the beginning of that interval. As another example, when an event 320 occurs at the middle of a time interval 325, event 2910 in the corresponding time interval 2905 also occurs at the middle of that interval. In the illustrated implementation, the duration of corresponding intervals 2905, 325 is the same. Further, the order of corresponding intervals 2905, 325 with respect to other intervals 2905, 325 within a respective signal 2900, 135 is the same.

Figure 30:
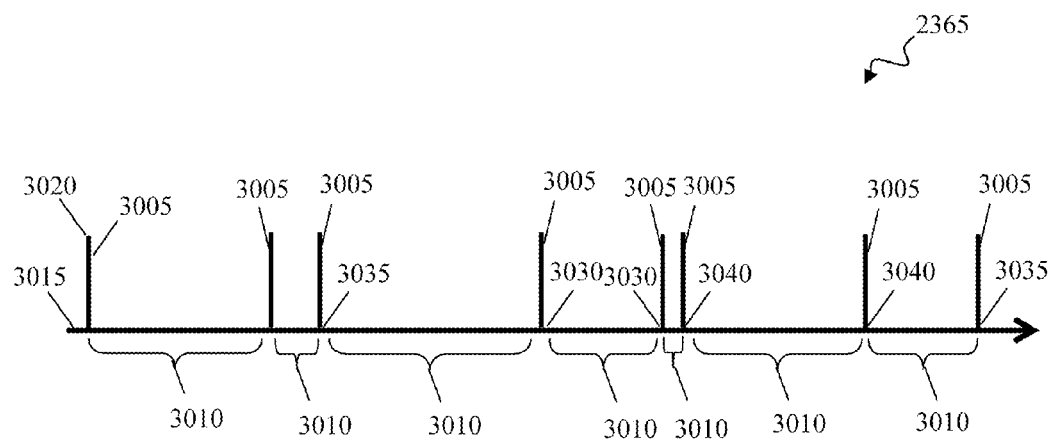
FIG. 30 is a schematic representation of one implementation of a signal that can be output from a compressing encoder.

FIG. 30 is a schematic representation of one implementation of a signal 2365. Signal 2365 can be output from a compressing encoder 2205 of a device such as a transmitter of a cell phone or the head of disc drive. Signal 2365 can be a one-dimensional signal and can be one-dimensional signal 29 (FIG. 1A).

Signal 2365 includes a timed series of events 3005. Events 3005 are separated from one another by time spans 3010. The duration of time spans 3010 embodies the integration of the amplitude sequences that includes weighted events, e.g., weighted time signal 2900.

In the illustrated implementation, events 3005 are pulses that transition from a baseline (i.e., a "resting") state 3015 to a high (i.e., an "excited") state 3020 and then return to the baseline resting state 3015. In some implementations, the shapes of different events 3005 can be indistinguishable from one another and different events 3005 can be distinguished only by virtue of their timing.

The number of time spans 3010 for a given signal 2365 within a unit time can be selected to conform with a predetermined probability distribution. In some implementations, the probability distribution can be asymmetrical and skewed, e.g., to the left of its median. In some implementations, the standard deviation of the probability distribution can be approximately equal to the square root of the mean of the probability distribution. For example, in some implementations, the number of time spans 3010 within a unit time can be Poisson distributed.

In some implementations, signal 2365 can be added to, superpositioned with, or otherwise transmitted along with additional information. For example, events 3005 can be added to a modulated or shifted analog or digital signal and hence resemble noise in that signal. Such implementations are particularly relevant to covert or encrypted data communication. For example, events 3005 can be transmitted along with a frequency modulated analog signal that itself conveys unremarkable information such as, e.g., a radio broadcast. To the uninformed observer, events 3005 would appear to be noise on this second signal. The information content encoded by events 3005 can thus be disguised.

Figure 31:
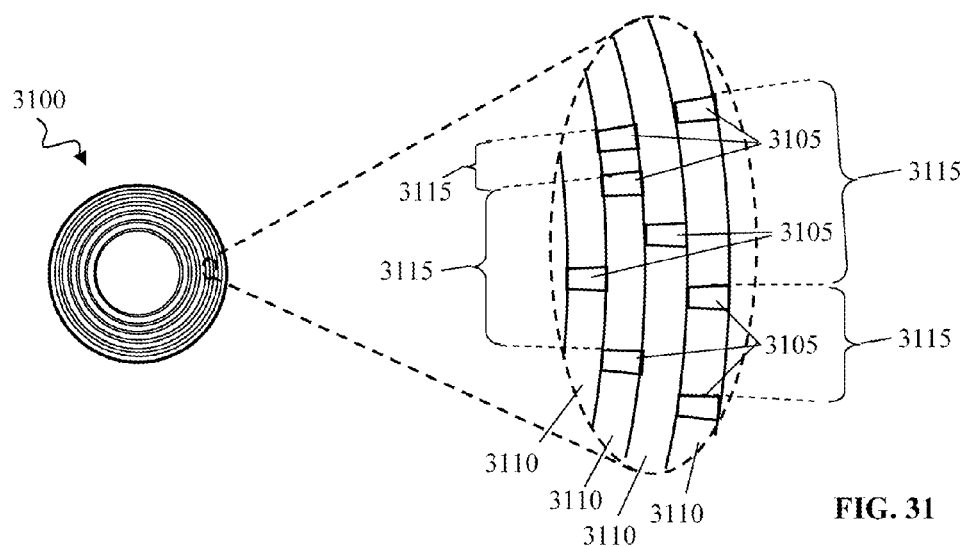
FIG. 31 is a schematic representation of a data storage device.

FIG. 31 is a schematic representation of a data storage device 3100. Data storage device 3100 is a component in which information can be stored and from which the stored information can be accessed. For example, data storage device 3100 can be an optical disc, a magnetic disc, a magnetic tape, a record album, a punch card, a bar-coded label, or other data storage device.

Data storage device 3100 includes a collection of detectable physical manifestations 3105. Physical manifestations 3105 are structural elements that can be detected or sensed by a data storage device reader. For example, physical manifestations 3105 can be the pits or bumps of an optical disc that are detectable by an optical disc reader. As another example, physical manifestations 3105 can be magnetized elements of magnetic disc or tape that are detectable by a magnetization sensor. As another example, physical manifestations 3105 can be the features of a record album that are detectable by the stylus of a record player. Physical manifestations 3105 are arranged and positioned in sequence along paths 3110. Paths 3110 guide data storage and access and can be, e.g., tracks, grooves, a magnetic tape, or the length of a bar code. The physical manifestations 3105 along each path 3110 are separated from one another by distances 3115. The lengths of distances 3115 can be scaled to correspond to the times between events in a signal. For example, lengths of distances 3115 can be scaled to correspond to the duration of time spans 3010 in signal 2365 (FIG. 30).

During writing of data into data storage device 3100, the speed of relative motion between paths 3110 of data storage device 3100 and a data storage device writer can transform the times between events in such signals into the position of physical manifestations 3105 along paths 3110. During reading of data from data storage device 3100, the speed of relative motion between paths 3110 of data storage device 3100 and a data storage device reader can transform the position of physical manifestations 3105 along paths 3110 back into times between events in such signals. In some implementations, the speed of relative motion during reading and writing need not be constant but can vary, e.g., based on the position of a path 3110 on data storage device 3100.

The number of lengths of distances 315 within a unit length can be selected to conform with a predetermined probability distribution. In some implementations, the probability distribution can be asymmetrical and skewed, e.g., to the left of its median. In some implementations, the standard deviation of the probability distribution can be approximately equal to the square root of the mean of the probability distribution. For example, in some implementations, the number of lengths of distances 315 within a unit length can be Poisson distributed.

In operation, a data storage device writer can receive a signal that characterizes a timed series of events, such as signal 2365. The data storage device writer can write physical manifestations 3105 along one or more paths 3110 on data storage device 3100 such that the lengths of distances 3115 scale to correspond to the times between events in the signal. Data storage device 3100 can maintain or "store" the physical manifestations 3105 and the lengths of the distances 3115 that separate physical manifestations 3105.

In accessing the stored information, a data storage device reader can measure the lengths of the distances 3115 that separate physical manifestations 3105 along one or more paths 3110 on data storage device 3100. The measurements can be converted into a signal that characterizes a timed series of events, such as signal 2365 (FIG. 30). For example, the data storage device reader can output signal 2365 such that duration of time spans 3010 scale to correspond to the lengths of the distances 3115. In some implementations, the data storage device reader and the data storage device writer can be the same device.

Figure 32:
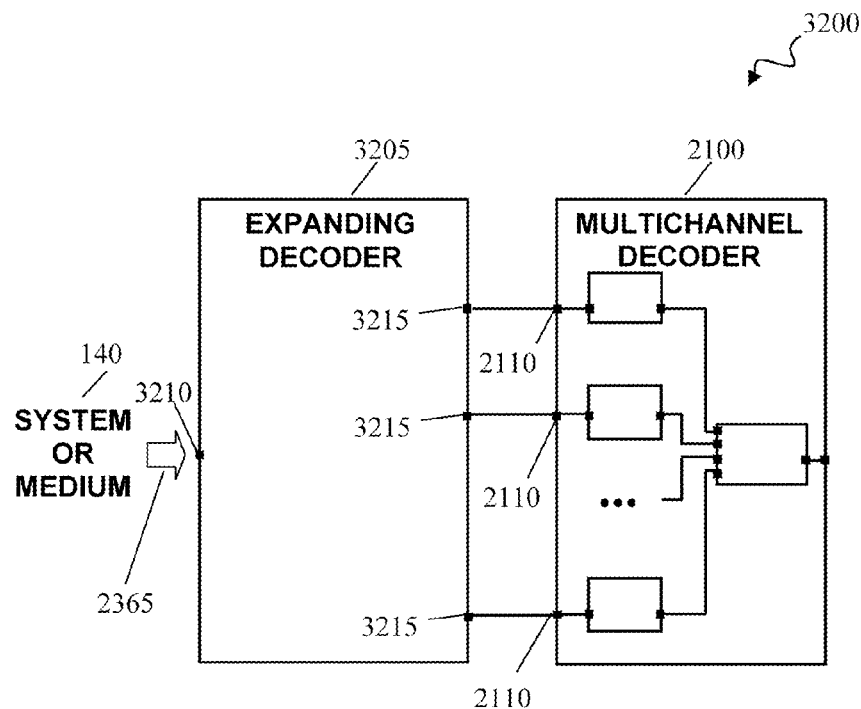
FIG. 32 is a schematic representation of an implementation of system in which information can be decoded.

FIG. 32 is a schematic representation of an implementation of system in which information can be decoded, namely, a system 3200. System 3200 includes a multichannel decoder 2100 and an expanding decoder 3205.

Expanding decoder 3205 is a component that expands one or more input signals into a collection of output signals. Expanding decoder 3205 includes an input 3210 and a collection of one or more outputs 3215. Input 3210 receives a signal 2365 from a system or medium 140. Expanding decoder 3205 expands signal 2365 and outputs a collection of one or more signals in which information is encoded by the timing of the occurrence of events within time intervals on one or more outputs 3215 to multichannel decoder 2100.

System 3200 can be used in isolation or in conjunction with other devices. For example, system 3200 can be used as weighting expander 37, amplitude decoder 39, and time-based decoder 41 (FIG. 1A).

Figure 33:
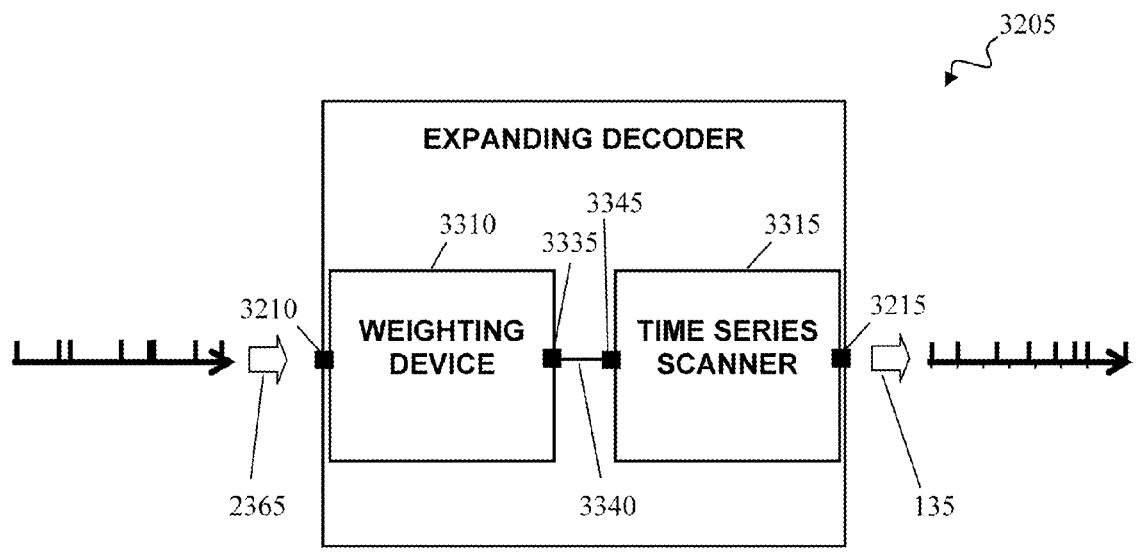
FIG. 33 is a schematic representation of one implementation of an expanding decoder.

FIG. 33 is a schematic representation of one implementation of an expanding decoder 3205. Decoder 3205 is a component that decodes information in a signal that includes a timed series of events into a time-based code signal in which information is encoded by the timing of the occurrence of events within time intervals. Decoder 3205 can thus decode a signal such as signal 2365 (FIG. 30) into a signal such as signal 1220 (FIG. 12).

In addition to input 3210, and one or more output 3215, decoder 3205 includes a weighting device 3310 and a time series scanner 3315. Weighting device 3310 is a component for weighting events in a signal that includes a timed series of events. Time series scanner 3315 is a component that scans for a time series that, when input into an appropriately referenced binary-to-analog converter, yields a time-based code signal in which information is encoded by the timing of the occurrence of events within time intervals.

Input 3210 of expanding decoder 3205 receives signal 2365. Signal 2365 includes a timed series of events. Weighting device 3310 is coupled to input 3210 and also includes an output 3335. Output 3335 provides a net series of amplitude events 3340.

Time series scanner 3315 includes an input 3345 and is coupled to output 3215 of decoder 3305. Input 3345 receives events 3340 and outputs a time-based code signal in which information is encoded by the timing of the occurrence of events within time intervals. For example, output 3215 can provide a signal 135 to a system or a medium.

Expanding decoder can be used in isolation or in conjunction with other devices. For example, expanding decoder can be used as weighting expander 37 and amplitude decoder 39 (FIG. 1A).

Figure 34:
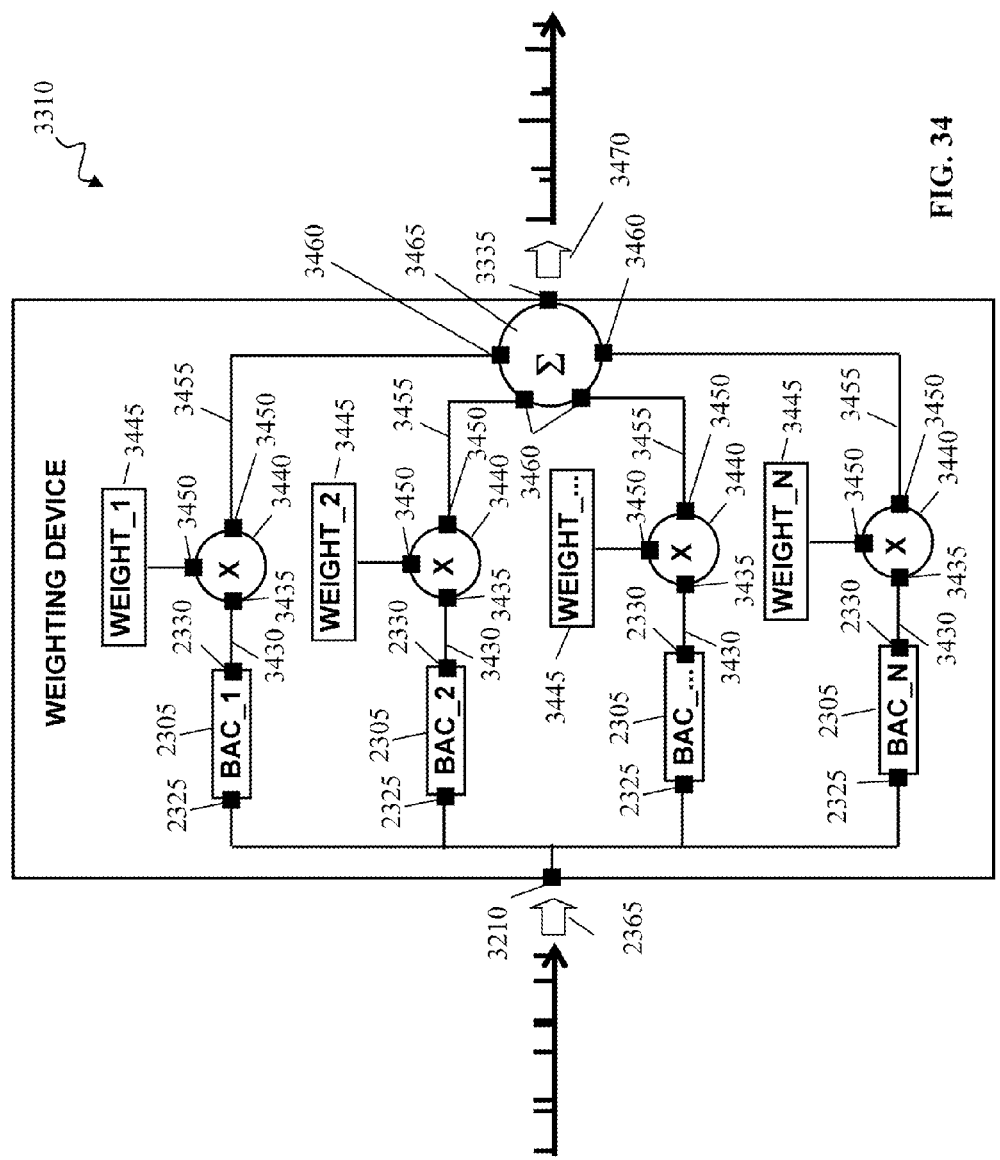
FIG. 34 is a schematic representation of a weighting device.

FIG. 34 is a schematic representation of a weighting device 3310. Weighting device 3310 is a component for weighting events in a signal that includes a timed series of events. For example, weighting device 3310 can weight events 3005 of signal 2365 (FIG. 30). As described further below, the weights with which weighting device 3310 weights the events can be selected to based on the success in representing a mathematical or other operation on a particular signal on an input channel 2340 of a compressing encoder 2205 (FIG. 23). For example, in some implementations, the weights with which weighting device 3310 weights the events can be selected to perform one or more of data compression and encryption operations on signals on input channel 2340, text processing operations on signals on input channel 2340, number processing operations on signals on input channel 2340, image processing operations on signals on input channel 2340, and signal processing operations on signals on input channel 2340. Weighting device 3310 can be part of expanding decoder 3205 (FIG. 33).

Weighting device 3310 includes an input 3210, an output 3335, a collection of binary-to-analog converters 2305, a collection of multipliers 3440, a collection of weights 3445, and a summer 3465. Input 3210 receives signal 2365 that includes a timed series of events. Input 3210 distributes signal 2365 to inputs 2325 of binary-to-analog converters 2305. Each binary-to-analog converter 2305 weights the amplitude of individual events in an input time series of events as a function of the timing of other events in the input time series. For example, each binary-to-analog converter 2305 can use multiple time-sensitive parameters to generate individual weights for each individual event based on the timing of predecessor events within signal 2365. In general, each binary-to-analog converter 2305 applies the generated weights to individual events, e.g., by multiplying the events by the weights and outputting the weighted events at relative times that correspond to the timing of the unweighted events within signal 2365.

In some implementations, the collection of binary-to-analog converters 2305 can be constructed using a process such as process 3900 (FIG. 39). In some implementations, the set of binary-to-analog converters 2305 in weighting device 3310 can be the complete set of binary-to-analog converters constructed using process 3900.

Each binary-to-analog converter 2305 includes output 2330 onto which the weighted timed series of events 3430 is output. The weighted timed series of events 3430 are provided as an input to a respective multiplier 3440. Multipliers 3440 are components that are configured to multiply a weighted timed series of events by another weight 3445. As described further below, weights 3445 can be determined during a training process. For example, each weight 3445 can be determined according to the success of a corresponding binary-to-analog converter 2305 in representing a particular signal 135 input into a channel 2340 of an compressing encoder 2205. As another example, weights 3445 can be determined according to the success of a respective binary-to-analog converter 2305 in representing a mathematical or other operation on a particular signal 135 input into a channel 2340 of an compressing encoder 2205.

Each weight 3445 can be received by a multiplier 3440 on a respective input 3450. Weights 3445 can be stored, e.g., at one or more data storage devices. Multipliers 3440 are components that scale the weighted timed series of events 3430 received on input 3435 according to weight 3445. Multipliers 3440 can scale the weighted timed series of events linearly or non-linearly. For example, in some implementations, multipliers 3440 can use weights 3445 as scalar weights and multiply the weighted events in each timed series by a corresponding weight 3445. In some implementations, multipliers 3440 can use weights 3445 to scale that various weighted events in each timed series nonlinearly or otherwise.

Each multiplier 3440 outputs the scaled and weighted timed series of events 3455 over an output 3450 which is coupled to inputs 3460 of a summer 3465. Summer 3465 is a component that sums these scaled and weighted events 3455 at each time in the input scaled and weighted timed series to generate a net series of amplitude events 3470.

In some implementations, summer 3465 can include a dynamic threshold for generating an amplitude event in net series 3470. A dynamic threshold is a threshold that changes. The dynamic threshold can be a lower cutoff for the inclusion of an amplitude event in net series 3470. In other words, if the sum of scaled and weighted events at a first time is below the lower cutoff, this sum is not included in net series 3470 even though the sum is not zero. The dynamic threshold can be changed to control the number of amplitude event in net series 3470. For example, the dynamic threshold can be changed to ensure that the number of amplitude events in net series 3470 is identical to the number of events in input signal 2365. In some implementations, summer 3465 first sums scaled and weighted events at each time in the input scaled and weighted timed series, and then the dynamic amplitude is gradually lowered until the number of amplitude events in net series 3470 is identical to the number of events in signal 2365. This allows the same dynamic threshold to apply for the entire net series 3470.

In the illustrated implementation, the amplitude events within net series 3470 are separated by non-uniform periods. This is not necessarily the case. Instead, summer 3465 can output the amplitude events within net series 3470 without timing information. In light of the dynamic thresholding described above, summer 3465 can in effect output a list of the amplitudes of the largest amplitude events as net series 3470 without describing the timing between those events. The order of the amplitudes in such a list can correspond to the order in which such events occurred.

Figure 35:
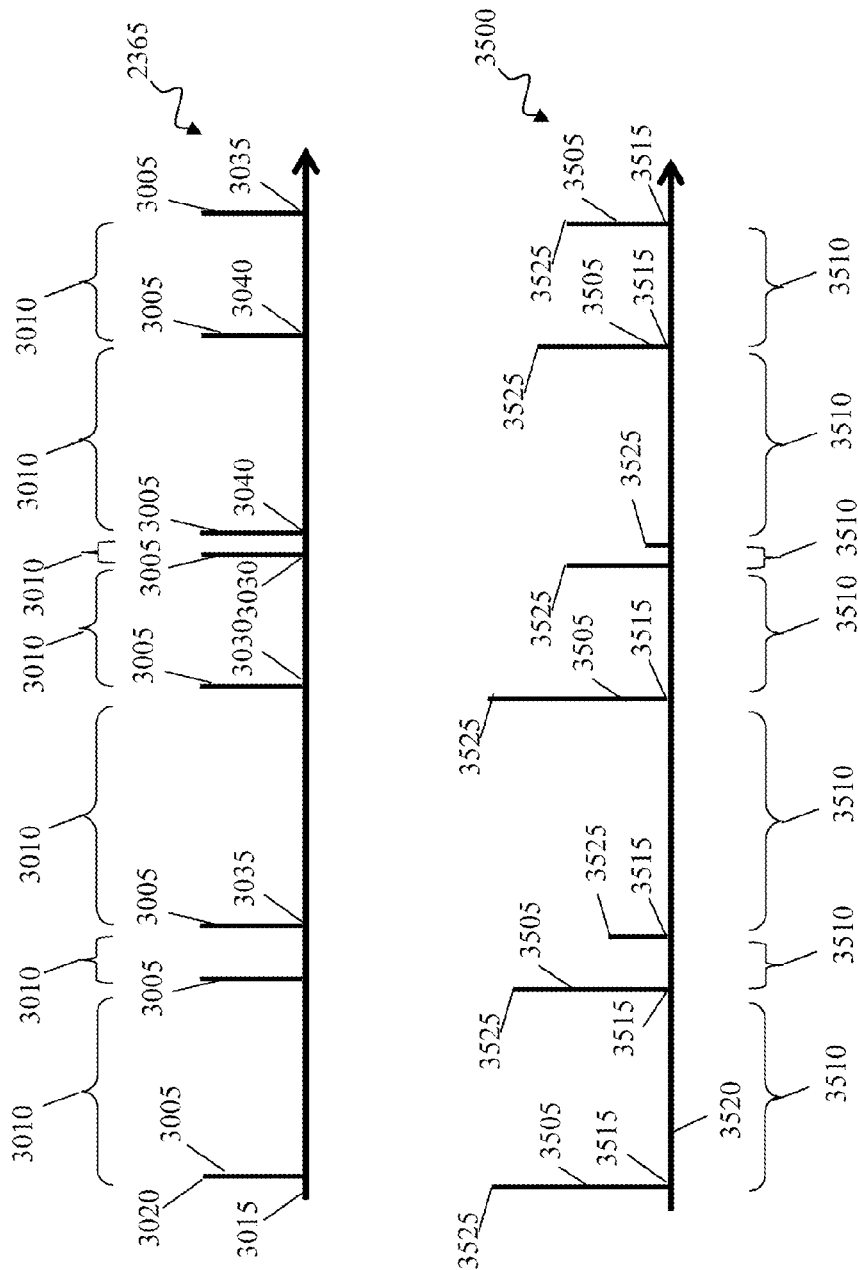
FIG. 35 is a schematic representation of weighting the amplitude of individual events in a time series of events as a function of the timing of other events in the time series.

FIG. 35 is a schematic representation of weighting the amplitude of individual events in a time series of events as a function of the timing of other events in the time series. The illustrated weighting can be performed by a binary-to-analog converters such as binary-to-analog converter 2305 (FIG. 28). In the illustrated implementation, signal 2365 includes a timed series of events 3005 that are separated from one another by time spans 3010. The duration of time spans 3010 embodies the integration of the amplitude sequences that includes weighted events. Signal 2365 can thus be output, e.g., from an integrator such as one of integrators 2310, 2400, 2500, 2600, 2700.

Signal 2365 is weighted to form a weighted time signal 3500. Weighted time signal 3500 includes a collection of events 3505 that are separated from one another by time spans 3510.

In the illustrated implementation, events 3505 are pulses that transition from a baseline (i.e., a "resting") state 3520 to a high (i.e., an "excited") state 3525 and then return to the baseline resting state 3520. The level of high state 3525 differs for different events 3505. The level of high state 3525 is the amplitude of event 3505 and a result of the weighting. The level of high state 3525 (i.e., the amplitude of each event 3505) embodies the timing of that event 3505 within signal 2365 and the timing of at least some of the other events 3505 within signal 2365. In other words, information encoded by the timing of two or more events 3505 within signal 2365 is embodied within the amplitudes of each event 3505. As described above, in some implementations, the amplitudes of each event 3505 can embody the timing only of predecessor events 3505.

In the illustrated implementation, some events 3505 are increased in amplitude relative to respective corresponding events 2365 and some events 3505 are decreased in amplitude relative to respective corresponding events 2365.

Time spans 3510 between the occurrence of events 3505 within weighted time signal 3500 are scaled to time spans 3010 between occurrence of events 3005 within 2365. In the illustrated implementation, time spans 3510 are one-to-one scaled to time spans 3010. In other words, the time span 3010 that separates a first pair of events 3005 is identical to the time span 3510 that separates a pair of events 3505 that corresponds to the first pair.

Figure 36:
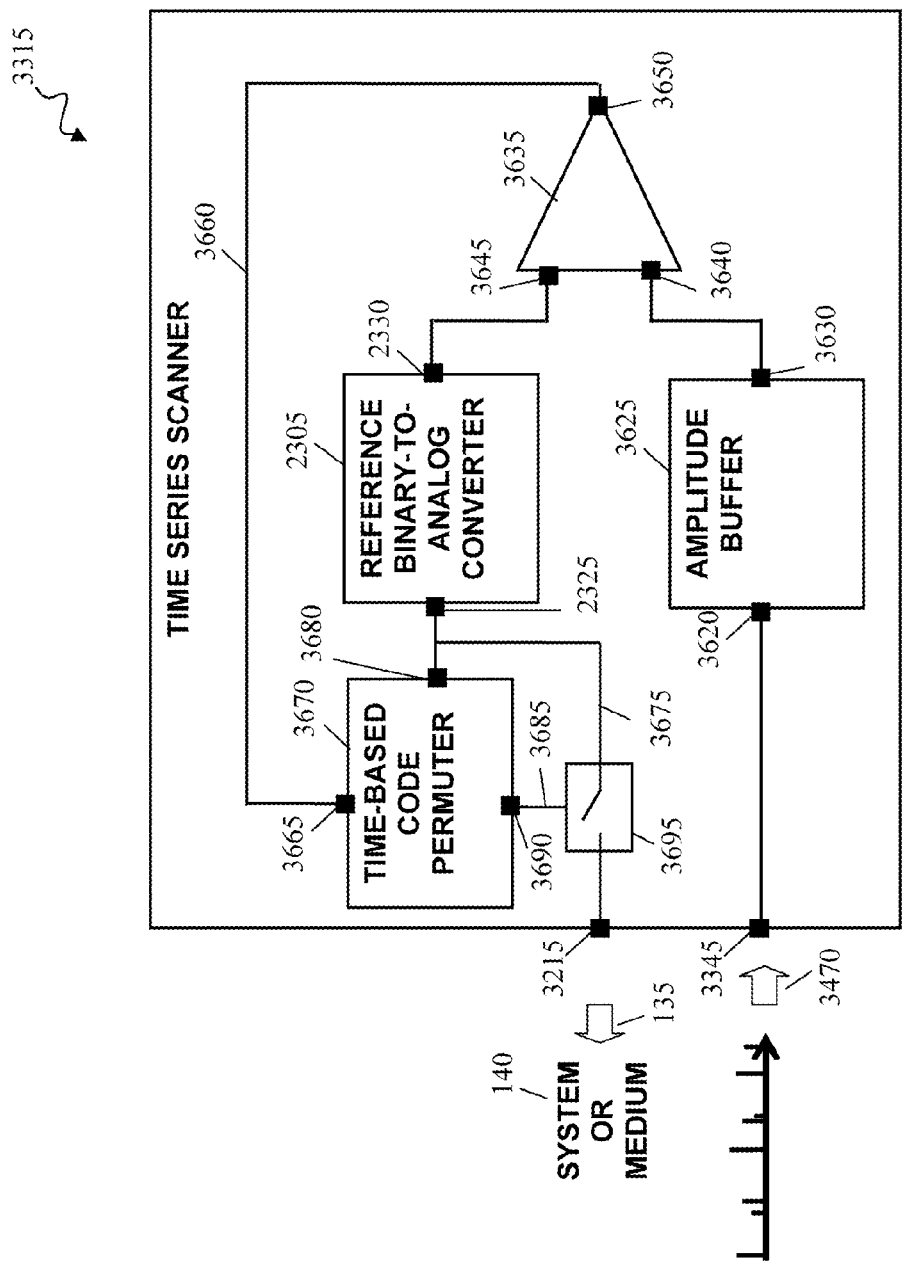
FIG. 36 is a schematic representation of a time series scanner.

FIG. 36 is a schematic representation of a time series scanner 3315. Time series scanner 3315 is a component that scans for a time series that, when input into an appropriately referenced binary-to-analog converter, yields a time-based code signal in which information is encoded by the timing of the occurrence of events within time intervals. For example, time series scanner 3315 can scan for a time-based code signal 135 that approximates or is the same as the time-based code signal 135 input into a channel 2340 of a compressing encoder 2205 (FIG. 23).

Time series scanner 3315 includes an input 3345 and an output 3215. Input 3345 receives net series 3470 of amplitudes or amplitude events. Input 3345 conveys net series 3470 to an input 3620 of an amplitude buffer 3625. Amplitude buffer 3625 is a component that buffers the amplitudes in net series 3470 for comparison by a comparator 3635. In some implementations, amplitude buffer 3625 can include a cache or other memory that stores the magnitudes of the amplitudes or amplitude events of net series 3470. In implementations in which net series 3470 includes timing information, amplitude buffer 3625 can include components for removing the timing information from net series 3470 without losing the amplitude information. Amplitude buffer 3615 includes an output 3630 that provides the buffered amplitudes to an input 3640 of comparator 3635.

Comparator 3635 also includes an input 3645 and an output 3650. Comparator 3635 is a component that compares amplitudes on input 3640 with amplitudes on input 3645 and generates an indication of the result of the comparison on output 3650. The result of the comparison embodies the differences between the amplitudes on inputs 3640, 3645. For example, when the differences between the amplitudes on inputs 3640, 3645 are very small, output 3650 can output a small signal.

Comparator 3635 compares amplitudes buffered in amplitude buffer 3615 with amplitudes output from a reference binary-to-analog converter 2305. Although shown as a single component, comparator 3635 can include a collection of comparators that are connected to compare individual amplitudes, e.g., in parallel. In other words, a first comparator can compare a first amplitude buffered in amplitude buffer 3625 with a first amplitude output from reference binary-to-analog converter 2305, a second comparator can compare a second amplitude buffered in amplitude buffer 3625 with a second amplitude output from reference binary-to-analog converter 2305, and so on. The results of the individual comparisons by such a collection of comparators can be output to a collection of one or more outputs.

The output or outputs 3660 of comparator 3635 are provided to an input 3665 of a time-based code permuter 3670. Time-based code permuter 3670 is a component that permutes a time-based code in response to the feedback by output/s 3660. In particular, time-based code permuter 3670 permutes a time-based code to minimize the differences between the amplitudes on inputs 3640, 3645 of comparator 3635. Time-based code permuter 3670 outputs a candidate time based code 3675 over an output 3680. As described further below, the candidate time based code is proposed as a solution approximating a time-based code signal 135 input to a channel 2340 of a compressing encoder 2205 (FIG. 23). For example, time-based code permuter 3670 can use successive approximation to generate candidate time based codes 3675.

Code 3675 is provided to an input 2325 of reference binary-to-analog converter 2305. Reference binary-to-analog converter 2305 is a component that can weight the amplitude of individual events of the candidate time based code as a function of the timing of other events in the candidate time based code, e.g., using multiple time-sensitive parameters to generate individual weights for each individual event based on the timing of predecessor events within the time based code. Reference binary-to-analog converter 2305 can output weighted events at relative times that correspond to the timing of the unweighted events within the candidate time based code or without timing information. In other words, reference binary-to-analog converter 2305 can output an ordered list of amplitude weights without describing the timing between those events in the input candidate time based code. In some implementations, reference binary-to-analog converter 2305 can include a buffer, a cache, or other memory that stores the magnitudes of the weights or weighted amplitudes.

In some implementations, reference binary-to-analog converter 2305 can be identical to a binary-to-analog converter 2305 of compressing encoder 2205 (FIG. 23). For example, the time-sensitive parameters used by reference binary-to-analog converter 2305 in time series scanner 3315 can be identical to the time-sensitive parameters used by binary-to-analog converter 2305 in the channel 2340.

In some implementations, time-based code permuter 3670 can also include a comparator that compares the feedback provided by outputs 3660 to a threshold level that embodies an acceptable amount of difference between the amplitudes on inputs 3640, 3645 of comparator 3635. Time-based code permuter 3670 can permute the candidate time based code until the acceptable amount of difference is reached. In other words, in implementations where fidelity is very important, the threshold level can be more stringent and set to require that the difference between the amplitudes on inputs 3640, 3645 of comparator 3635 be relatively small or zero. Under such circumstances, time-based code permuter 3670 will generally perform relatively more permutations. In implementations where fidelity is less important and factors such as, e.g., speed are more important, the threshold level can be less stringent and set to allow the difference between the amplitudes on inputs 3640, 3645 of comparator 3635 to be relatively large. Under such circumstances, time-based code permuter 3670 will generally perform relatively fewer permutations. In some instances, the acceptable amount of difference between the amplitudes on inputs 3640, 3645 of comparator 3635 may be reached after more or fewer permutations than generally required. For example, time-based code permuter 3670 may, by happenstance, output a candidate time based code after very few permutations that satisfies even a very stringent threshold level. In some implementations, the stringency of the threshold can be tunable, e.g., by a user, for operation in different contexts.

In response to the feedback from outputs 3660 reaching or crossing the threshold level, time-based code permuter 3670 can output a selection signal 3685 over an output 3690. Selection signal 3685 is an indication that the difference between the amplitudes on inputs 3640, 3645 of comparator 3635 has reached an acceptably small level. The selection signal 3685 can be set so as to effectuate the close of a switch 3690, thereby connecting output 3215 with code 3675. This conveys the candidate time based code 3675 to output 3215 for output to system or medium 140 in signal 135.

Figure 37:
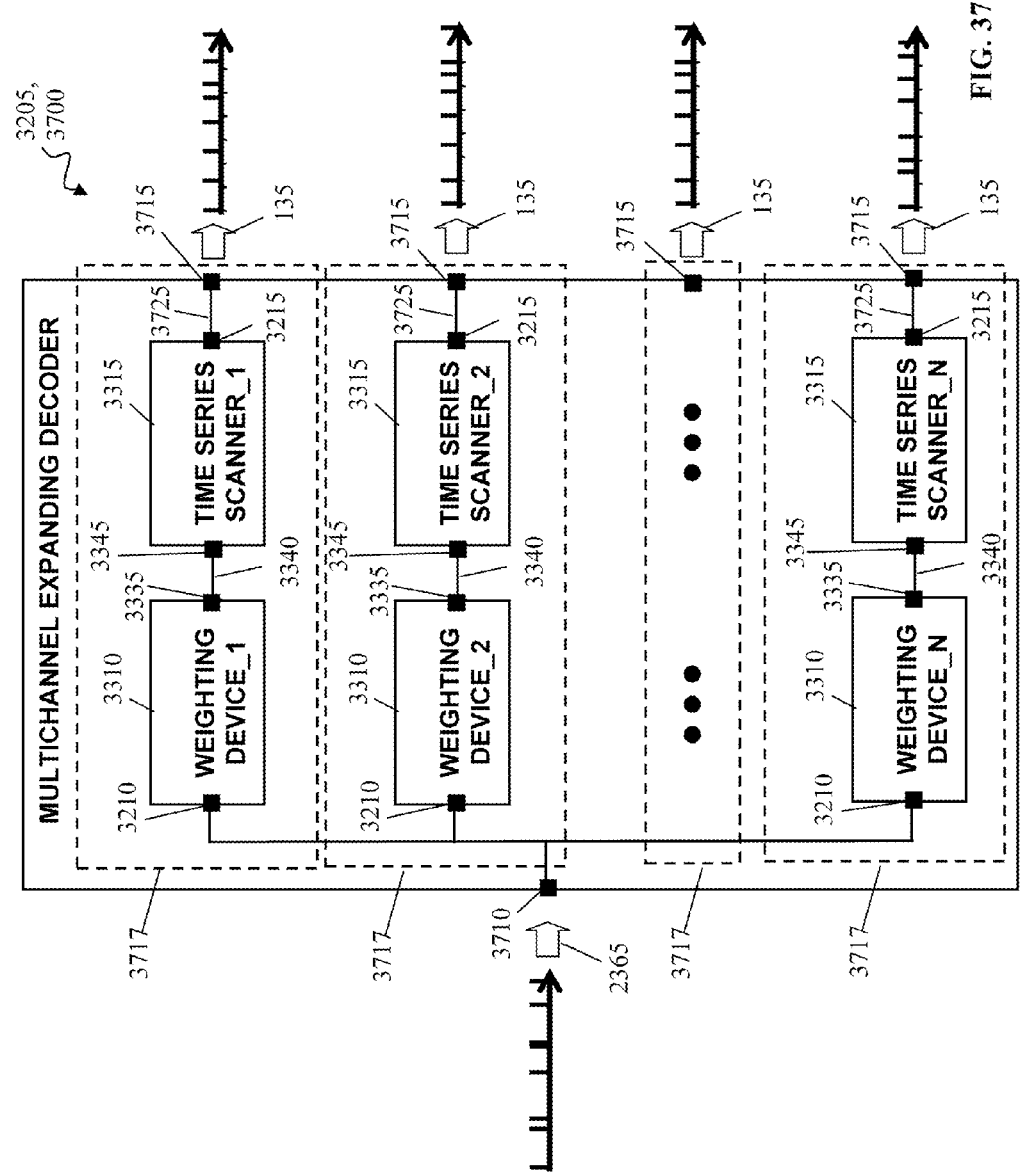
FIG. 37 is a schematic representation of an expanding decoder.

FIG. 37 is a schematic representation of an expanding decoder 3205, namely, a multichannel expanding decoder 3700. Decoder 3700 is a component that decodes information in a signal that includes a timed series of events into a time-based code signal in which information is encoded by the timing of the occurrence of events within time intervals. Decoder 3700 can thus decode a signal such as signal 2365 (FIG. 30) into a collection of signals 135. Decoder 3700 can be used in isolation or in conjunction with other devices. For example, decoder 3700 can be used as weighting expander 37 and amplitude decoder 39 (FIG. 1A).

Decoder 3700 includes a collection of weighting devices 3310, a collection of time series scanner 3315, an input 3710, and a collection of one or more outputs 3715. Each weighting device 3310 is paired with a corresponding time series scanner 3315. These pairs can form a collection of decoding channels 3717 in decoder 3700. Decoder 3700 is thus a parallel combination of multiple decoding channels 3717, each of which forms a separate expanding decoder 3205.

In decoder 3700, each weighting device 3310 can weight events using an associated set of binary-to-analog converters 2305 and an associated set of weights 3445. In some implementations, at least some of the binary-to-analog converters 2305, at least some of the weights 3445 of different weighting devices 3310, or both will differ. For example, in implementations where the set of binary-to-analog converters 2305 is a complete set of binary-to-analog converters 2305 constructed using a process such as process 3900 (FIG. 39), the same binary-to-analog converters 2305 can be included in all weighting devices 3310 in multichannel expanding decoder 3700. However, at least some of the weights 3445 of different weighting devices 3310 will differ. For example, in some implementations, many weights 3445 of different weighting devices 3310 will be zero or close to zero, but some weights 3445 will not. As a consequence of these differences, when the same timed series of events is input into different weighting devices 3310, each weighting device 3310 will generally output different net series of amplitude events. This is not necessarily the case, however, as happenstance may result in different weighting devices 3310 outputting the same net series of amplitude events despite different binary-to-analog converters 2305 and weights 3445.

In decoder 3700, each time series scanner 3315 can scan for a time-based code signal using different components. For example, each time series scanner 3315 can include a different reference binary-to-analog converter 2305. For example, the reference binary-to-analog converter 2305 in each time series scanner 3315 can be identical to binary-to-analog converter 2305 of a channel 2340 of a compressing encoder 2205 (FIG. 23).

As a consequence of the different components in different time series scanners 3315, different time series scanners 3315 generally output different time series even in response to the same net series of amplitude events being received on inputs 3345. Further, the differences between different time series scanners 3315 will yield different time series even in instances where, through circumstance, the same time series is output by different time series scanners 3315. Also, different time series scanners 3315 may occasionally yield the same time series in response to different net series of amplitude events being received on inputs 3345.

Input 3710 of decoder 3700 receives a signal 2365. Signal 2365 includes a timed series of events. Input 3700 distributes signal 2365 to inputs 3210 of weighting devices 3310. The same single signal 2365 is thus input into different weighting devices 3310 in the collection.

The one or more outputs 3215 of each time series scanner 3315 produce a time-based code signal 3725 in which information is encoded by the timing of the occurrence of events within time intervals. Each signal 3725 conveys a time-based code to a respective output 3715 of the decoder 3700. One or more outputs 3715 provide time-based code signals 135 in which information is encoded by the timing of the occurrence of events within time intervals to, e.g., a system or medium 140.

Figure 38:
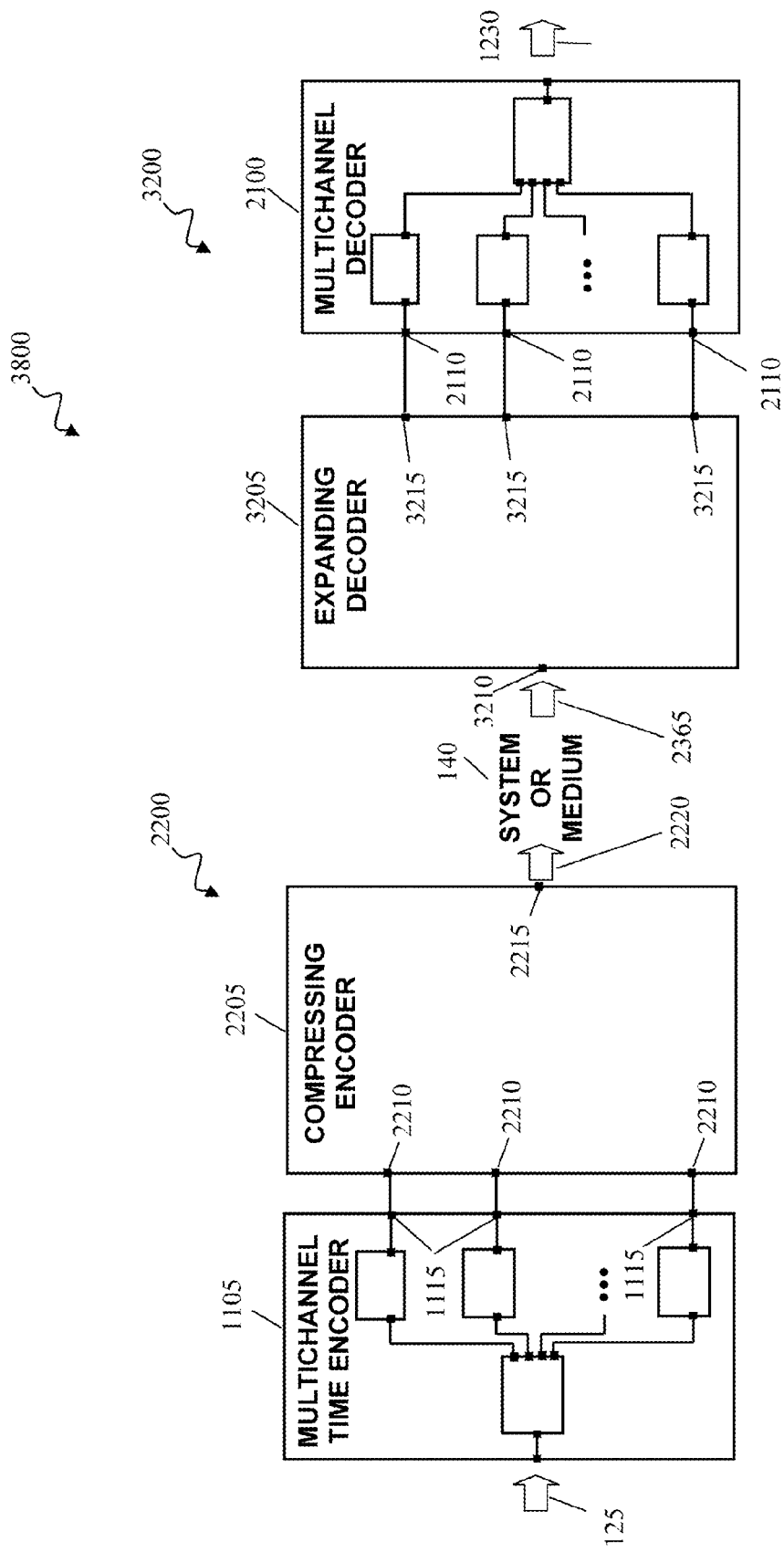
FIG. 38 is a schematic representation of an implementation of system in which information can be encoded, and decoded.

FIG. 38 is a schematic representation of an implementation of a system in which information can be encoded and decoded, namely, a system 3800. System 3800 includes system 2200 (FIG. 22) and system 3200 (FIG. 32). System 3800 can be, e.g., a data storage system, a communications system, and/or a data compression system. System 3800 can be used in isolation or in conjunction with other devices. For example, system 3800 can be used as time-based encoder 25, amplitude weighting component 27, compressor 29, weighting expander 37, amplitude decoder 39, and time-based decoder 41 (FIG. 1A).

In system 3800, multichannel time encoder 1105 receives signal 125 and outputs a collection of time based code signals on outputs 1115. The time based code signals are received by one or more inputs 2210 of compressing encode, which compresses the received time based code signals and outputs a compressed signal 2220 on output 2215 to system or medium 140. Expanding decoder 3205 receives signal 2365 from system or medium 140 at input 3210. Expanding decoder 3205 expands signal 2365 and outputs a collection of one or more signals in which information is encoded by the timing of the occurrence of events within time intervals on one or more outputs 3215 to multichannel decoder 2100. Multichannel decoder 2100 receives the signals, and decodes and aggregates them into output signal 1230 that expresses information in an ordered, finite set of discrete digits.

Figure 26:
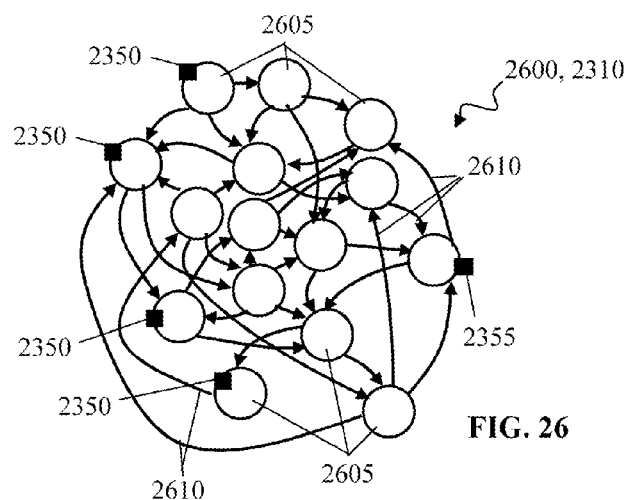
Figure 27:
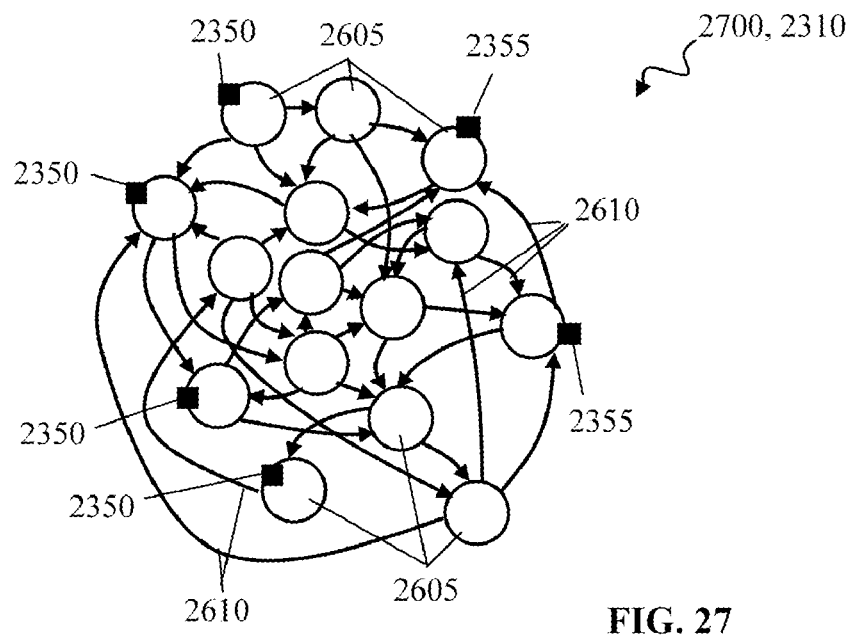

FIG. 39 is a flow chart of a process 3900 for constructing a collection of binary-to-analog converters. For example, process 3900 can be used to construct binary-to-analog converters 2305 in a weighting device 3310 (FIG. 34). As another example, process 3900 can be used to construct binary-to-analog converters in a compressing encoder 2205 (FIG. 23). As another example, process 3900 can be used to construct reference binary-to-analog converters in time series scanner 3315 (FIG. 26). Process 3900 can be performed in isolation or in conjunction with other activities. For example, process 3900 can be part of a process 4100 (FIG. 41) for creating an encoder/decoder pair. Process 3900 can be performed by one or more data processing devices.

As described previously, a set of binary-to-analog converters can use multiple time-sensitive parameters to generate individual weights for individual events in a time series of events based on the timing between events in an input signal. In some implementations, the weights can be generated based on the timing of predecessor events within the input signal. At stage 3905 a range of possible values for each time-sensitive parameter is assigned. For example, the time-sensitive parameters can be constrained to be within the same normalized range, e.g., between zero and one.

A number of discrete values within each range can be identified (stage 3910). In some implementations, the discrete values can be distributed within each range so that they are all separated from their nearest neighbor by a single distance. For example, for a time-sensitive parameter that has been assigned a range of between zero and one, five separate values of zero, 0.25, 0.5, 0.75, and one can be identified. In some implementations, the discrete values are not uniformly distributed within each range but rather distributed according to their use in the binary-to-analog converters. For example, the values of a time-sensitive parameter that appears in a non-linear function can be distributed according to the position of the time-sensitive parameter in the non-linear function. In some implementations, the number of discrete values within each range can be selected to be about the same as or larger than the number of weighting device 3310 and time series scanner 3315 pairs within a multichannel expanding decoder 3700 (FIG. 37).

One of the identified discrete values for each parameter used by a binary-to-analog converter is selected (stage 3915). The values can be selected using a random or a non-random process. In some implementations, a selected value of a given parameter can be excluded from again being selected for that parameter. In effect, this would require the constructed binary-to-analog converters to all have different values of each parameter. In these implementations, if there are N discrete values within each range of Y different parameters, a number (N*Y) possible combinations of values can be selected.

In some implementations, the same value can be selected multiple times for multiple binary-to-analog converters. For example, binary-to-analog converters can be constructed using an exhaustive combinatorial combination of the identified values. For example, if there are N discrete values within each range of Y different parameters, a number ($N^Y$) possible combinations of values can be selected.

In some implementations, the same value can be selected multiple times for multiple binary-to-analog converters but the combinatorial combination of the identified values need not be exhaustive. For example, if there are N discrete values within each range of Y different parameters, a number greater than (NY) but less than ($N^Y$) possible combinations of values can be selected.

A binary-to-analog converter can be constructed using the selected values (stage 3920). A check can be made to determine if the desired number of binary-to-analog converters has been constructed (stage 3930). In some implementations, the desired number of binary-to-analog converters will be sufficiently large so that, for a single input time series of events, almost any possible weighted time series for a given set of parameters and their ranges can be generated by some linear superposition of the one or more outputs of the binary-to-analog converters in the collection. If the desired number of binary-to-analog converters has not yet been constructed, the process returns to select additional parameter values and construct an additional binary-to-analog converter (steps 3915, 3920). If the desired number of binary-to-analog converters has been constructed, a device can be assembled using the constructed binary-to-analog converters (stage 3935).

Figure 40:
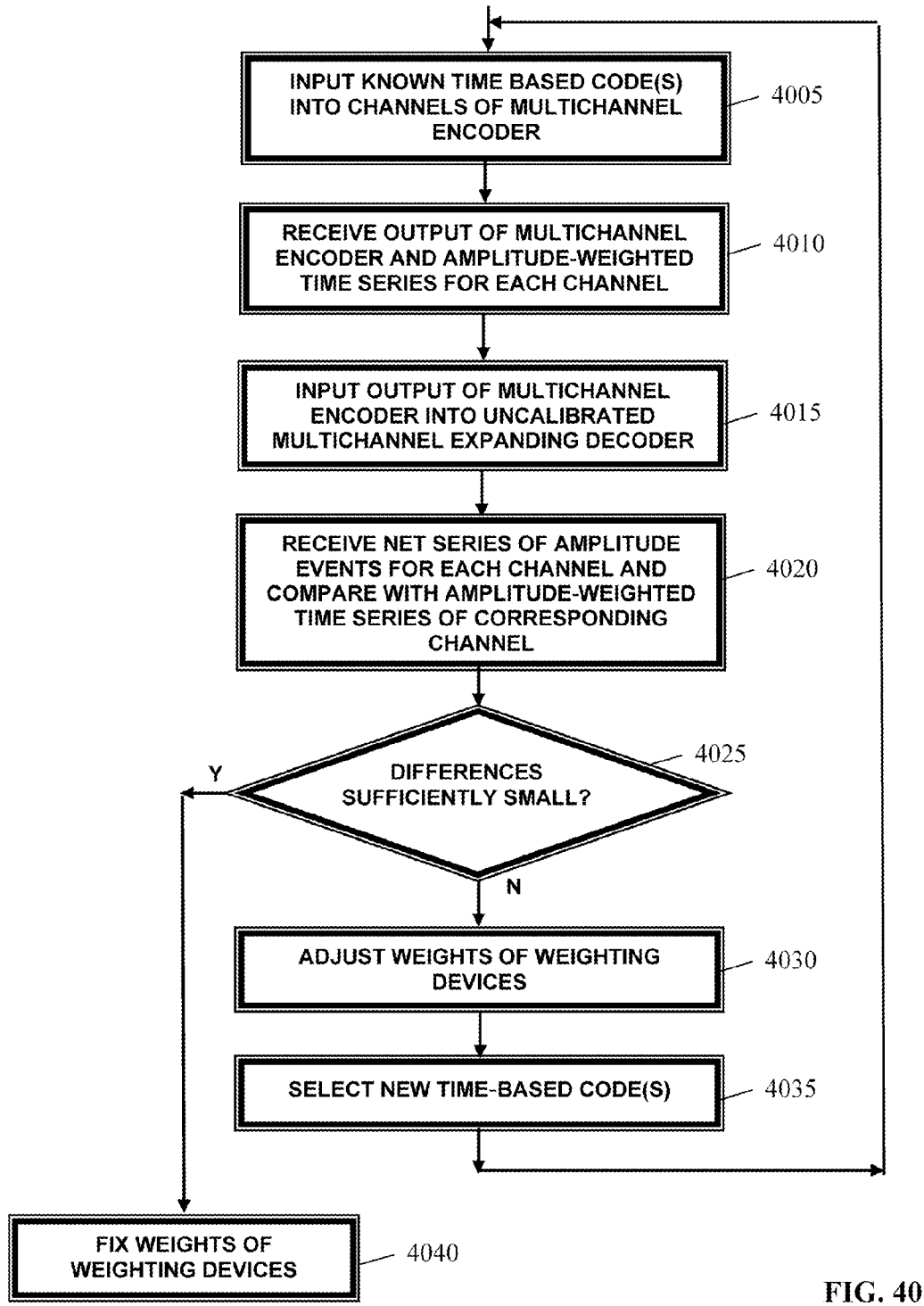
FIG. 40 is a flow chart of a process for calibrating a weighting device.

FIG. 40 is a flow chart of a process 4000 for calibrating a weighting device. For example, process 4000 can be used to calibrate weighting devices such as weighting device 3310 (FIG. 34). Process 4000 can be used in isolation or in conjunction with other activities. For example, process 4000 can be part of a process 4100 (FIG. 41) for creating an encoder/decoder pair. Process 4000 can be performed, for example, by one or more digital data processing devices.

One or more known time-based code signals can be input into the channels of a multichannel encoder (stage 4005). For example, the system can input one or more known time-based code signals 135 (FIG. 3) into inputs 2315 of compressing encoder 2205 (FIG. 23). In some implementations, the same time-based code signal 135 can be input into all channels.

The output signal of the multichannel encoder as well as the amplitude-weighted time series for each channel in the multichannel encoder can be identified (stage 4010). In some implementations, system can store a description of the amplitude-weighted time series and the output of the multichannel encoder. For example, in some implementations, the system can store the output signal from the multichannel encoder in a data storage device 3100 (FIG. 31).

The output signal from the multichannel encoder is provided as an input into an uncalibrated multichannel expanding decoder (step 4015). The multichannel decoder is uncalibrated in that has not been calibrated to operate in conjunction with the multichannel encoder that produced the particular output signal (i.e., the multichannel encoder from which the output signal is received in step 4010).

The net series of amplitude events for each channel of the multichannel expanding decoder is identified and compared to the amplitude-weighted time series of a corresponding channel (stage 4020). In some implementations, such comparisons can include measuring the amplitudes of events but discarding the timing of the events for both the net series of amplitude events and the amplitude-weighted time series for a given channel. For example, in some implementations, the system can form a sequential list of the amplitudes of the events in the amplitude-weighted time series and a sequential list of the amplitudes of the events in the net series of amplitude events. These lists do not describe the timing of the events in the either the amplitude-weighted time series or the net series of amplitude events. The amplitudes in the list can, however, be compared to determine the differences. In general, the results of the comparison are expressed on a channel-by-channel basis. However, in some implementations, the results of the comparison can be expressed in a value embodying the comparison of multiple channels.

In some implementations, the net series of amplitude events is compared with the result of a mathematical or other operation performed on the amplitude-weighted time series of a corresponding channel. For example, if a weighting device is to be calibrated to multiply a particular channel by two, the amplitude-weighted time series of that channel can first be multiplied by two and the result of that multiplication compared with the net series of amplitude events. The weights can then be used to perform the mathematical or other operations. For example, weights can be selected to perform one or more of data compression and encryption operations, text processing operations, number processing operations, image processing operations, and signal processing operations. In some implementations, different channels in a single device can use weights that perform different operations.

A determination is made whether the differences between the net series of amplitude events and the amplitude-weighted time series of corresponding channels are sufficiently small (stage 4025). For example, in some implementations, the system performing process 4000 can compare the differences to a threshold that embodies an acceptable level of differences on a channel-by-channel basis. In some implementations, the stringency of the threshold can be tunable, e.g., by a user, for operation in different contexts.

In response to determining that the differences between the net series of amplitude events and the amplitude-weighted time series of corresponding channels are not sufficiently small, the weights of weighting devices are adjusted (stage 4030). In some implementations, the weights are adjusted on a channel-by-channel basis. For example, the system can identify the weights of the weighted timed series of events output by individual binary-to-analog converters 320 that most closely resemble the amplitude-weighted time series. The weights 345 that are associated with those weighted timed series of events can be increased. As another example, the system can identify the weights of the weighted timed series of events output by individual binary-to-analog converters 320 that differ the most from the amplitude-weighted time series. The weights 345 that are associated with those weighted timed series of events can be decreased.

In some implementations, the input of the output signal from the multichannel encoder into the multichannel decoder can be repeated after incremental adjustments in the weights. The results of comparisons between successive net series of amplitude events with the amplitude-weighted time series of a corresponding channel can be taken as an indication whether the incremental adjustments have been appropriate. In other words, if the net series of amplitude events more closely resembles the amplitude-weighted time series for a given channel, the adjustments to that channel can be taken as favorable and further adjustments made. For example, weights can be further increased or decreased as the case may be.

On the other hand, if the differences between the net series of amplitude events and the amplitude-weighted time series increase, the adjustments to a channel can be taken as unfavorable and the weights returned to their previous values or changed in a different direction. For example, weights that were initially increased can be decreased and weights that were initially decreased can be increased.

One or more new time-based code signals are selected (stage 4035) in response to determining that the differences between the net series of amplitude events and the amplitude-weighted time series of corresponding channels are not sufficiently small. In some implementations, the new time-based code signals can be selected according to the differences between the new time-based code signals and the former time based code signals. For example, new time-based code signals that differ greatly from the former time based code can be preferentially selected. In other implementations, the new time-based code signals can be selected at random. The process can continue and input the one or more new time based codes into the channels of the multichannel encoder (stage 4005).

In response to determining that the differences between the net series of amplitude events and the amplitude-weighted time series of corresponding channels are sufficiently small, the weights of the weighting device can be fixed (stage 4040). After fixing the weights, the multichannel decoder is calibrated to operate in conjunction with the multichannel encoder that produced the particular output signal (i.e., the multichannel encoder from which the output signal is received in step 4010).

FIG. 41 is a flow chart of a process 4100 for creating an encoder/decoder pair. Process 4100 can be used in isolation or in conjunction with other activities. For example, process 4100 can include one or more of process 3900 (FIG. 39) and process 4000 (FIG. 40). Process 4100 can be performed by one or more digital data processing devices.

Process 4100 begins by constructing a collection of binary-to-analog converters (stage 4105). The binary-to-analog converters can be constructed in hardware, in software, or in combinations of hardware and software. The construction of the binary-to-analog converters can include a process such as process 3900 (FIG. 39).

An encoder using the binary-to-analog converters is assembled (stage 4110). In some implementations, each channel of the assembled encoder can include a different one of the binary-to-analog converters.

A collection of time series scanners is assembled using the same binary-to-analog converters (stage 4115). In some implementations, each time series scanner can include one of the binary-to-analog converters that appears in a channel of the encoder. The binary-to-analog converters in the time series scanners can act as reference binary-to-analog converters. The correspondence between the binary-to-analog converters in the channels of the encoder and the binary-to-analog converter in each time series scanner can be noted and used, e.g., in calibrating the weights of weighting devices.

A collection of weighting devices is assembled using the collection of binary-to-analog converters (stage 4120). In some implementations, the same binary-to-analog converters that are used to assemble the encoder and the collection of time series scanners are used to assemble the collection of weighting devices. In other implementations, completely different binary-to-analog converters are used to assemble the collection of weighting devices. In other implementations, combinations of the same and different binary-to-analog converters are used to assemble the collection of weighting devices.

In some implementations, binary-to-analog converters can appear (at least initially) in each weighting device. For example, in some implementations, the complete set of binary-to-analog converters that are constructed appear in each weighting device. As described further below, the weights that are used to weight the output of a binary-to-analog converters can be calibrated to zero, which in effect removes the binary-to-analog converter from the weighting device. In hardware implementations, binary-to-analog converters whose output is weighted to zero can be physically removed from a weighting device.

The weights in the weighting devices are calibrated (stage 4125). The calibration of the weights in the weighting devices can include a process such as process 4000 (FIG. 40).

The process 4100 encodes, compresses, or stores information using the encoder, the collection of time series scanners, and the collection of weighting devices (stage 4130).

Embodiments of the subject matter and the operations described in this specification can be implemented in digital electronic circuitry, or in computer software, firmware, or hardware, including the structures disclosed in this specification and their structural equivalents, or in combinations of one or more of them.

Aspects of the subject matter described in this specification can be implemented as one or more computer programs, i.e., one or more modules of computer program instructions, encoded on a computer storage medium for execution by, or to control the operation of, data processing apparatus. For example, lines and signals that convey information can be implemented as variables or objects that are passed between computer program components (e.g., computer programs, software modules, subroutines, procedures, and functions) to convey information. Detectors, comparators, timers, switches and selectors can be implemented as computer program components that cooperate to perform operations.

For example, the encoding/compressing operations performed by encoder-compressor 10 (FIG. 1A) can be implemented in accordance with the following instructions.

Encoding-Compressing

```
//Convert a sequence of binary numbers to a wave vector with binary digits
(BinarySignal)
Function file2binary(str)
String str
    Make/o/n=(strlen(str)) in__BinarySignal
    in__BinarySignal[ ]=str2num(str[p])
End
// Convert a single vector of binary numbers to a set of Binary waves
(Bytes)
Function binary2bytes( )
NVAR numChannels = numChannels
WAVE in__BinarySignal
Variable/G numBits = numpnts(in__BinarySignal)
Variable n,i
String in__Byte
// Initialize
numChannels=numBits/8
i=0; n=1
do
    in__Byte = "in__Byte"+num2str(n)
    Duplicate/o/R=[i,(i+7)] in__BinarySignal in__Byte_w
    Duplicate/o in__Byte_w $in__Byte
    i+=8
    n+=1
    While(n<numChannels+1)
End
//Convert Bytes to nBinary
Function bytes2nBinary( )
NVAR timeInterval
NVAR numChannels = numChannels
NVAR dt = dt
Variable n,i,j
String in__Byte
String in__nBinary
//initialize
dt = timeInterval
n=1
do
    // Input Waves
    in__Byte = "in__Byte"+num2str(n)
    Duplicate/o $in__Byte in__Byte_w
    InsertPoints 0,1, in__Byte_w
    in__Byte_w[0]=1 //add start bit
    InsertPoints 9,1, in__Byte_w
    in__Byte_w[9]=0 //add stop bit
    // Output Waves
    in__nBinary = "in__nBinary"+num2str(n)
    Make/o/n=(numpnts(in__Byte_w)*2)in__nBinary__out
    // Operation
    in__nBinary__out = 0
    i=0
    j=0
    do
        if(in__Byte_w[i]==1)
        in__nBinary__out[j]=1
        else; in__nBinary__out[j+1]=1
        endif
        i+=1
        j+=2
    while(i<numpnts(in__Byte_w))
```

```
// Ouput
Duplicate/o in_nBinary_out $in_nBinary
SetScale/P x 0,(0.5*dt)/,"", $in_nBinary
n+=1
While(n<numChannels+1)
End
// Convert nBinary to Analog Amplitudes on Binary Times
(aAmps_bTimes)
Function nBinary2iBAC_r( )
NVAR numChannels = numChannels
Variable n,i,j
Variable Ase, Use, u, D, F
Variable R, E
Variable elapsedTime
String in_nBinary
String iBAC
String iBAC_r
// Initialize
n=1
Do
    // Input waves
    in_nBinary = "in_nBinary"+num2str(n)
    Duplicate/o $in_nBinary in_nBinary_w, iBAC_r_w
    iBAC = "iBAC"+num2str(n)
    Duplicate/o $iBAC ibac_w
    Make/o/n=0 EventTimes
    Findlevels/Q/D=EventTimes in_nBinary_w 1
    // Output waves
    iBAC_r = "IBAC_r"+num2str(n)
    // Initialize BACs
    Ase = ibac_w[0]; Use = ibac_w[1]; D = ibac_w[2];
    F = ibac_w[3]; R= 1; u=Use
    // Operation
    E = Ase*u*R
    iBAC_r_w[0]=E
    i=1;j=0
    do
        if(in_nBinary_w[i]==0)
            iBAC_r_w[i]=0; else
            elapsedTime = (EventTimes[j+1]/1000)-(EventTimes[j]/1000)
            u = Use+((u*(1-Use))*exp(-elapsedTime/F))
            R = 1+((R-R*u-1)*exp(-elapsedTime/D))
            E = Ase*u*R
            iBAC_r_w[i]=E
            j+=1
        endif
        i+=1
    while(i<numpnts(in_nBinary_w))
    // Output
    wavestats/q iBAC_r_w
    iBAC_r_w=iBAC_r_w/v_max
    Duplicate/o iBAC_r_w $IBAC_r
n+=1
While(n<numChannels+1)
End
////////////////////////////////////////////////////////////////
// Integrate and Compress iBAC responses
Function Compress( )
NVAR tau = tau
NVAR IntDep = IntDep
NVAR numChannels = numChannels
Variable dt
Variable i,n,m
// Get dt
in_nBinary = "in_nBinary"+num2str(1)
Duplicate/o $in_nBinary temp_w
temp_w = 0
dt = pnt2x(temp_w, 1)-pnt2x(temp_w, 0)
//Activate analog device
i=1
Do
    AnalogIntegration( )
    i+=1
While(i<numpnts(sumAmps))
Wavestats/Q sumAmps
sumAmps = sumAmps/v_max
//Output wave
aEventsMessage = sumAmps*thresholdFunction( )
End
```

As another example, the expanding/decoding operations performed by expander-decoder 34 (FIG. 1A) can be implemented in accordance with the following instructions.

Expand and Decode

```
//Convert Time Events into Analog Amplitudes
Function aEventMessage2oBAC_r( )
NVAR numChannels = numChannels
NVAR num_oBACs
Variable n,i
Variable Ase, Use, u, D, F
Variable R, E
Variable elapsedTime
String oBAC
String oBAC_r
WAVE aEventMessage = aEventMessage
// Extract times
Findlevels/Q aEventMessage 1
Make/o/n=0 aTimesMessage
Findlevels/Q/D=aTimesMessage, aEventMessage 1
Make/o/n=(V_LevelsFound) oBAC_r_w
//Calculate oBAC responses
n=1
Do
    // load oBAC
    oBAC = "oBAC"+num2str(n)
    Duplicate/o $oBAC oBAC_w
    // create analog amp output wave
    oBAC_r = "oBAC_r"+num2str(n)
    // Initialize oBAC
    Ase = 1;Use = oBAC_w[1];D = oBAC_w[2];F =
    oBAC_w[3];u=Use;R=1
    //Calculate Amplitudes
    i=0
    do
        if(i==0)
            E = Ase*u*R;oBAC_r_w[i]=E
        else
            elapsedTime =
            (aTimesMessage[i]/1000)-(aTimesMessage[i-1]/1000)
            u = Use+((u*(1-Use))*exp(-elapsedTime/F))
            R = 1+((R-R*u-1)*exp(-elapsedTime/D))
            E = Ase*u*R
            oBAC_r_w[i]=E
        endif
        i+=1
    while(i<numpnts(oBAC_r_w))
    Duplicate/o oBAC_r_w $oBAC_r
n+=1
While(n<num_oBACs+1)
End
////////////////////////////////////////////////////////////////
// Differentially Scale Outputs
Function oBAC_r2oBAC_s( )
NVAR numChannels
NVAR num_oBACs
Variable n,m
String oBAC_r
String oBAC_r_error
String oBAC_r_s
//Initialize
oBAC_r = "oBAC_r"+num2str(1)
Duplicate/o $oBAC_r oBAC_r_s_w
//Convert oBAC_r to oBAC_s
n=1
Do
    oBAC_r_s = "oBAC_r_s"+num2str(n)
    oBAC_r_s_w=0
    m=1
    Do
        oBAC_r = "oBAC_r"+num2str(m)
        Duplicate/o $oBAC_r oBAC_r_w
        oBAC_r_error =
        "oBAC_r_error"+num2str(n)+"_"+num2str(m)
        Duplicate/o $oBAC_r_error oBAC_r_error_w
        Wavestats/Q oBAC_r_error_w
```

```
            oBAC_r_w=oBAC_r_w/error_w
            oBAC_r_s_w=oBAC_r_s_w+oBAC_r_w
        m+=1
        While(m<num_oBACs+1)
        Wavestats/Q oBAC_r_s_w
        oBAC_r_s_w=oBAC_r_s_w/v_max
        Duplicate/o oBAC_r_s_w $oBAC_r_s
    n+=1
    While(n<numChannels+1)
End
//Convert oBAC responses to out_nBinary
Function oBAC_s2out_nBinary( )
    NVAR numChannels = numChannels
    NVAR dt = dt
    Variable n,i
    Variable rTPL_1
    Variable rTPL_2
    Variable targetAmp
    Variable Ase,Use,D,F
    String rBAC
    String oBAC_r_s
    String out_nBinary
    //Make output waves
    oBAC_r_s = "oBAC_r_s"+num2str(1)
    Duplicate/o $oBAC_r_s oBAC_s_w
    Make/o/n=(numpnts(oBAC_s_w)) rBAC_r_w, out_nBinary_w
    //convert all output channels
    n=1
    Do
        //Initialize waves
        rBAC = "rBAC"+num2str(n)
        Duplicate/o $rBAC rBAC_w
        oBAC_r_s = "oBAC_r_s"+num2str(n)
        Duplicate/o $oBAC_r_s oBAC_s_w
        out_nBinary = "out_nBinary"+num2str(n)
        // Initialize rBAC parameters
        Ase = 1;Use = rBAC_w[1];D = rBAC_w[2];F = rBAC_w[3]
        // Assign start bit
        out_nBinary_w[0]=1
        //loop for each time Interval
        i=2
        Do
            out_nBinary_w[i]=1
            out_nBinary_w[i]=0
            rBACResponse(Use,D,F)
            rTPL_1=rBAC_r_w[i]
            out_nBinary_w[i]=0
            out_nBinary_w[i]=1
            rBACResponse(Use,D,F)
            rTPL_2=rBAC_r_w[i]
            //target amplitude
            targetAmp=oBAC_s_w[i]
            //select tpl for closest amp match
            if(abs(targetAmp-rTPL_1)<abs(targetAmp-rTPL_2))
                out_nBinary_w[i]=1
                out_nBinary_w[i]=0
            else
                out_nBinary_w[i]=0
                out_nBinary_w[i]=1
            endif
            i+=2
        While(i<numpnts(out_nBinary_w))
        // Assign end bit
        out_nBinary_w[numpnts(out_nBinary_w)-2]=1
        //Output nBinary
        Duplicate/o out_nBinary_w $out_nBinary
        //set scale to the same as input
        SetScale/P x 0,dt,"", $out_nBinary
    n+=1
    While(n<numChannels+1)
End
////////////////////////////////
// Get rBAC response
Function rBACResponse(Use,D,F)
    Variable Use,D,F
    NVAR numChannels = numChannels
    Variable n,i
    Variable R, E,Ase, u
    Variable elapsedTime
    WAVE out_nBinary_w = out_nBinary_w
    WAVE rBAC_r_w=rBAC_r_w
    //make out_nBinary times wave
    Make/o/n=0 out_times_w
    Findlevels/Q/D= out_times_w, out_nBinary_w 1
    // Initialize oBAC
    Ase = 1;u=Use,R=1
    // Initialize rBAC response wave
    rBAC_r_w=0
    //Calculate Amplitudes
    i=0
    Do
        if(i==0)
            E = Ase*u*R
            rBAC_r_w[i]=E
        else
            elapsedTime =
              (out_times_w[i])-(out_times_w[i-1])
            u = Use+((u*(1-Use))*exp(-elapsedTime/F))
            R = 1+((R-R*u-1)*exp(-elapsedTime/D))
            E = Ase*u*R
            rBAC_r_w[i]=E
        endif
    i+=1
    while(i<numpnts(out_times_w))
    End
////////////////////////////////////
// Convert to Bytes
Function out_nBinary2out_Byte( )
    NVAR numChannels = numChannels
    Variable n
    String out_nBinary
    String out_Byte
    //Initialize
    n=1
    Do
        out_Byte = "out_Byte"+num2str(n)
        out_nBinary = "out_nBinary"+num2str(n)
        Duplicate/o $out_nBinary out_nBinary_w
        DeletePoints 0,1,out_nBinary_w
        DeletePoints numpnts(out_nBinary_w)-1,1,out_nBinary_w
        Duplicate/o out_nBinary_w, $out_Byte
    n+=1
    While(n<numChannels+1)
End
///////////////////////////////
// Convert Bytes to Binary Signal
Function out_outByte2out_BinarySignal( )
    NVAR numChannels = numChannels
    Variable n
    String out_Byte
    String out_BinarySignal
    ConcatBytes( )
End
```

A computer storage medium can be, or be included in, a computer-readable storage device, a computer-readable storage substrate, a random or serial access memory array or device, or a combination of one or more of them The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program that perform activities in the processes described herein include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Embodiments

The methods, systems, and apparatus, including computer programs encoded on a computer storage medium, for encoding and decoding information described herein can be embodied in one or more of the following embodiments.

1. A method comprising: receiving, at an input, a time-based code signal, wherein the time-based code signal is divided into time intervals and each of the time intervals of the time-based code signal includes an event, the occurrence of the events within the intervals being timed to represent information; weighting the amplitude of at least some of the events in the time-based code signal as a function of the timing of other events in the time-based code signal to generate an amplitude sequence that includes weighted events; and outputting the amplitude-weighted time based code. 2. The method of embodiment 1, wherein weighting the amplitude of the events adds no new information to the time-based code signal. 3. The method of any preceding embodiment, wherein weighting the amplitude of the input events comprises weighting a first input event as a function of the weighted amplitude of an immediately preceding input event. 4. The method of any preceding embodiment, wherein weighting the amplitude of the input events comprises weighting the amplitude of a first input event by multiplying a time passed since an immediately preceding input event with a time-sensitive parameter. 5. The method of any preceding embodiment, wherein weighting the amplitude of the input events further comprises weighting the amplitude of the input events as a function of a stochastic variable. 6. The method of any preceding embodiment, further comprising resetting the weighting the amplitude of the events to a known state in response to a footer event in the time-based code.

7. A system comprising: a time encoder configured to encode information in a collection of time-based code signals, the time-based code signals each being divided into time intervals and each of the time intervals including an event, the occurrence of the events within the intervals being timed to represent information; a compressing encoder comprising a collection of converter devices each connected and configured to receive and weight the amplitudes of events in a respective time-based code signal as a function of characteristics of other events in the respective time-based code. 8. The system of embodiment 7, wherein the encoder comprises a reset mechanism, the reset mechanism configured to reset the weighting of the amplitudes of the events in the converter devices to a known state. 9. The system of any of embodiments 7-8, wherein the encoder comprises an integrator connected and configured to integrate the amplitude-weighted time-based codes into a signal. 10. The system of any of embodiments 7-9, wherein the integrator is configured to integrate the amplitude-weighted time-based codes into a one-dimensional signal. 11. The system of any of embodiments 7-10, wherein the integrator is configured to integrate the amplitude-weighted time-based codes into a signal in which numbers of time spans between events within a unit time are Poisson distributed. 12. The system of any of embodiments 7-11, wherein the weighting of the converter devices adds no new information to the time-based code signal. 13. The system of any of embodiments 7-12, wherein the weighting of each event is a non-linear function of times of occurrence of predecessor events in the time-based code signal.

14. A machine-implemented method comprising: receiving, at an input, a collection of amplitude-weighted sequences of events, wherein the amplitude weights are a function of the timing of other events in each sequence of events; integrating interactions amongst the time sequences to generate an integral representing those interactions; adjusting a threshold value in response to a number of the events in the amplitude-weighted sequences of events; and outputting, at an output, output events in response to the integral reaching the threshold value, the timing of each output event thereby indicating the timing of the integral reaching the dynamic threshold value. 15. The method of embodiment 14, wherein: the number of input events in each amplitude-weighted sequence of events is the same; and the method further comprises adjusting the dynamic threshold values so that a number of the output events equals the number of the input events. 16. The method of any of embodiments 14-15, wherein, except for the timing of the output events, the output events are indistinguishable from one another. 17. The method of any of embodiments 14-16, wherein each of the amplitude-weighted sequences of events starts at a same time. 18. The method of any of embodiments 14-17, wherein outputting the output events comprises transitioning from low to high and from high to low. 19. The method of any of embodiments 14-18 in combination with any of methods 1-6.

20. A system comprising: an integrator connected and configured to receive a collection of amplitude-weighted sequences of events, wherein the amplitude weights are a function of the timing of other events in each sequence of events, the integrator comprising a comparator connected to receive a signal characterizing the integration, wherein the comparator is configured to compare the signal characterizing the integration with a dynamic threshold value, and in response to the signal characterizing the integration reaching the dynamic threshold value, output an output event and reset the comparison between the signal characterizing the integration and the dynamic threshold value. 21. The system of embodiment 20, wherein the integrator further comprises an event counter configured to count the number of the input events in the time sequences. 22. The system of any of embodiments 20-21, wherein the integrator further comprises a threshold value adjuster connected to receive a count of the input events in the time sequences, the threshold value adjuster connected and configured to adjust the dynamic threshold value in response to the count of the number of the input events in the time sequences. 23. The system of any of embodiments 20-22, wherein, except for the timing of the output events, the output events are indistinguishable from one another. 24. The system of any of embodiments 20-23, further comprising a transmitter configured to transmit the output events output by the comparator. 25. The system of any of embodiments 20-24, further comprising a data write device configured to write the output events to a data storage device. 26. The system of any of embodiments 20-25 in combination with any of systems 7-13.

27. A data storage device comprising detectable physical manifestations encoding information, the physical manifestations spaced in accordance with an encoding scheme, the spacing between the physical manifestations thereby representing the content of the encoded information. 28. The data storage device of embodiment 27, the spacing between the physical manifestations conforming with a predetermined a probability distribution. 29. The data storage device of embodiment 28, wherein the probability distribution is asymmetrical and skewed. 30. The data storage device of embodiment 29, wherein the probability distribution is skewed to the left of the median of the probability distribution. 31. The data storage device of embodiment 30, wherein the standard deviation of the probability distribution is approximately equal to the square root of the mean of the probability distribution. 32. The data storage device of embodiment 31, wherein the probability distribution is a Poisson distribution. 33. The data storage device any of embodiments 27-32, wherein, except for the spacing between the physical manifestations, the physical manifestations are indistinguishable from one another. 34. The data storage device any of embodiments 27-33, wherein a number of physical manifestations is equal to a number of bits stored on the data storage device. 35. The data storage device any of embodiments 27-34, wherein each physical manifestation comprises a pair of transitions, the first transition from a first state to a second state and the second transition from the second state back to the first state. 36. The data storage device any of embodiments 27-35, wherein the spacing between physical manifestation is scaled to the time between the output of output events by the system of any of embodiments 20-26.

37. A method comprising: receiving a time series of events, the events occurring at non-uniform intervals within the input time series, the timing of the input events within the input time series encoding information; and generating multiple collections of weights, each weight in each collection corresponding to a respective input event in the input time series, the weights in each collection being a function of the timing of multiple events in the received time series; and outputting the collections of weights. 38. The method of embodiment 37, wherein the intervals between events in the received time series scale to the spacing between physical manifestations of the data storage device any of embodiments 27-36. 39. The method of any of embodiments 37-38, wherein: the method further comprises multiplying the events in the input time series by the amplitude weights, converting the input time series into a collection of amplitude-weighted time series of weighted events; and outputting the collections of weights comprises outputting the collection of amplitude-weighted time series of weighted events, wherein at least some of the weights in each collected differ for each non-zero input time series. 40. The method of any of embodiments 37-39, wherein outputting the collections of weights comprises outputting lists of weights without time information. 41. The method of any of embodiments 37-40, wherein generating the collections of weights comprises generating a first weight corresponding to a first event in the time series as a non-linear function of the timing of events preceding the first event in the time series. 42. The method of any of embodiments 37-41, wherein the method further comprises calibrating the generation of the collections of amplitude weights. 43. The method of any of embodiments 37-42, further comprising: resetting the generation of amplitude weights to a known state; and receiving a second subsequent input time series. 44. The method of any of embodiments 37-43 in combination with the method of any of embodiments 1-6 or 14-19.

45. A decoder device comprising: an input connectable to receive an input time series of events, the events in the input time series occurring at non-uniform intervals, the timing of the input events within the input time series encoding information; a collection of converter devices each configured to uniquely convert the input time series into a collection of amplitudes, each amplitude being a function of the timing of multiple input events in the input time series; and a collection of outputs, each connectable to output a respective series of amplitudes, wherein the amplitudes vary but the number of the amplitudes is the same as the number of the events in the input time series, wherein at least some of the amplitudes generated by different weight generators differ for each non-zero input time series. 46. The decoder of embodiment 44, further comprising a reset mechanism, the reset mechanism configured to reset the converter devices to a known state. 47. The decoder of any of embodiments 44-45, further comprising: a collection of data storage devices storing a collection of weights; and a collection of multipliers, each of the multipliers connected and configured to multiply one of the collections of amplitudes by a respective weight; and a summer configured to sum the products of the collections of amplitudes and the respective second weights. 48. The decoder of any of embodiments 44-47, wherein each of the converter devices comprises a network of signal processors interconnected by one or more processing junctions that dynamically adjust response strength according to the temporal pattern of events in the input time series to generate the collection of amplitudes. 49. The decoder of any of embodiments 44-48, in combination with any of embodiments 7-13 or 20-26.

50. A device comprising: an input connectable to receive an input series of amplitudes; a comparator connected to compare the input series of amplitudes with an second series of amplitudes and generate a signal indicative of a difference between the input series of amplitudes and the second series of amplitudes; a converter device configured to convert a time series into the second series of amplitudes, each amplitude in the second series being a function of the timing of multiple events in the time series input into the converter device; a permuter configured to permute the time series input into the converter device; and an output connectable to output a time series input into the converter device in response to the signal indicative of the difference between the input series of amplitudes and the second series of amplitudes falling below a threshold value. 51. The device of embodiment 50, wherein the converter device comprises a network of signal processors interconnected by one or more processing junctions that dynamically adjust response strength according to the temporal pattern of events in the input time series to generate the second series of amplitudes. 52. The device of an of embodiments 50-51, further comprising a buffer to store the input series of amplitudes. 53. The device of an of embodiments 50-52, further comprising a second buffer to store the second series of amplitudes. 54. The device of an of embodiments 50-53, wherein the comparator comprises a collection of comparators each connected to compare a single amplitude of the input series with a single amplitude of the second series of amplitudes. 55. The device of embodiments 50-54, in combination with any of embodiments 44-48, 7-13, or 20-26. 56. A method comprising: receiving an input series of amplitudes; comparing the amplitudes of the input series with amplitudes of a second series of amplitudes to generate a signal indicative of a difference therebetween; in response to the difference signal, permuting a time series input into a device, the device generating the second series of amplitudes in response to the input time series. 57. The method of embodiment 56, further comprising outputting a time series in response to the difference signal dropping below a threshold. 58. The method of any of embodiments 56-57, further comprising storing the amplitudes of the input series and the amplitudes of the second series in one or more buffers for the comparison. 59. The method of any of embodiments 56-58, in combination with the method of any of embodiments 37-44, 1-6, or 14-19.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of interfacing between digital data processing and the statistical processing and pattern recognition provided in a neural processing component and encoding information in an encoder, comprising:
 receiving a signal representing information using a collection of discrete digits;
 converting, by an encoder, the received signal into a time-based code, wherein:
  the time-based code is divided into time intervals,
  each of the time intervals of the time-based code corresponds to a digit in the received signal,
  each digit of a first state of the received signal is expressed as a event occurring at a first time within the corresponding time interval of the time-based code,
  each digit of a second state of the received signal is expressed as a event occurring at a second time within the corresponding time intervals of the time-based code, the first time is distinguishable from the second time, and
  all of the states of the digits in the received signal are represented by events in the time-based code; and
 outputting the time-based code to the neural processing component.

2. The method of claim 1, wherein:
 the received signal is a binary representation of the information; and
 the digits of the received signal comprise bits in the binary representation.

3. The method of claim 1, wherein except for the times of occurrence, the events expressing the digits of the first state are indistinguishable from the events expressing the digits of the second state.

4. The method of claim 1, wherein the events each comprise a pair of transitions from low to high and from high to low.

5. The method of claim 1, wherein outputting the time-based code comprises outputting the time-based code to a neural processing component implemented using wet neural components, wherein the properties of the time-based code are tailored for compatibility with the wet neural components.

6. The method of claim 1, wherein converting the received signal into the time-based code comprises adding a start header to the time-based code, the start header demarcating the start of the time-based code and corresponding to a header in the received signal.

7. The method of claim 1, wherein converting the received signal into the time-based code comprises adding a stop footer to the time-based code, the stop footer demarcating the end of the time-based code and corresponding to a footer in the received signal.

8. The method of claim 1, wherein:
the time intervals are all of a single duration;
the time intervals are serially ordered in a same sequence as corresponding digits in the received signal; and
converting the received signal into the time-based code comprises
converting every digit of the first state of the received signal into events occurring at the first time, and
converting every digit of the second state of the binary representation into events occurring at the second time.

9. A system for interfacing between digital data processing and the statistical processing and pattern recognition provided in a neural processing component, the system comprising:
an input for receiving a signal representing information using a collection of discrete digits;
an encoder that encodes the received signal, the encoder comprising:
a state detector configured to detect the states of the digits in the received signal, and
a translator configured to translate the states of the digits in the received signal into a time-based code, the time-based code comprising a collection of time intervals each assigned a respective digit in the received signal, each of the time intervals comprising an event, the timing of the event within each of the time intervals characterizing the state of a respective assigned digit;
an output for providing the time-based code to another system or device; and
a neural processing component connected to receive the time-based code.

10. The system of claim 9, wherein the neural processing component is implemented using wet neural components and the properties of the time-based code are tailored for compatibility with the wet neural components.

11. The system of claim 9, wherein the translator comprises an event generator, the event generator configured and connected to generate the events of the time-based code.

12. The system of claim 11, wherein the event generator comprises a pulse generator, wherein shapes of pulses expressing first states are indistinguishable from shapes of pulses expressing second states.

13. The system of claim 11, wherein the event generator is further configured to generate a header event demarcating the start of the time-based code and corresponding to a header in the received signal.

14. The system of claim 9, further comprising a start/stop detector configured and connected to detect the beginning and the end of the received signal.

15. The system of claim 9, further comprising an interval timing component, the interval timing component demarcating the passing of the time intervals of the time-based code.

16. A method for interfacing between the statistical processing and pattern recognition functions provided by neural processing component and digital data processing devices and decoding a time-based code signal, the method comprising:

receiving a time-based code signal from a neural processing device at a decoder, wherein:
the time-based code signal is divided into time intervals,
each of the time intervals of the time-based code signal comprises an event, and
the timing of the events within the time intervals express the information content of the time-based code signal;
detecting the timing of the events within the time intervals; and
outputting a signal that represents the information expressed in the time-based code signal using a collection of discrete digits.

17. The method of claim 16, further comprising:
converting events occurring within a first time range of the intervals of the time-based code signal into a discrete digit of a first state in the output signal; and
converting events occurring within a second time range of the intervals of the time-based code signal into a discrete digit of a second state in the output signal.

18. The method of claim 16, further comprising detecting a start of data content of the time-based code signal by detecting a header event of the time-based code signal.

19. The method of claim 18, further comprising synchronizing the detection of the times at which the events occur within the time intervals with the start of data content of the time-based code signal.

20. The method of claim 16, wherein receiving the time-based code signal comprises receiving the time-based code signal from a neural processing device implemented using wet neural components.

21. The method of claim 16, further comprising:
receiving a second time-based code signal at a second decoder, wherein:
the second time-based code signal is divided into time intervals,
each of the time intervals of the second time-based code signal comprises an event, and
the timing of the events within the time intervals express the information content of the second time-based code signal;
detecting, at the second decoder, the timing of the events within the time intervals; and
outputting, from the second decoder, a signal that represents the information expressed in the second time-based code signal using a second collection of discrete digits; and
aggregating the collection of discrete digits and the second collection of discrete digits into a second signal.

22. The method of claim 16, wherein the events of the time-based code signal have indistinguishable shapes.

23. A system for interfacing between the statistical processing and pattern recognition functions provided by neural processing component and digital data processing devices and decoding a time-based code signal, the system comprising:
a neural processing component;
an input to which the neural processing component is connected and that receives a time-based code signal, wherein:
the time-based code signal is divided into time intervals,
each of the time intervals of the time-based code signal comprises an event, and
the timing of the events within the time intervals express the information content of the time-based code signal;
a event detector configured to detect timing of the events within the time intervals of the time-based code signal;

a translator configured to translate the timing of the events within the time intervals of the time-based code into states of a collection of digits; and an output configured to provide a signal comprising the digits.

24. The system of claim 23, further wherein the neural processing component is implemented using wet neural components.

25. The system of claim 23, wherein the event detector comprises a pulse detector.

26. The system of claim 23, further comprising an interval timing component, the interval timing component demarcating the passing of the time intervals of the time-based code.

27. The system of claim 26, wherein the interval timing component comprises a comparator configured to compare a time count with a reference.

28. The system of claim 26, further comprising a start detector configured to detect a start of the time-based code signal.

29. The system of claim 23, wherein the start detector is coupled to the interval timing component and provides a reset signal to the interval timing component, the reset signal resetting the demarcation of the passing of the time intervals.

* * * * *

UNITED STATES PATENT AND TRADEMARK OFFICE
CERTIFICATE OF CORRECTION

PATENT NO. : 8,159,373 B2
APPLICATION NO. : 12/844112
DATED : April 17, 2012
INVENTOR(S) : Henry Markram It is certified that error appears in the above-identified patent and that said Letters Patent is hereby corrected as shown below:

In Column 53, line 6, Claim 24, before "wherein" delete "further"

Signed and Sealed this
Third Day of July, 2012

David J. Kappos
*Director of the United States Patent and Trademark Office*